United States Patent [19]
Yoshida et al.

[11] Patent Number: 5,936,693
[45] Date of Patent: *Aug. 10, 1999

[54] LIQUID CRYSTAL DISPLAY DEVICE HAVING A WIDE VIEW ANGLE

[75] Inventors: Tetsushi Yoshida, Kanagawa-ken; Takashi Miyashita, Hamura; Yoshinaga Miyazawa, Hino; Toshihiro Mannouji, Hachioji; Hiroko Awata, Tokyo; Yasushi Nakajima, Hachioji, all of Japan

[73] Assignee: Casio Computer Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/534,272

[22] Filed: Sep. 26, 1995

[30] Foreign Application Priority Data

| Sep. 27, 1994 | [JP] | Japan | 6-231385 |
| Dec. 26, 1994 | [JP] | Japan | 6-336695 |
| Dec. 26, 1994 | [JP] | Japan | 6-336702 |
| Mar. 28, 1995 | [JP] | Japan | 7-069194 |

[51] Int. Cl.$^6$ .......................... G02F 1/1333; G02F 1/1343
[52] U.S. Cl. .................. 349/139; 349/107; 349/109; 349/138; 349/106
[58] Field of Search .................. 349/122, 123, 349/138, 139, 107, 162, 85, 143, 177, 181, 191, 106, 109; 345/87, 88, 89

[56] References Cited

U.S. PATENT DOCUMENTS

| 4,828,365 | 5/1989 | Stewart et al. | 349/103 |
| 4,840,460 | 6/1989 | Bernot et al. | 349/85 |
| 4,935,757 | 6/1990 | Hatano et al. | 349/110 |
| 5,126,865 | 6/1992 | Sarma | 349/85 |
| 5,191,452 | 3/1993 | Sarma | 349/85 |
| 5,644,415 | 7/1997 | Aoki et al. | 349/122 |

Primary Examiner—Hung Xuan Dang
Assistant Examiner—Tai V. Duong
Attorney, Agent, or Firm—Frishauf, Holtz, Goodman, Langer & Chick

[57] ABSTRACT

An underlying electrode is formed on nearly the entire surface of an opposing substrate and a color filter is formed on the underlying electrode. An overcoat layer is formed on the color filter. A stripe-shaped overlying electrode connected to the underlying electrode and extending to a part of each pixel area is formed on the overcoat layer, and an alignment film is formed on the overlying electrode. Formed on a TFT substrate are TFT's, pixel electrodes and another alignment film which covers the TFT's and pixel electrodes. A liquid crystal is provided between both substrates. When a drive voltage is applied between the underlying electrode and the pixel electrodes, the drive voltage is applied almost directly to the liquid crystal between the overlying electrode and the pixel electrodes, and a drive voltage dropped by the color filter and overcoat layer is applied to the liquid crystal between the underlying electrode and the pixel electrodes. Therefore, a plurality of areas with different alignment states are formed in each pixel and their optical characteristics are averaged, thus widening the view angle.

24 Claims, 52 Drawing Sheets

S=50%

S=50%

$\varepsilon i = 3.5$

εi = 3.5

LIQUID CRYSTAL DISPLAY DEVICE HAVING A WIDE VIEW ANGLE

BACKGROUND OF THE INVENTION

1. Field of the Invention

The present invention relates to a liquid crystal display device with a wide view angle.

2. Description of the Related Art

Liquid crystal display devices can be designed flat and lighter, and are available as display units for various electronic apparatuses.

The liquid crystal display devices however suffer a narrower view angle than CRT's or the like.

One proposed way to widen the view angle is to divide each pixel to a plurality of subpixels and connect a control capacitor in series to one side of those subpixels. This approach drops the voltage that is applied to the liquid crystal at the subpixel to which the control capacitor is connected. Therefore, a plurality of areas with different electro-optical characteristics are formed in each pixel and the optical characteristics of those areas are averaged to widen the view angle.

In a TFT liquid crystal display device, there is a known method which divides each pixel electrode to multiple parts to form subpixels, and to arrange a control-capacitor forming control electrode opposite to each pixel electrode. This approach forms the control capacitors on the substrate on which TFT's are formed, thereby reducing the manufacturing yield of the TFT substrate.

SUMMARY OF THE INVENTION

Accordingly, it is an object of the present invention to provide a liquid crystal display device with a wide view and which has a high yield.

To achieve this object, a liquid crystal display device according to the first aspect of this invention comprises:
a first substrate;
a second substrate arranged opposite to the first substrate;
a first electrode formed on a surface of the first substrate which faces the second substrate;
a second electrode arranged on the second substrate and forming pixel areas in an area facing the first electrode;
a liquid crystal sealed between the first and second substrates; and
a polarization plate arranged on at least one of the first and second substrates,
the first electrode including an overlying electrode arranged above an insulating film arranged in each pixel area and forming a first region, and an underlying electrode arranged under the insulating film to be connected to the underlying electrode and forming a second region, different voltages being applied to the liquid crystal in the first region and the second region in a same pixel.

With the above structure, different voltages are applied to the liquid crystal in the first and second regions of each pixel, so that the first and second regions show different voltage-luminance characteristics. If the peak of the applied voltage-luminance curve for the first region and the bottom of the applied voltage-luminance curve for the second region are to be generated by the same voltage, for example, the average voltage-luminance characteristic draws the monotonous rising curve or monotonous falling curve to thereby suppress the inversion of the gradation between adjoining gradations, thus widening the view angle.

To achieve the above object, a liquid crystal display device according to the second aspect of this invention comprises:
a first substrate;
a second substrate arranged opposite to the first substrate;
a first electrode formed on a surface of the first substrate which faces the second substrate;
a second electrode arranged on the second substrate and forming pixel areas in an area facing the first electrode;
an insulating film provided in a predetermined area on the first electrode in each pixel area;
a liquid crystal sealed between the first and second substrates; and
a polarization plate arranged on at least one of the first and second substrates,
different voltages being applied to the liquid crystal in the predetermined area and the other area in a same pixel.

With this structure, different voltages are also applied to a predetermined area in each pixel and the other area in that pixel, thereby widening the view angle.

To achieve the aforementioned object, a liquid crystal display device according to the third aspect of this invention comprises:
a first substrate;
a second substrate arranged opposite to the first substrate;
a first electrode formed on a surface of the first substrate which faces the second substrate;
a second electrode arranged on the second substrate and forming pixel areas in an area facing the first electrode;
a dielectric layer provided on at least one of the first electrode and the second electrode in each pixel area constituted by opposing portions of the first electrode and the second electrode, and having areas different from each other at least in one of a relative resistance and a dielectric constant;
a liquid crystal sealed between the first and second substrates, a product $\Delta n \cdot d$ of a refractive anisotropy $\Delta n$ and a thickness d of the liquid crystal liquid crystal being set above 600 nm; and
a polarization plate arranged on at least one of the first and second substrates.

With this structure, as the retardation of the liquid crystal is set greater than 600 nm, bright images can be displayed. Areas which differ from each other in at least one of the relative resistance and dielectric constant are formed in a pixel. Therefore, areas whose applied voltages differ from each other are formed in each pixel, and minute area whose alignment states differ from each other with respect to the same applied voltage are formed in each pixel. Consequently formed in each pixel are areas which have different electro-optical characteristics. Although the retardation $\Delta n \cdot d$ of the liquid crystal is large, therefore, a wide view angle can be obtained.

DETAILED DESCRIPTION OF THE PREFERRED EMBODIMENTS

Preferred embodiments of the present invention will now be described with reference to the accompanying drawings.

First Embodiment

The first embodiment of this invention as applied to TFT LCD device will be discussed with reference to the accompanying drawings.

Figure 1:
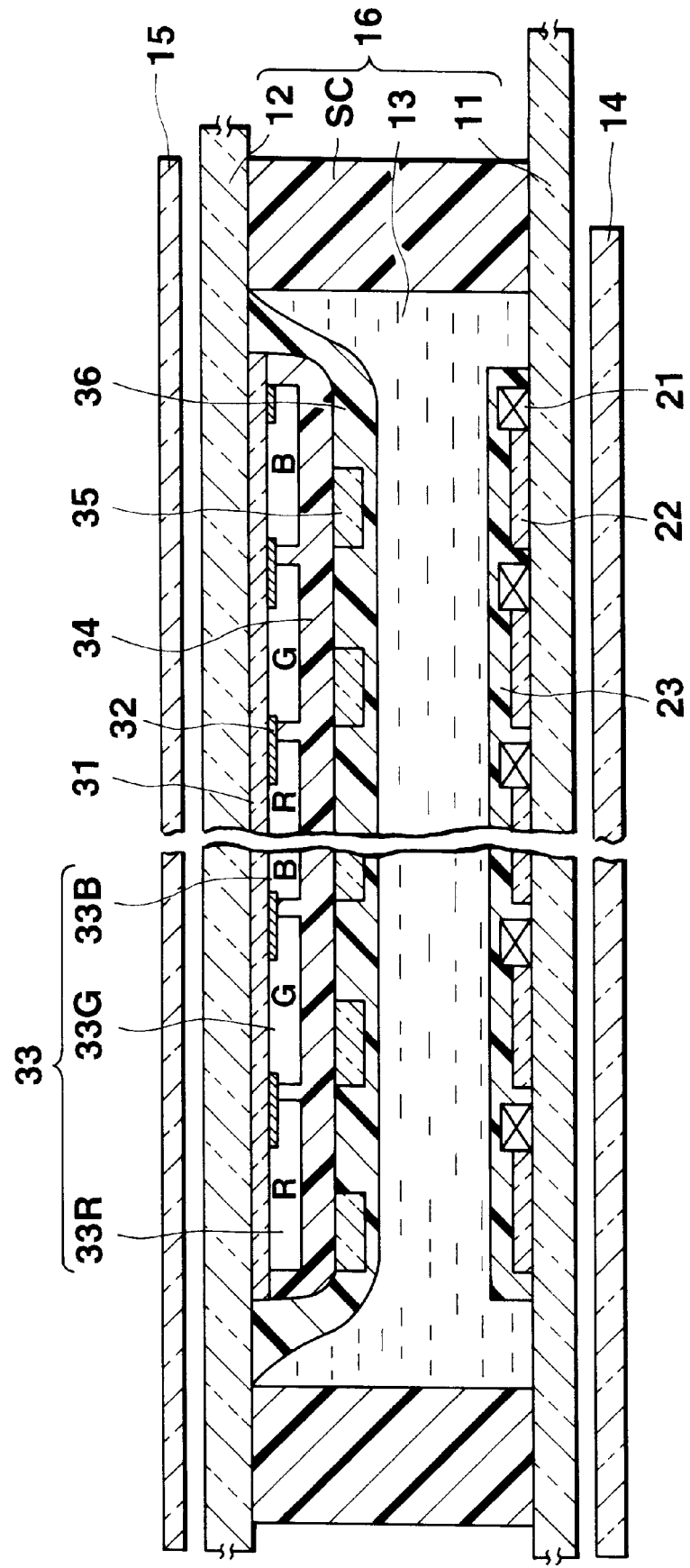
FIG. 1 is a cross-sectional view showing the structure of a color liquid crystal display (LCD) device according to a first embodiment of this invention.

As shown in FIG. 1, this LCD device comprises a liquid crystal (LC) cell 16, constituted by a pair of transparent substrates 11 and 12, connected together by a seal member SC, and a TN (Twisted Nematic) liquid crystal 13 sealed between those transparent substrates 11 and 12; and polarization plates 14 and 15 sandwiching the LC cell 16.

The transparent substrates 11 and 12 are made of glass, transparent resin or the like.

Figure 2:
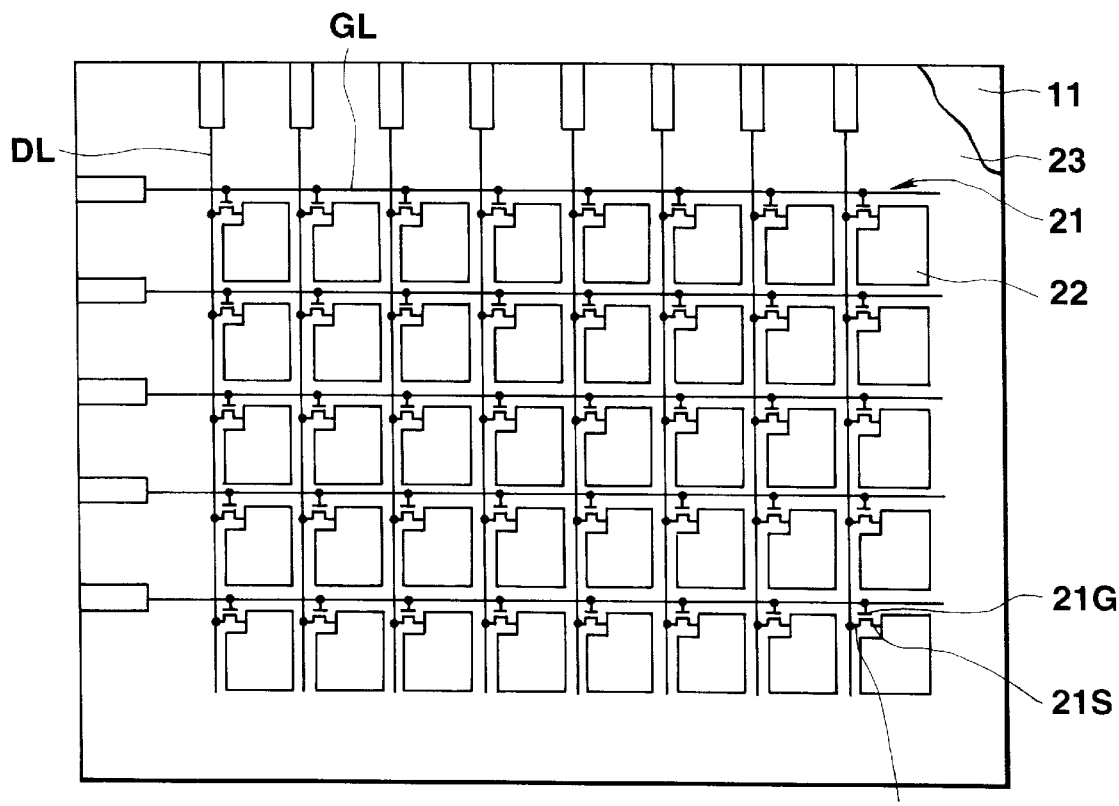
FIG. 2 is a diagram showing the planar structure of a TFT substrate of the color LCD device shown in FIG. 1.

The lower transparent substrate (hereinafter called "TFT (Thin Film Transistor) substrate") 11 has TFT's 21 and pixel electrodes 22 arranged thereon in a matrix form, as shown in FIGS. 1 and 2. An alignment film 23 is provided on the TFT's 21 and pixel electrodes 22.

Each TFT 21 comprises a gate electrode 21G formed on the TFT substrate 11, a gate insulating film formed over the gate electrode 21G, a semiconductor layer formed opposite the gate electrode 21G on the gate insulating film, a source electrode 21S connected to the semiconductor layer and a drain electrode 21D.

The source electrode 21S of each TFT 21 is connected to the associated pixel electrode 22. The gate electrodes 21G of each row of TFT's 21 are connected to an associated gate line GL. The drain electrodes 21D of each column of TFT's 21 are connected to an associated data line DL.

Each pixel electrode 22 is formed of a transparent conductive film of ITO (Indium Tin Oxide) or the like of bout 0.08±0.02 μm.

An opposing electrode (underlying electrode) 31 is formed on the other transparent substrate (hereinafter called "opposing substrate") 12. The opposing electrode 31 is formed of ITO or the like of about 0.08±0.02 μm thick and is applied with a predetermined common voltage. A light-shielding black mask 32 is arranged in a grid form at the portion of the opposing electrode 31 which faces the TFT's 21 and the portions of the opposing electrode 31 which lie between the pixel electrodes 22. The black mask 32 is formed of a metal film of about 0.15 μm thick.

An R, G, or B color filter 33 (33R, 33G and 33B) is arranged at each pixel area of the opposing electrode 31. The color filters 33 are made of acrylic resin or the like of about 1.2 μm to 2.0 μm thick. A pigment is added to the color filter 33, so that the filter 33 is colored to red, green or blue depending on the added pigment. The color filter 33 may be arranged in stripe, oblique mosaic, triangular mosaic, or the like.

An overcoat layer (protection layer) 34 is provided on the color filters 33 (33R, 33G and 33B) all over the substrate. The overcoat layer 34 is made of acrylic resin or the like of about 1 μm thick.

Figure 3:
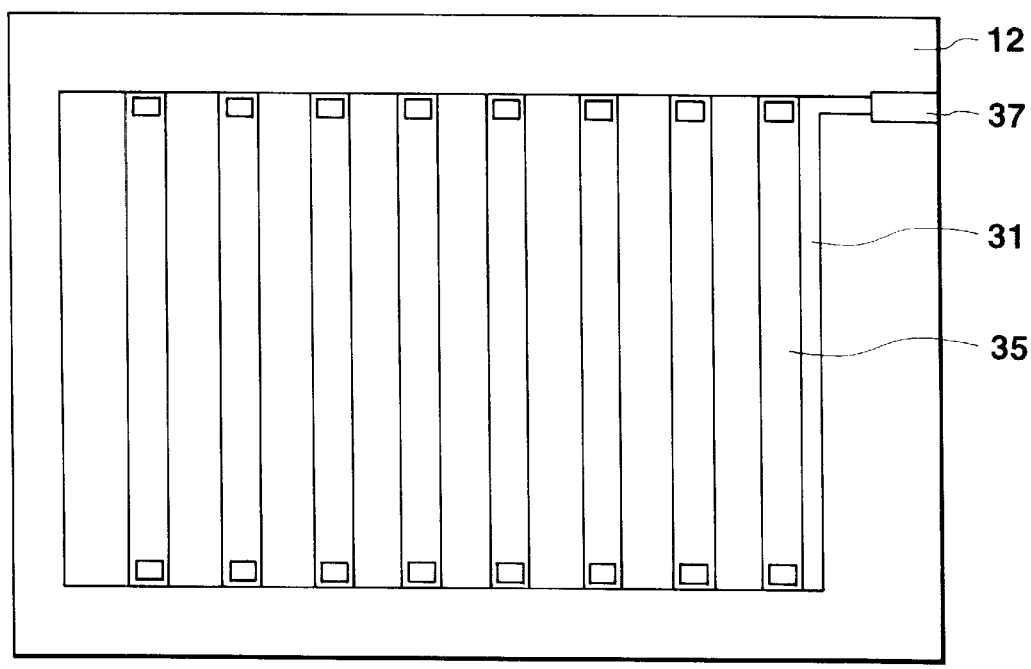
FIG. 3 is a diagram showing the planar structure of an opposing substrate of the color LCD device shown in FIG. 1.
Figure 4:
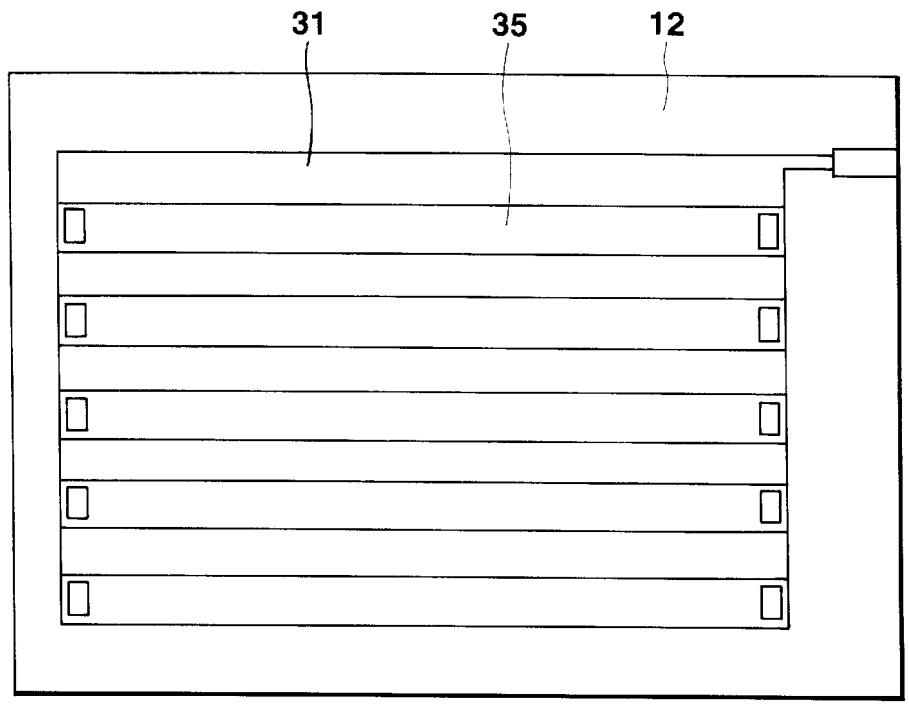
FIG. 4 is a diagram showing another example of the planar structure of the opposing substrate shown in FIG. 3.

As shown in FIG. 3 or 4, a stripe electrode (overlying electrode) 35 is provided on the overcoat layer 34 so as to be located in each pixel area. The overlying electrode 35 is made of ITO of about 0.08±0.02 μm thick, and is connected at its end portion or the like to the opposing electrode 31 to be kept at the same potential as that of the opposing electrode 31.

An alignment film 36 of polyimide or the like is formed on the overlying electrode 35 and the overcoat layer 34.

Figure 5:
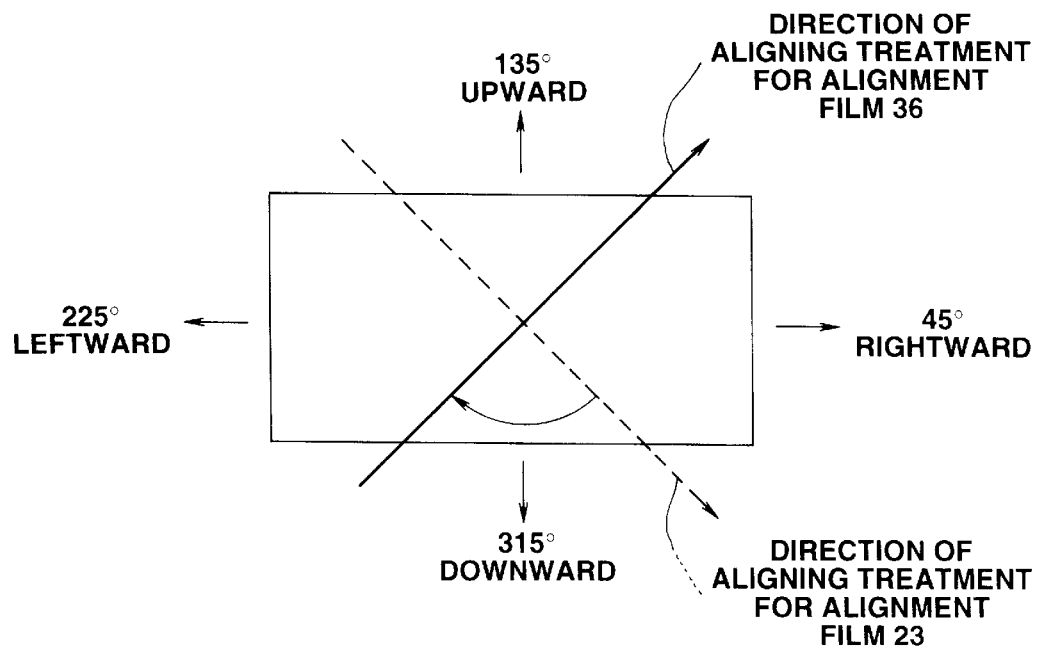
FIG. 5 is a diagram illustrating the definitions of the direction of alignment, the aligning direction of the liquid crystal and the upward, downward, rightward and leftward directions of the LCD device.

The lower alignment film 23 in FIG. 1 is subjected to an aligning treatment such as rubbing in the direction indicated by the broken line in FIG. 5 (the direction of 0 degree). The upper alignment film 36 is subjected to an aligning treatment in the direction indicated by the solid line in FIG. 5 (the direction of 90 degree).

The liquid crystal 13 is a nematic liquid crystal material with the positive dielectric anisotropy added with a chiral agent, and is twisted 90 degrees clockwise (0 to -90 degrees) toward the upper substrate 12 from the lower substrate 11 in accordance with the aligning treatment.

The lower (light-incident side) polarization plate 14 is arranged so that its transmission axis becomes perpendicular (90 degrees) to the direction of the aligning treatment performed on the lower alignment film 23. The upper (light-outgoing side) polarization plate 15 is arranged so that its transmission axis becomes perpendicular to the transmission axis of the lower polarization plate 14.

With the thus structured LCD device, by changing the voltages between the pixel electrodes 22 and the opposing electrode 31 and the overlying electrode 35, the alignment state of the liquid crystal 13 changes continuously and the amount of light passing between the polarization plates 14 and 15. Further, the transmitted light is colored by each color filter 33. Therefore, a color gradation display is possible.

To realize the color gradation display, the gate pulses applied to the gate lines GL are controlled to control the ON/OFF of the TFT's 21 and the desired gradation voltages are applied to the pixel electrodes 22 via the data lines DL and the ON-state TFT's 21.

The voltage between the pixel electrodes 22 and the overlying electrode 35 is applied to the liquid crystal 13 in the area where the overlying electrode 35 is located. In the area where the overlying electrode 35 is not located, however, the voltage dropped by the color filter 33 and the overcoat layer 34 is applied to the liquid crystal 13.

In each pixel, domains, which has different aligning states in which tilt angles of the LC molecules differ from each other, are formed with respect to one voltage applied between the pixel electrode 22, and the underlying (opposing) electrode 31 and overlying electrode 35. The electro-optical characteristics of the domains differ from each other. As those optical characteristics are averaged, the view angle becomes wider. Unlike the structure which has a control capacitor provided on the TFT substrate, the structure of this embodiment requires no increased manufacturing step on the side of the TFT substrate 11 which is difficult to manufacture, with just a slight increase in the manufacturing steps on the side of the opposing substrate 12. This facilitates the manufacturing of the LCD device.

The view angle characteristic of the LCD device according to this embodiment will now be described in detail.

Figure 6:
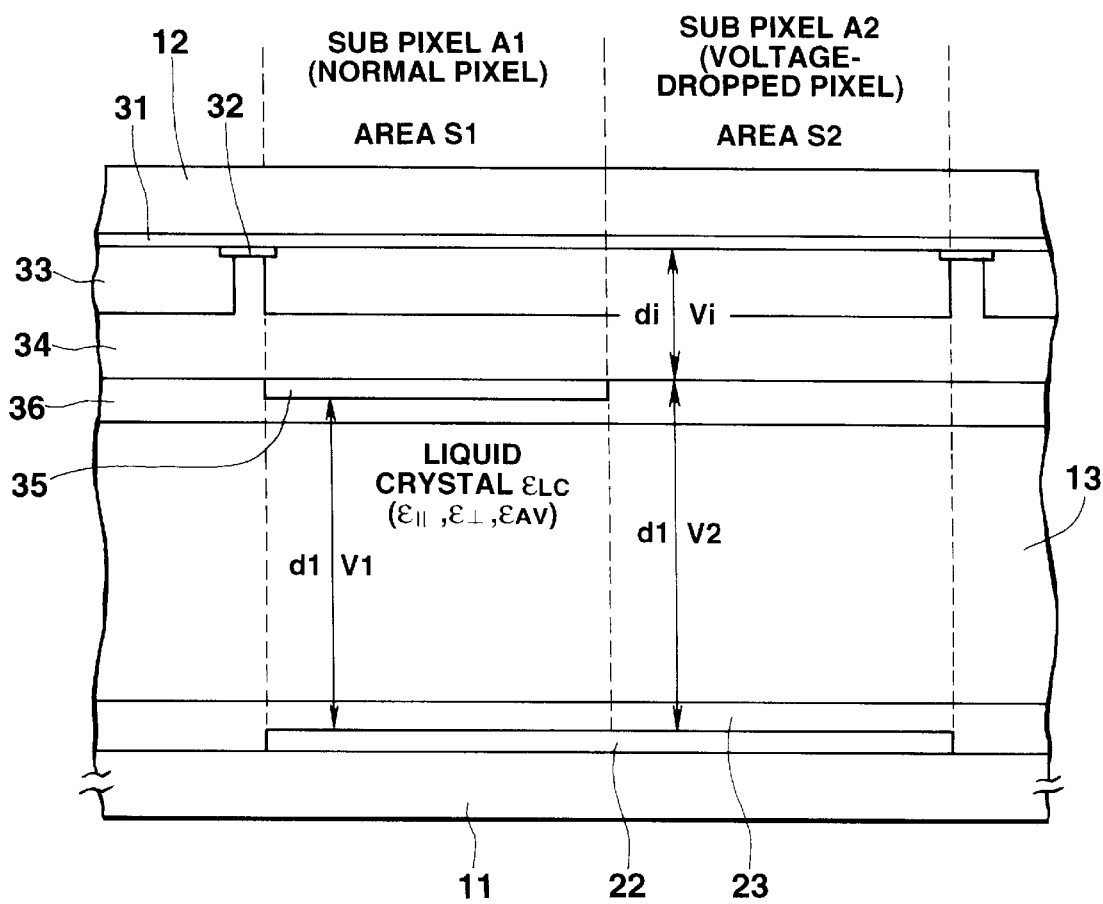
FIG. 6 is a cross-sectional view showing the structure of one pixel of the LCD device.

As shown in FIG. 6, each pixel of the LCD device of this embodiment is divided to a subpixel (region) A1 with an area S1 and a subpixel A2 with an area S2. In one subpixel A1, the overlying electrode 35 applies the voltage to the liquid crystal 13 via the color filters, the alignment film 36. This structure is called a top ITO structure. In the other subpixel A2, the opposing electrode 31 applies the voltage to the liquid crystal 13 via the overcoat layer 34 and the alignment film 36. This structure is called a bottom ITO structure.

In the subpixel A1 with the top ITO structure, the voltage V1 applied between the pixel electrodes 22 and the overlying electrode 35 is applied nearly directly to the liquid crystal 13. (The voltage drop caused by the alignment films 23 and 36 are neglected. The voltage drop by the alignment films 23 and 36 is substantially the same for the areas A1 and A2 and does not raise any practical problem even when disregarded.)

In the subpixel A2 with the bottom ITO structure, the voltage V2 (V1=Vi+V2) dropped by Vi by the insulating film, constituted by the color filter 33 and the overcoat layer 34, is applied to the liquid crystal 13.

Hereinafter, the subpixel A1 is called a normal pixel and the subpixel A2 a voltage-dropped pixel.

The cell gap (the layer thickness of the liquid crystal 13) is dl which is common to both subpixels, and the thickness of the insulating film (color filter 33 and overcoat layer 34) which causes a voltage drop is di.

Given that the relative dielectric constant of the liquid crystal 13 which changes with the applied voltage is $\epsilon_{LC}$, the parallel dielectric constant of the liquid crystal 13 is $\epsilon\|$ and the vertical relative dielectric constant of the liquid crystal 13 is $\epsilon\bot$, the spatial average relative dielectric constant $\epsilon_{AV}$ is defined by the following equation (1).

$$\epsilon_{AV} = (\epsilon\| + 2\cdot\epsilon\bot)/3 \quad (1)$$

Figure 7:
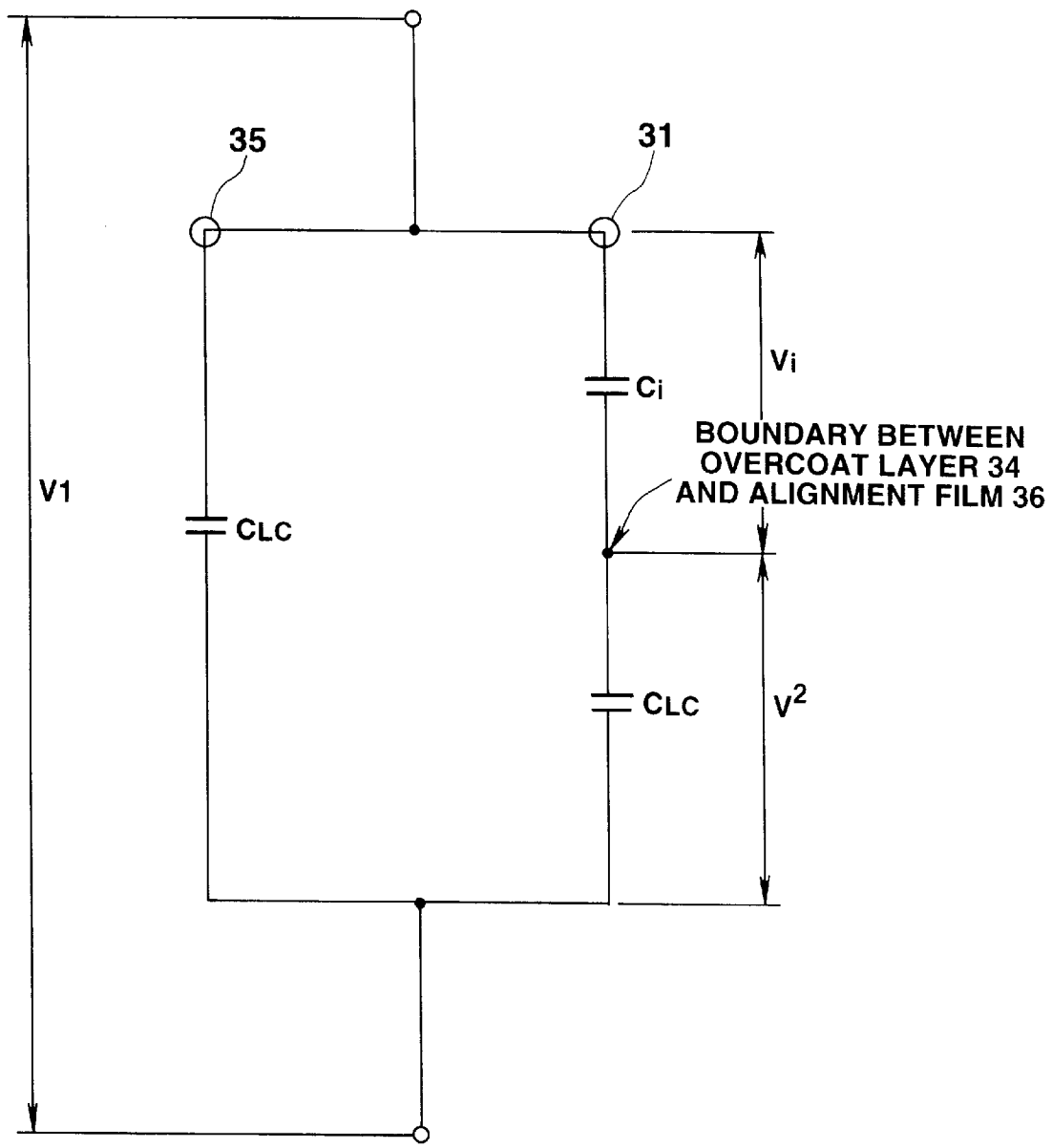
FIG. 7 is an equivalent circuit of one pixel.

The voltage-dropped pixel A2, as viewed from the viewpoint of an equivalent circuit, is an insulating film capacitor Ci connected in series to an LC capacitor $C_{LC}$, as shown in FIG. 7. Therefore, the voltage-dropped pixel A2 can be characterized by two parameters $\alpha$ and $\beta$ given by an equation (2).

Voltage drop ratio: $\alpha = Vi/V1 = 1/(R+1)$

Voltage stretch ratio: $\beta = V1/V2 - 1 = 1/R$ $$R \equiv Ci/C_{LC} \quad (2)$$

$Ci \equiv \epsilon i \cdot S2/di$ $C_{LC} \equiv \epsilon_{LC} \cdot S2/di$

The voltage drop ratio $\alpha$ indicates the ratio of the voltage drop caused by the color filter 33 and the overcoat layer 34 when the voltage V1 is applied between the pixel electrodes 22 and the opposing electrode 31. Ci is the capacitance of the insulating film, constituted by the color filter 33 and the overcoat layer 34, $\epsilon i$ is the relative dielectric constant of the insulating film, and di is the thickness of the insulating film.

To make the luminance of the voltage-dropped pixel A2 equal to the luminance of the normal pixel A1, a higher voltage should be applied to the voltage-dropped pixel A2 than to the normal pixel A1. The voltage stretch ratio $\beta$ indicates the ratio of the increased voltage which should be applied due to the insulating film. The LC capacitance $C_{LC}$ is a monotonous increasing function with respect to the applied voltage, and the upper limit and the lower limit of the LC capacitance $C_{LC}$ are $C\|$ and $C\bot$ given by an equation (3).

$C\| \equiv \epsilon\| \cdot S2/d1$ $$C\bot \equiv \epsilon\bot \cdot S2/d1 \quad (3)$$

The voltage drop ratio $\alpha$ and the voltage stretch ratio $\beta$ increase with an increase in applied voltage. Accordingly, the average voltage drop ratio $\alpha_{AV}$ and the average voltage stretch ratio $\beta_{AV}$ are defined as an equation (4).

$$\alpha_{AV} \equiv 1/(R_{AV}+1) \quad (4)$$

$\beta_{AV} \equiv 1/R_{AV}$ $R_{AV} \equiv Ci/C_{AV}$ $C_{AV} \equiv \epsilon_{AV} \cdot S2/d1$ The stretch voltage $\Delta V50$ of the applied voltage V50 of the normal pixel A1 when the 50% luminance (luminance of 50% of the maximum luminance) Y50 is obtained is given by an equation (5).

$$\Delta V50 = \{C_{LC}(V50)/Ci\} \cdot V50 \quad (5)$$

$\Delta V50$ indicates the amount of shift in the direction of the voltage axis on a Y-V curve caused by the voltage drop by the insulating film (33 and 34).

Figure 8:
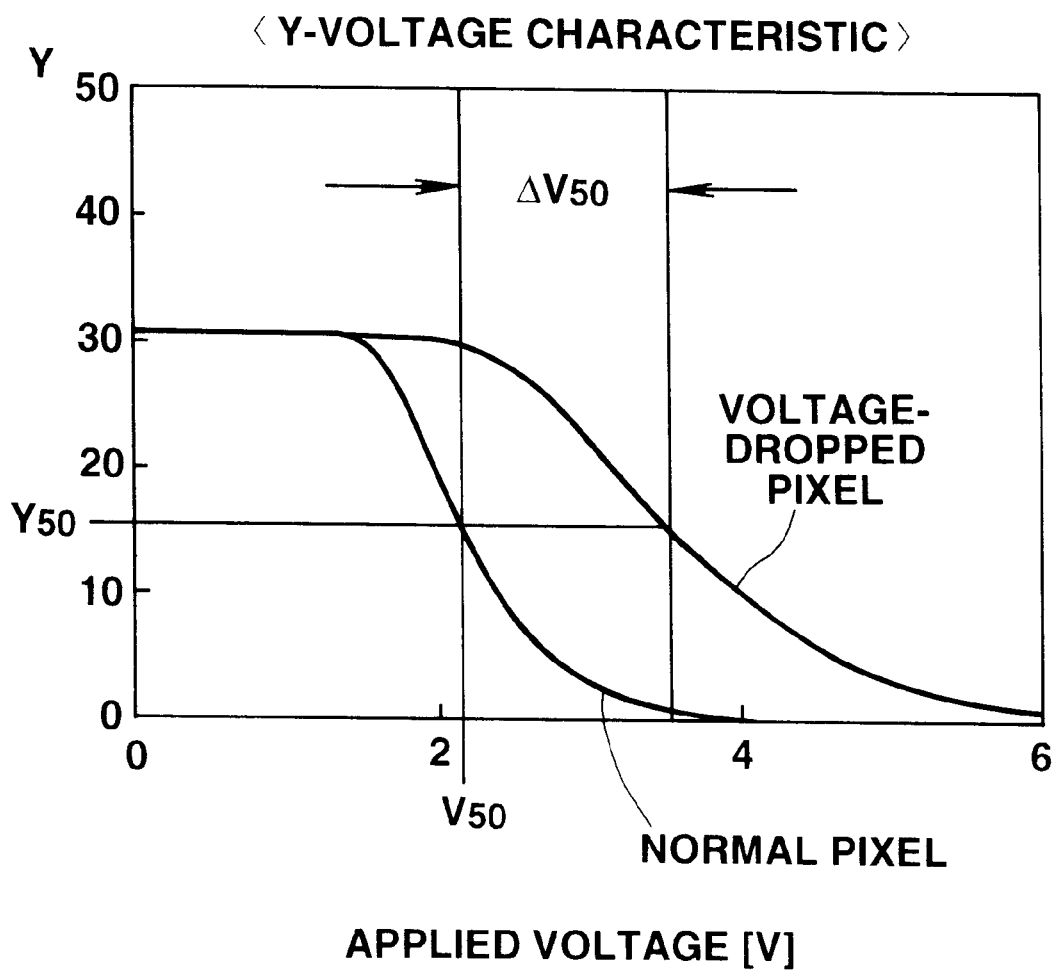
FIG. 8 is a diagram illustrating the relationship between the applied voltages and luminances Y of a normal pixel and a voltage-dropped pixel, and the definitions of V50 and ΔV50.

FIG. 8 presents a diagram for explaining the definitions of V50 and $\Delta Y50$.

The size (area) of each pixel of the LCD device is 100 to 200 $\mu$m×100 to 200 $\mu$m, for example, too small for human eyes to recognize each pixel. The display characteristic of the entire pixels is therefore determined by the average display characteristic of the normal pixel A1 and the voltage-dropped pixel A2 over the area.

The area ratio S which is ratio of the area S2 of the voltage-dropped pixel A2 to the entire area S1+S2 of one pixel is given by the following equation (6).

$$S = S2/(S1+S2) \quad (6)$$

With the relative dielectric constant $\epsilon i$ of the insulating film, constituted by the color filter 33 and the overcoat layer 34, being set to 3.5, the tendency of the 8-gradation view angle was analyzed while changing the thickness di of the insulating film and the area ratio S as indicated by "x" in the Table 1 below.

TABLE 1

| | | di$\mu$m | | | | | |
|---|---|---|---|---|---|---|---|
| | | 0.0 | 0.4 | 1.0 | 1.4 | 2.0 | 2.4 |
| S% | 30 | | | | x | | |
| | 40 | | | | x | | |
| | 50 | x | x | x | x | x | x |
| | 60 | | | | x | | |
| | 70 | | | | x | | |

The relative dielectric constant of the color filter 33 differs color by color of the RGB colors, and takes the values of $\epsilon R=3.4$, $\epsilon G=3.8$ and $\epsilon B=3.2$. In this analysis, the average value of those three was used as the relative dielectric constant $\epsilon i$. The relative dielectric constant of the overcoat layer 34 was also set to 3.5.

As the liquid crystal 13, a TN (Twisted Nematic) liquid crystal having the following physical properties (elastic constant ratio, dielectric anisotropy, and refractive wavelength dependency) was used.

i) Elastic constant ratio K3/K1=1.57
   K3/K2=1.89
   K1=10.6×10$^{-12}$N
ii) Dielectric anisotropy: $\Delta\epsilon/\epsilon\perp$=1.29
   $\epsilon\perp$=3.48
iii) Refractive wavelength dependency: Table 2

TABLE 2

| λ nm | ne | no |
|---|---|---|
| 400 | 1.5784 | 1.4984 |
| 500 | 1.5660 | 1.4886 |
| 590 | 1.5599 | 1.4840 |
| 600 | 1.5594 | 1.4836 |
| 700 | 1.5556 | 1.4806 | iv) Pre-tilt angle θ0=3°
v) Twist angle φ0=−90°
vi) Cell gap d=5 μm
vii) Δn·d=380 nm (λ=589 nm)
viii) Anchoring strength de/d=0 (strong anchoring)

A chiral agent having a natural pitch p=97 μm and d/p=0.052 was added by an amount of 1% to the nematic liquid crystal having the above physical properties.

The polarization plates 14 and 15 in use had the following properties.

i) Refractive wavelength dependency: Table 3

TABLE 3

| λ nm | ne | no | Ke | Ko |
|---|---|---|---|---|
| 400 | 2.2705 | 2.2705 | 0.0061 | 0.0008 |
| 500 | 1.6305 | 1.6305 | 0.0095 | 0.0001 |
| 590 | 1.6503 | 1.6503 | 0.0101 | 0.0002 |
| 600 | 1.6238 | 1.6238 | 0.0109 | 0.0002 |
| 700 | 1.6616 | 1.6616 | 0.0114 | 0.0001 | ii) Thickness dpol=35 μm
iii) Parallel transmittance T∥=34.12
iv) Orthogonal transmittance T⊥=0.019

First, with the area ratio S fixed to 50%, the thickness di of the insulating film constituted by the color filter 33 and the overcoat layer 34 was changed to 0.0, 0.4, 1.0, 1.4, 2.0 and 2.4. The average voltage drop ratio $\alpha_{AV}$, the average voltage stretch ratio $\beta_{AV}$ and ΔV50 are given in the following Table 4.

TABLE 4

| di/μm | 0.0 | 0.4 | 1.0 | 1.4 | 2.0 | 2.4 |
|---|---|---|---|---|---|---|
| $\alpha_{AV}$ | 0.0 | 0.11 | 0.23 | 0.29 | 0.37 | 0.42 |
| $\beta_{AV}$ | 0.0 | 0.12 | 0.30 | 0.42 | 0.60 | 0.72 |
| ΔV50 | 0.0 | 0.234 | 0.586 | 0.820 | 1.171 | 1.405 |

Figure 9:
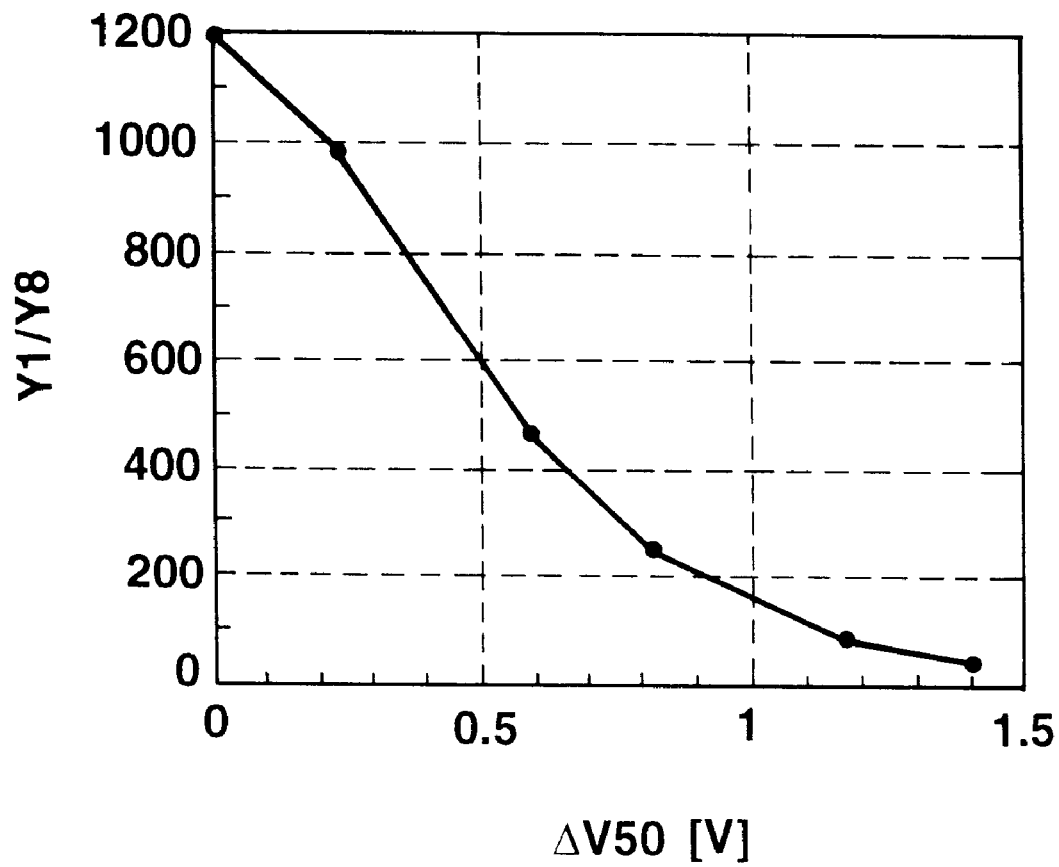
FIG. 9 is a diagram depicting a change in contrast when the area ratio S is fixed to 50% and ΔV50 is changed.
Figure 10A:
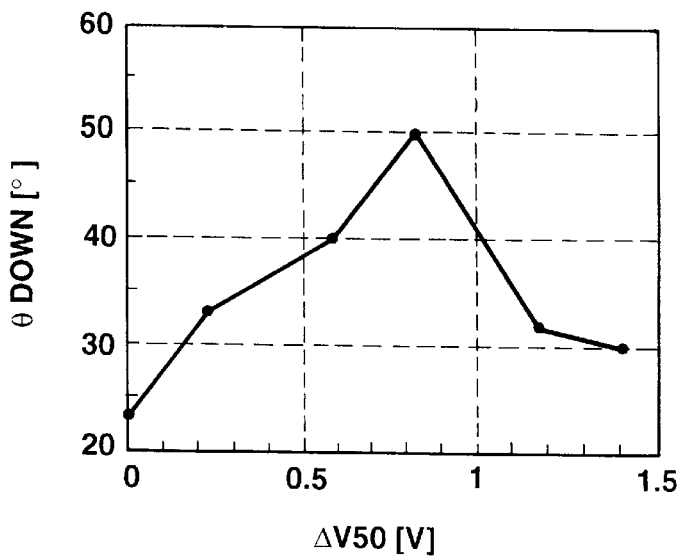
FIGS. 10A to 10C are diagrams showing a change in view angle θ when the area ratio S is fixed to 50% and ΔV50 is changed.
Figure 10B:
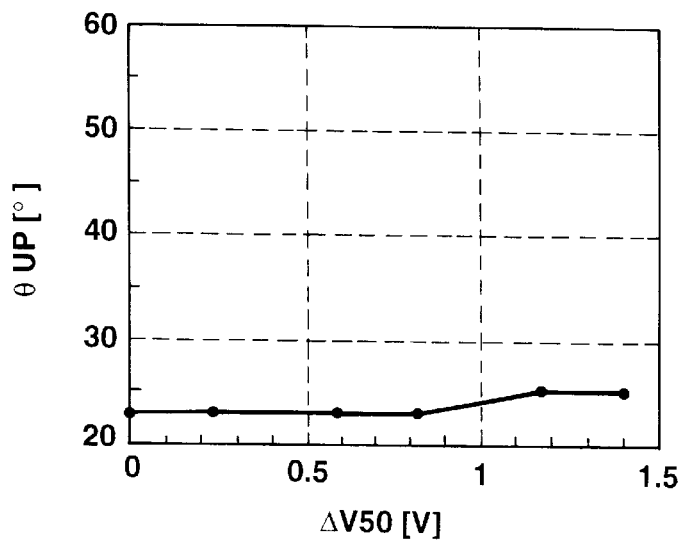
Figure 10C:
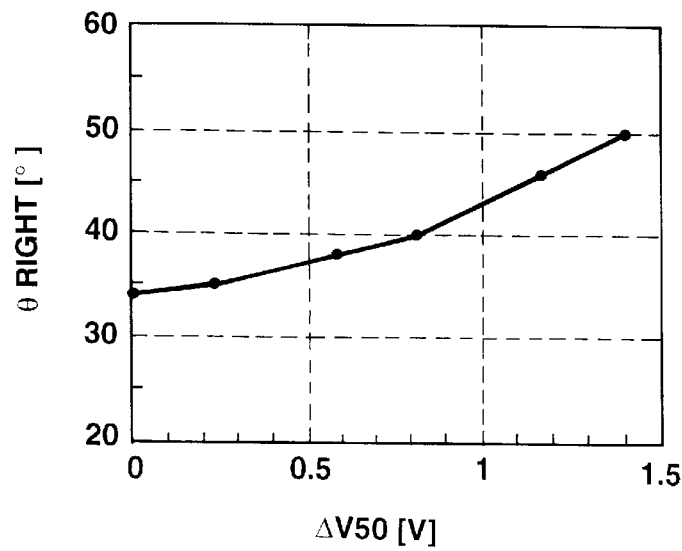

FIG. 9 shows the relationship between the display contrast and ΔV50, and FIGS. 10A to 10C show the relationship between the angle θ and ΔV50 by which the inversion of adjoining gradations occurs when an 8-gradation image is displayed, and the display was observed from downward, upward and rightward directions as defined in FIG. 5. The characteristic observed from the leftward direction is the same as that from the rightward direction.

Given that the luminance of the n-th gradation is Yn and the voltage then is Vn (n=1, 2, . . . , 8), the following definitions were used.

V1=1.5 V, V8=6.0 V, and contrast=Y1/Y8

The minimum angle (view angle) at which the inversion of the luminance Y occurs between adjoining gradations when one observes from the downward direction, upward direction and rightward direction are respectively θdown, θup and θright where θ is the angle formed by the normal line to the display surface of the LCD device and the line of sight.

As shown in FIG. 9, the contrast drastically decreases with an increase in ΔV50. This is because as ΔV50 increases, the Y-V curve of the voltage-dropped pixel A2 is stretched so that the black level falls to become whitish while the white level is kept at substantially the same level as the white level of the normal pixel.

As shown in FIG. 10A, the downward view angle θdown becomes more than double the view angle of the normal pixel (ΔV50=0) when ΔV50=0.820 V (23° is stretched to 50°). The thickness of the insulating film (33, 340) when ΔV50=0.820 V is 1.4 μm.

As shown in FIG. 10B, the upward view angle θup is hardly changed from that of the normal pixel.

As shown in FIG. 10C, the rightward view angle θright monotonously becomes wider as ΔV50 increases.

Next, the contrast and the view angle were measured when, with ΔV50 fixed to 0.820 V, the area ratio S was changed to 30%, 40%, 50%, 60% and 70%.

Figure 11:
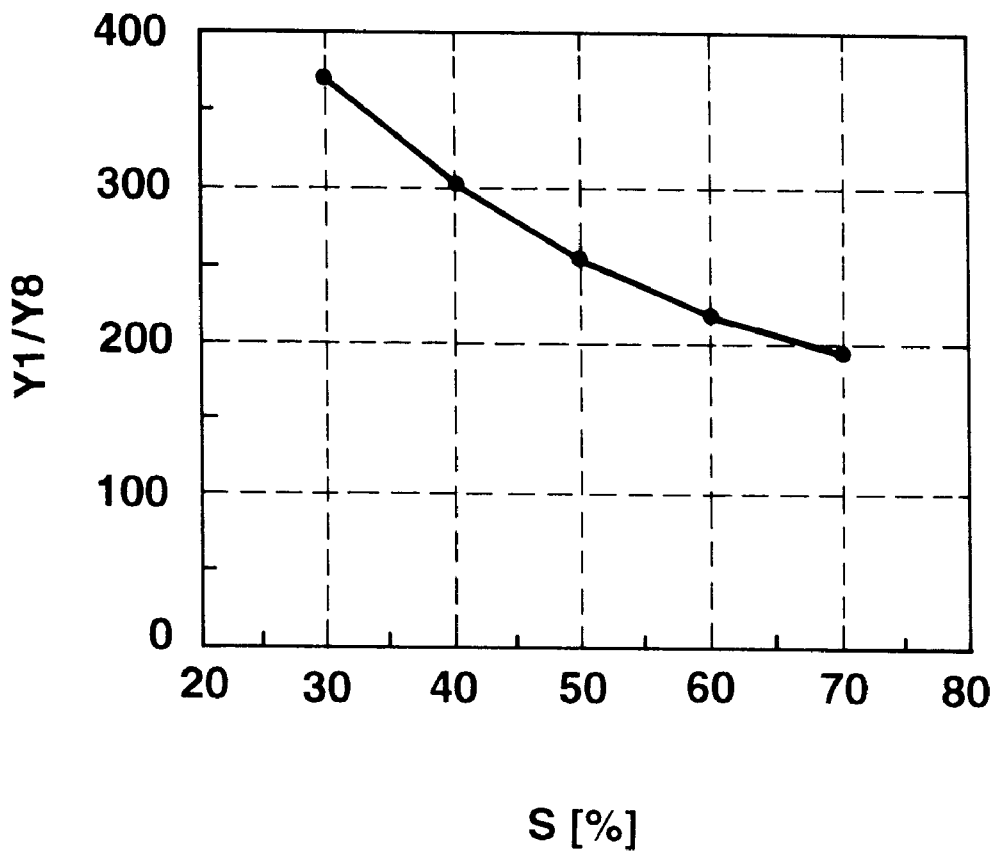
FIG. 11 is a diagram depicting a change in contrast when ΔV50 is fixed to 0.82 V and the area ratio S is changed.

FIG. 11 shows the relationship between the contrast and the area ratio S.

Figure 12A:
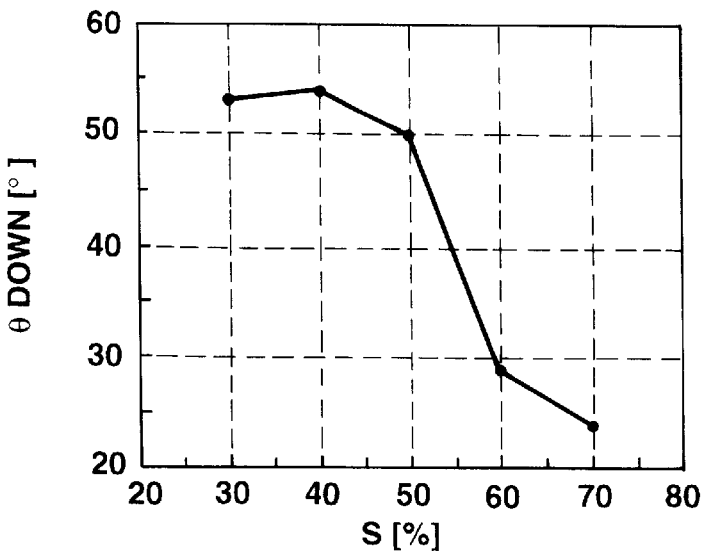
FIGS. 12A to 12C are diagrams showing a change in view angle θ when ΔV50 is fixed to 0.82 V and the area ratio S is changed.
Figure 12B:
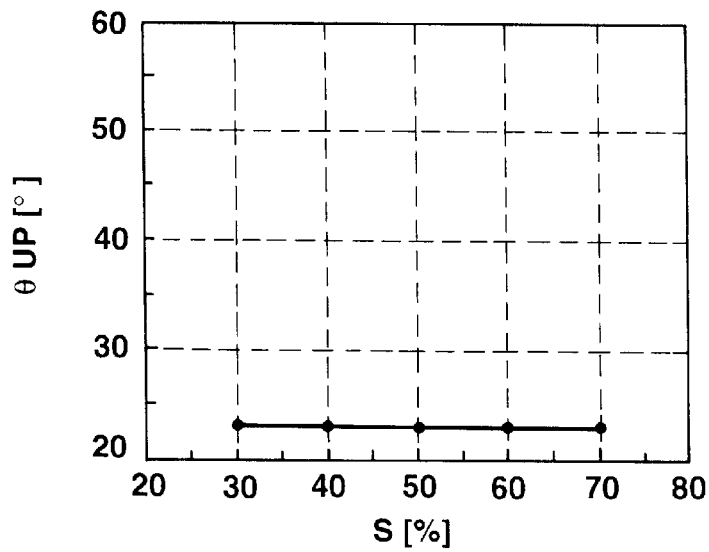
Figure 12C:
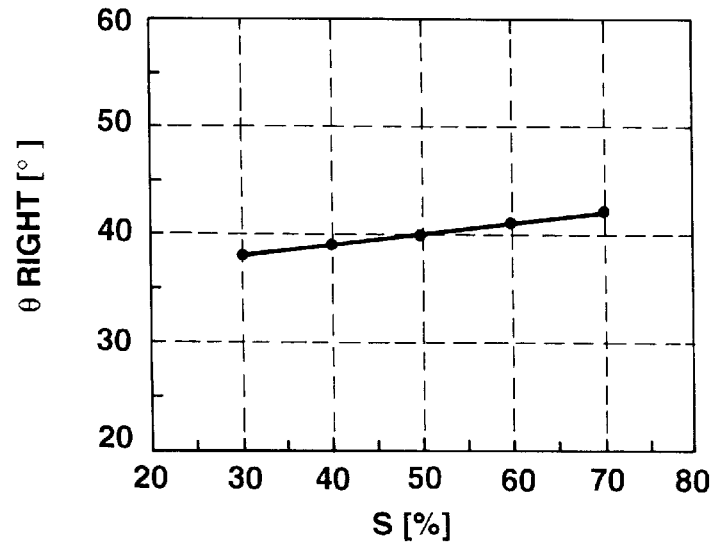
Figure 13A:
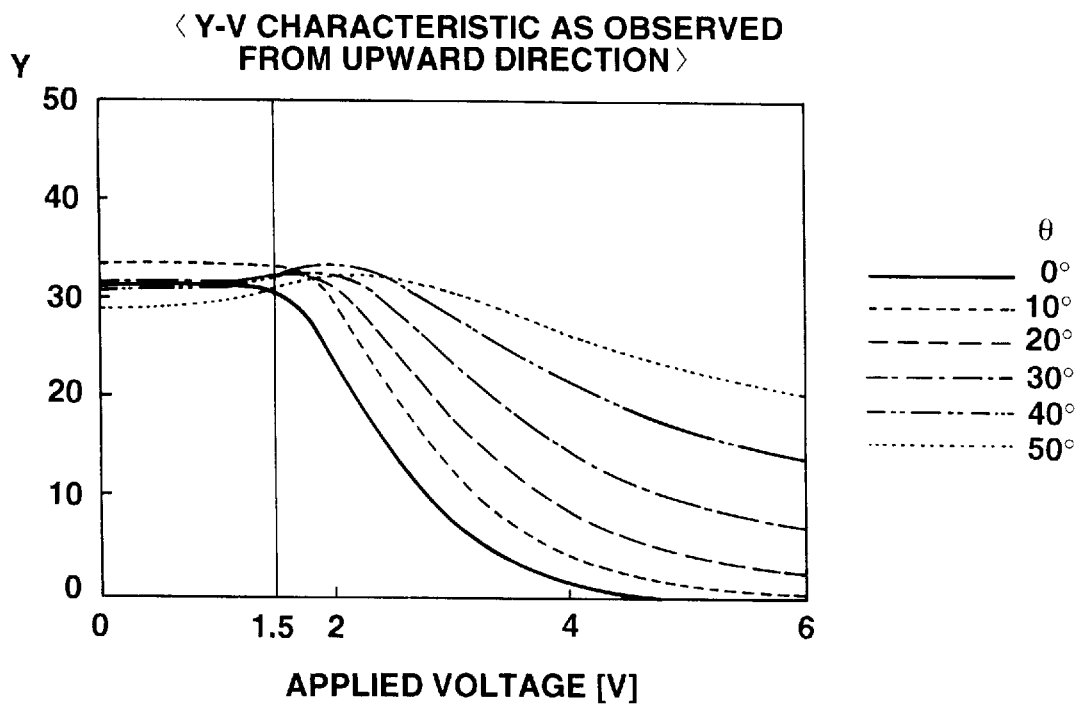
FIG. 13A through 14B are graphs showing the relationship between the applied voltage V and the luminance Y when ΔV50 is fixed to 0.82 V and the area ratio S is fixed to 40%.
Figure 13B:
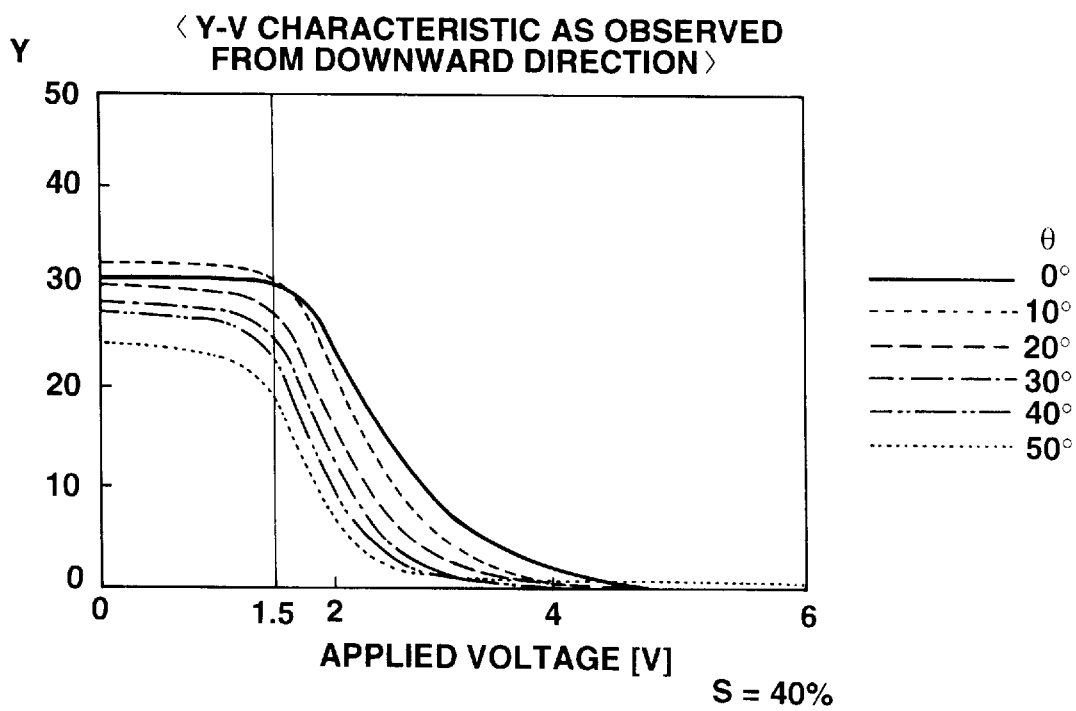
Figure 14A:
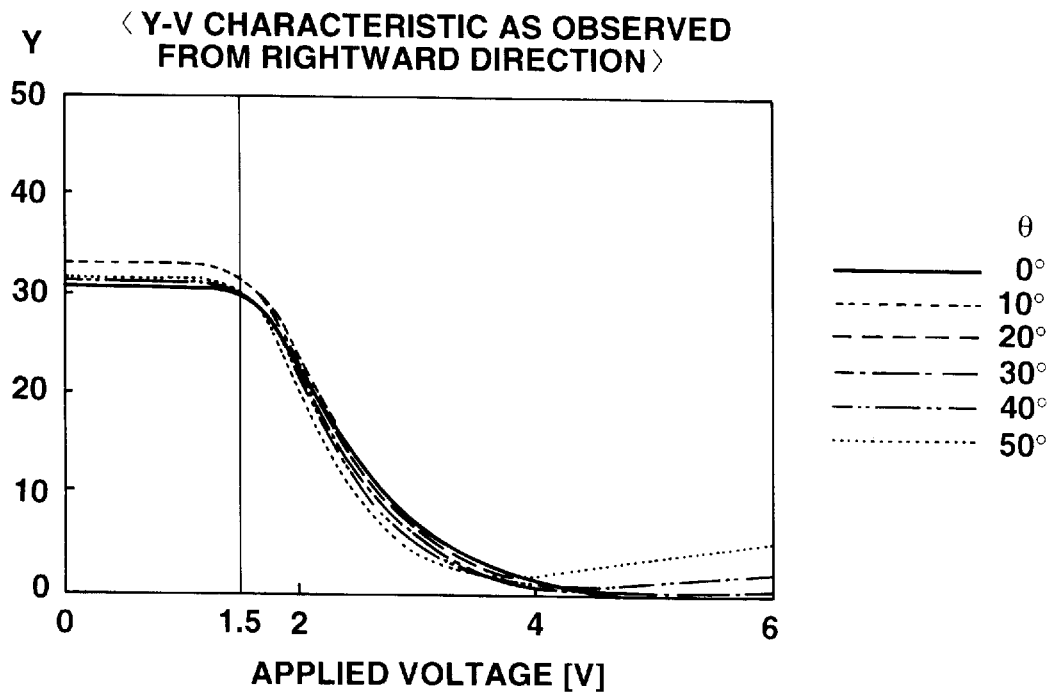
Figure 14B:
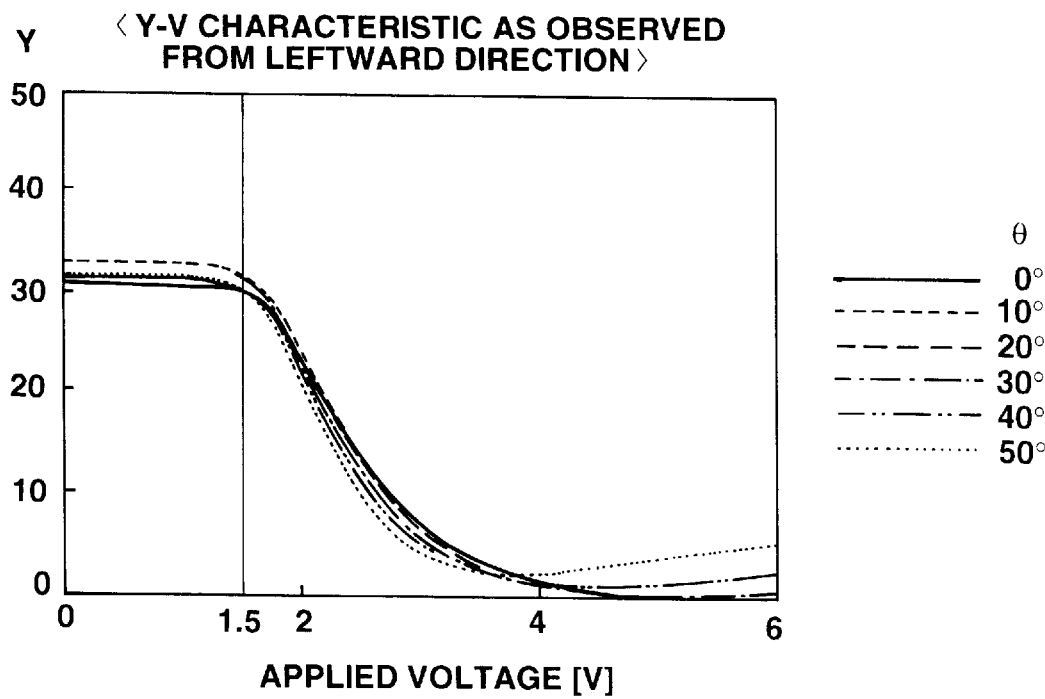

FIGS. 12A to 12C show the relationship between the angle (view angle) θ and the area ratio S by which the inversion of adjoining gradations occurs, as observed from the downward, upward and rightward directions. The characteristic in the leftward direction is the same as that in the rightward direction.

As shown in FIG. 11, the contrast Y1/Y8 decreases with an increase in area ratio S. This is because as the area ratio S increases, the ratio of the voltage-dropped pixel A2 occupying each pixel increases.

As shown in FIG. 12A, the downward view angle θdown becomes maximum=54° when S=40%.

As shown in FIGS. 12B and 12C, the upward and rightward view angles θup and θright hardly change even when the area ratio S changes.

The view angles when S=0% and S=100% are the same as those of the normal pixel A1.

From the above analysis of the tendency of the 8-gradation view angle, it can be concluded that the optimum values of the thickness of di of the insulating film and the area ratio S are 1.4 μm and maybe 30 to 50% respectively in order to obtain the optimum value (maximum value) of the downward view angle θdown.

The contrast in this case becomes a quarter of that of the normal pixel (1190 reduced to 302).

FIGS. 13A, 13B, 14A and 14B show the characteristics of the luminance Y and applied voltage of the optimized LCD device (ΔV50−0.820 V, thickness of insulating film (33, 34)=1.4 μm and S=40%) for each angle θ of the line of sight (hereinafter called "sight angle") when observed from the upward, downward, rightward and leftward directions. Likewise, FIGS. 15A, 15B, 16A and 16B show the log Y-applied voltage characteristics for the individual sight angles (angles formed by the lines of sight and the normal line to the screen) θ when the display is observed from the upward, downward, rightward and leftward directions.

Figure 17A:
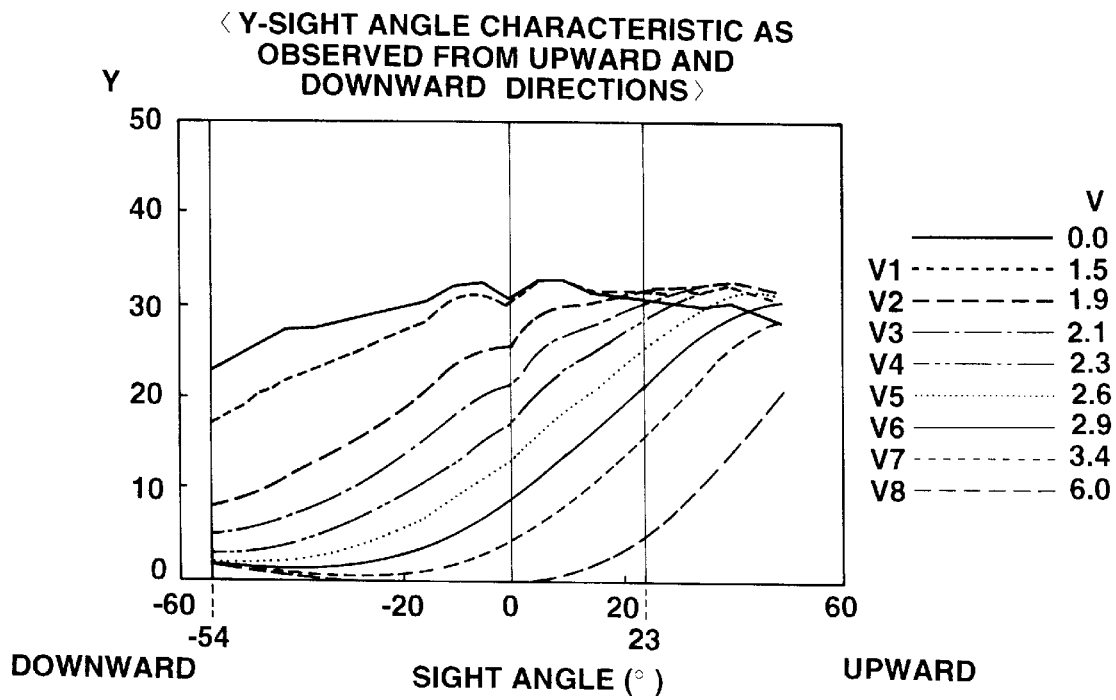
FIG. 17A and 17B are graphs showing the relationship between the angle of the line of sight (sight angle) and the luminance Y when ΔV50 is fixed to 0.82 V and the area ratio S is fixed to 40%.
Figure 17B:
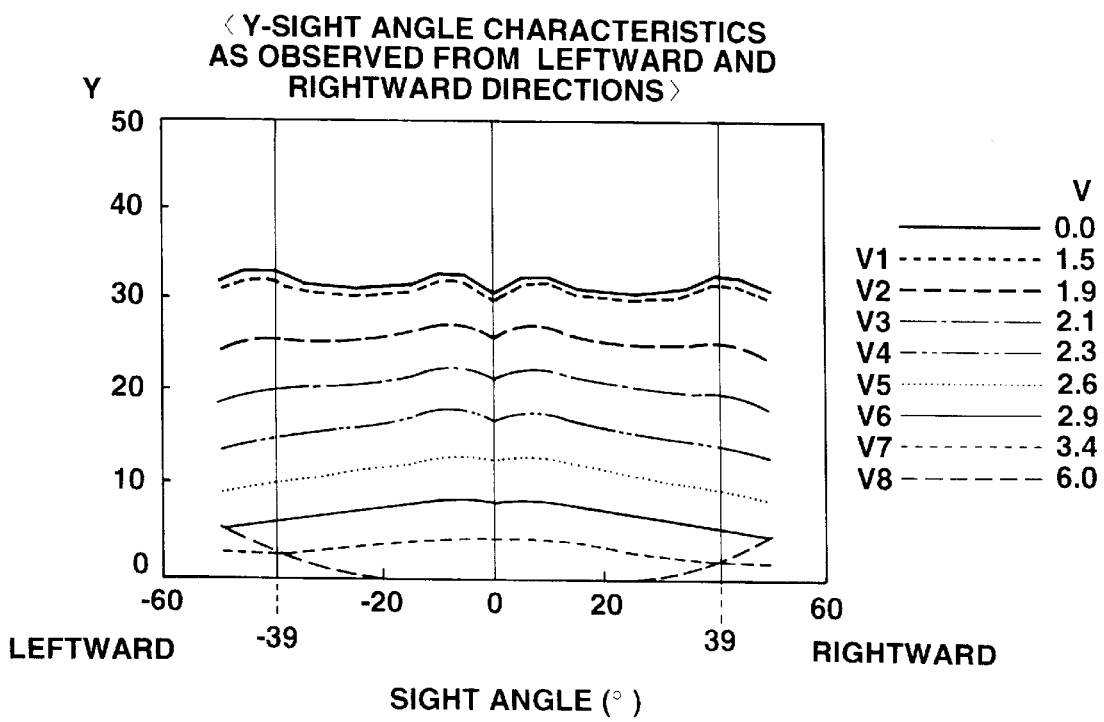
Figure 18A:
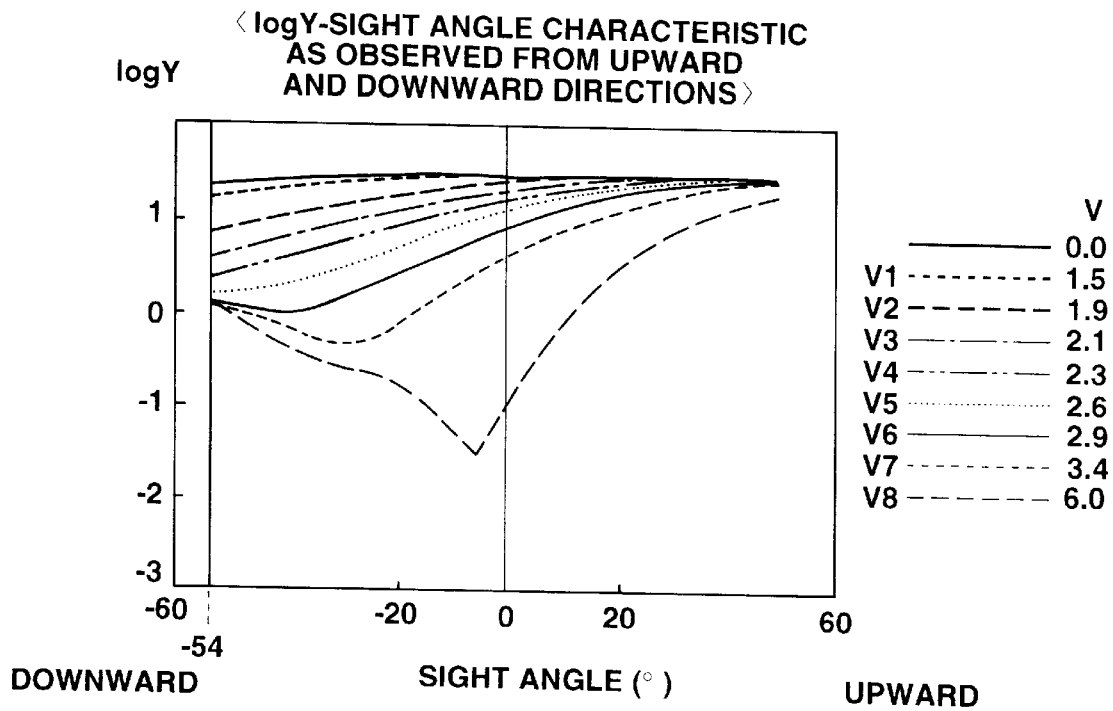
FIG. 18A and 18B are graphs showing the relationship between the sight angle and the logarithm of the luminance Y when ΔV50 is fixed to 0.82 V and the area ratio S is fixed to 40%.
Figure 18B:
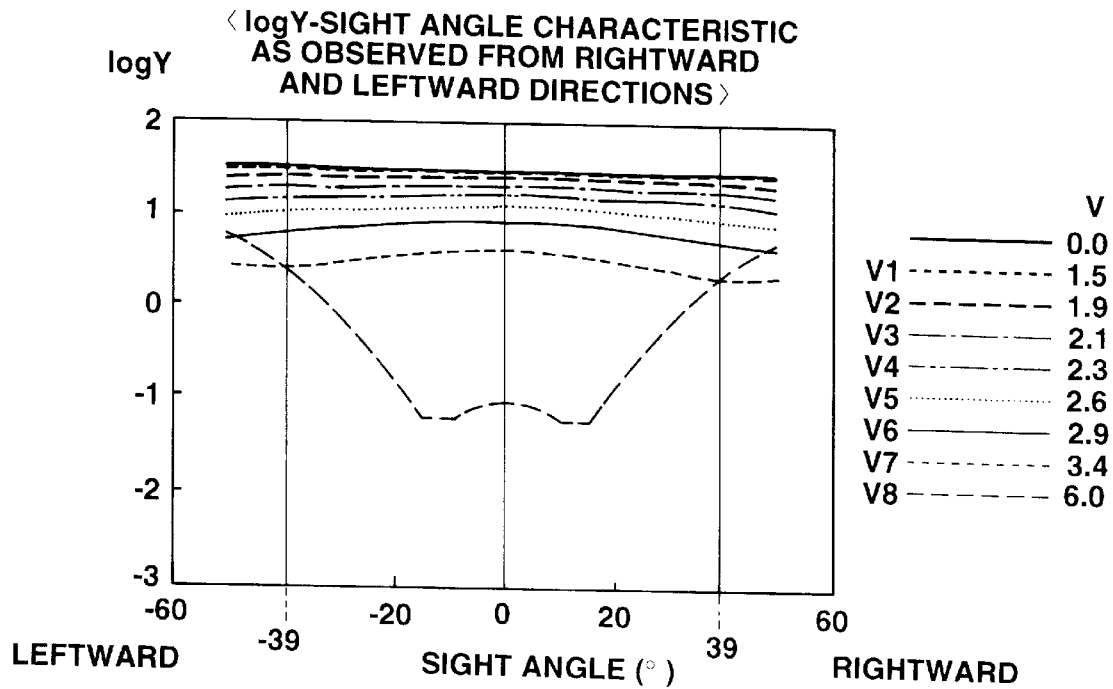
Figure 19A:
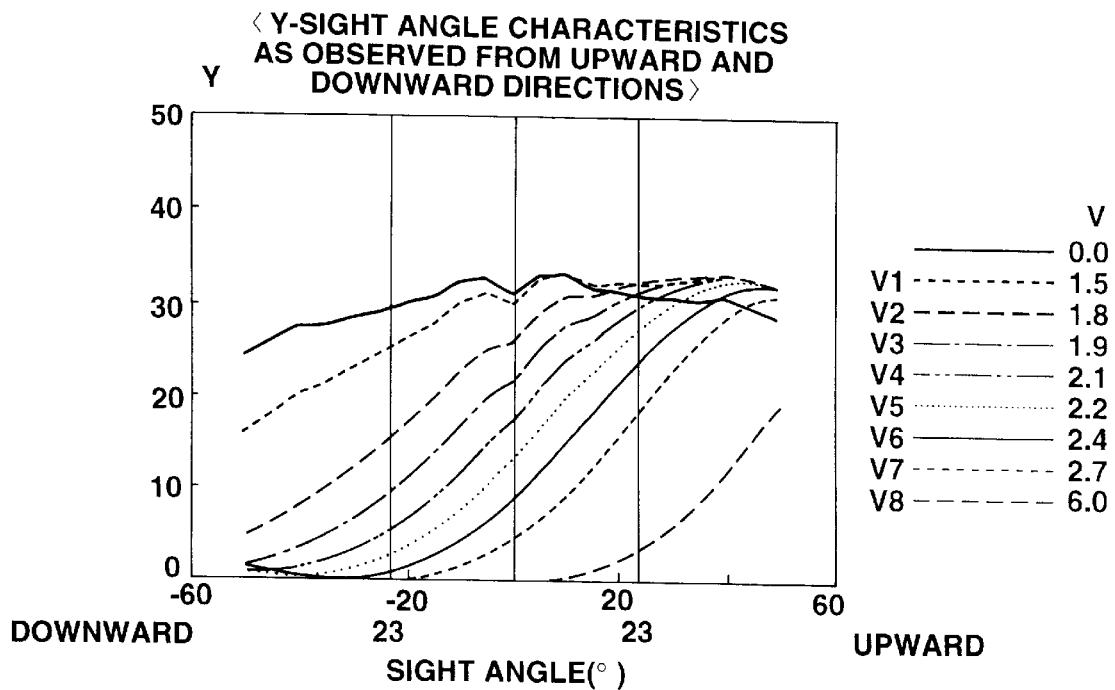
FIG. 19A and 19B are graphs showing the relationship between the sight angle and the luminance Y of a normal pixel.
Figure 19B:
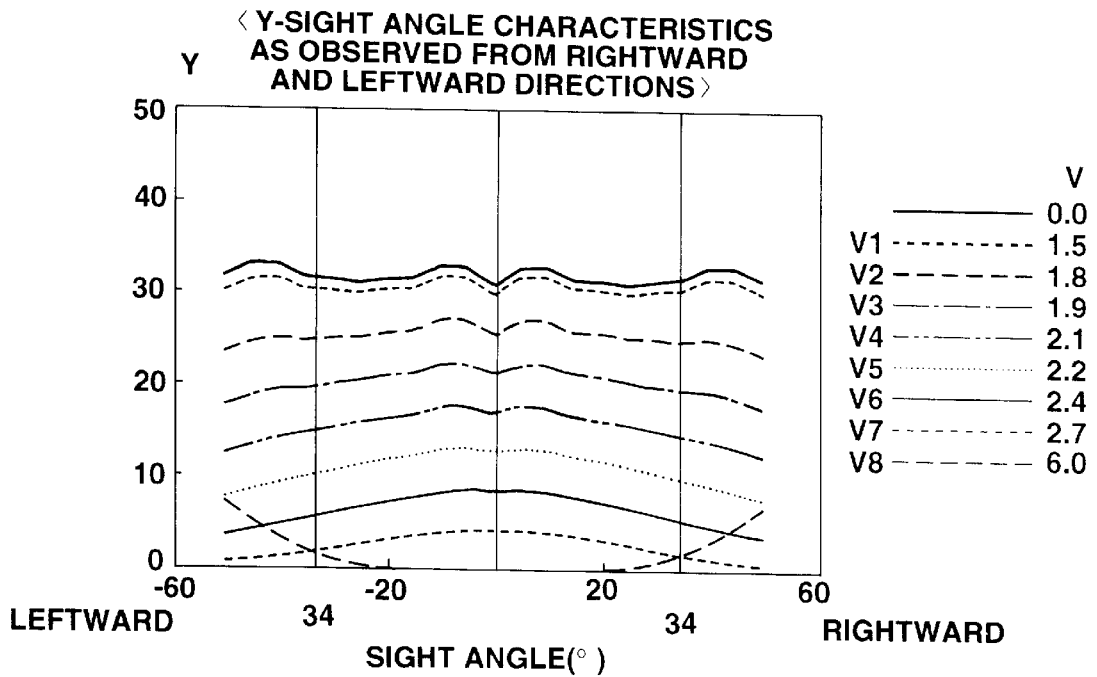
Figure 20A:
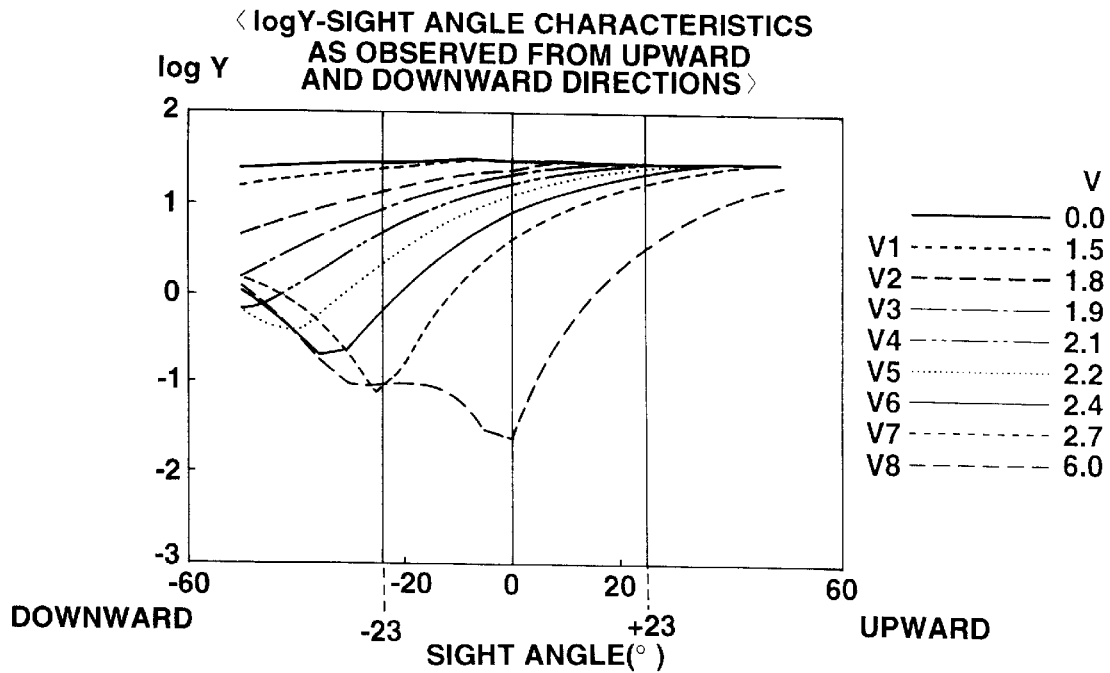
FIG. 20A and 20B are graphs showing the relationship between the sight angle and the logarithm of the luminance Y of a normal pixel.
Figure 20B:
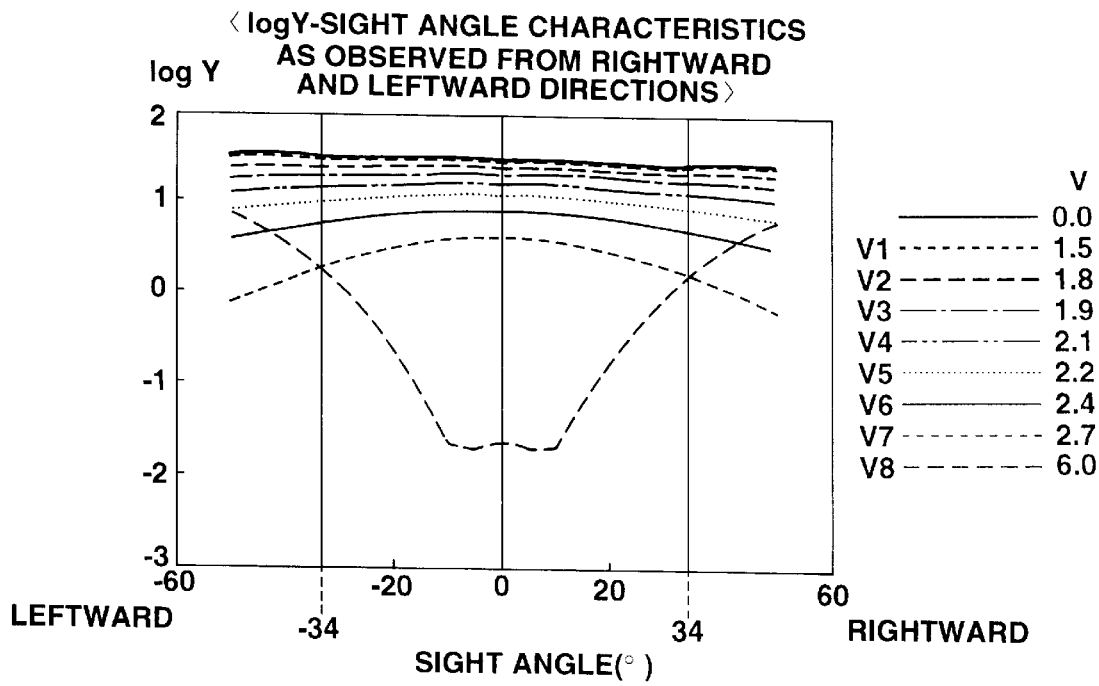

FIGS. 17A and 17B show the characteristics of the luminance Y and sight angle of the optimized LCD device for the individual applied voltages when the LCD device is observed from the upward and downward directions and the rightward and leftward directions. Likewise, FIGS. 18A and 18B show the log Y-sight angle characteristics for the individual applied voltages, as observed from the upward and downward directions and the rightward and leftward directions.

Figure 15A:
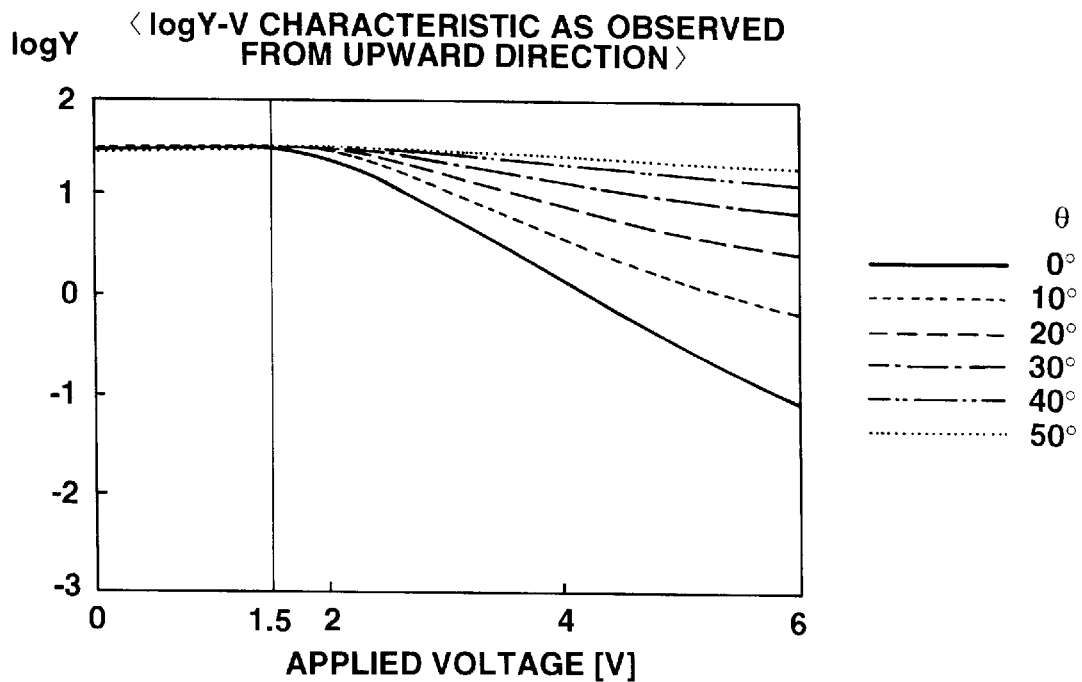
FIG. 15A through 16B are graphs showing the relationship between the applied voltage V and the logarithm of the luminance Y when ΔV50 is fixed to 0.82 V and the area ratio S is fixed to 40%.

In the upward direction, as shown in FIG. 15A, as the sight angle θ increases, the luminance Y increases, making the black level whitish. But, the gradation inversion is not prominent (the gradation inversion does not occur as long as the Y-V curve is a monotonous decreasing function).

Figure 15B:
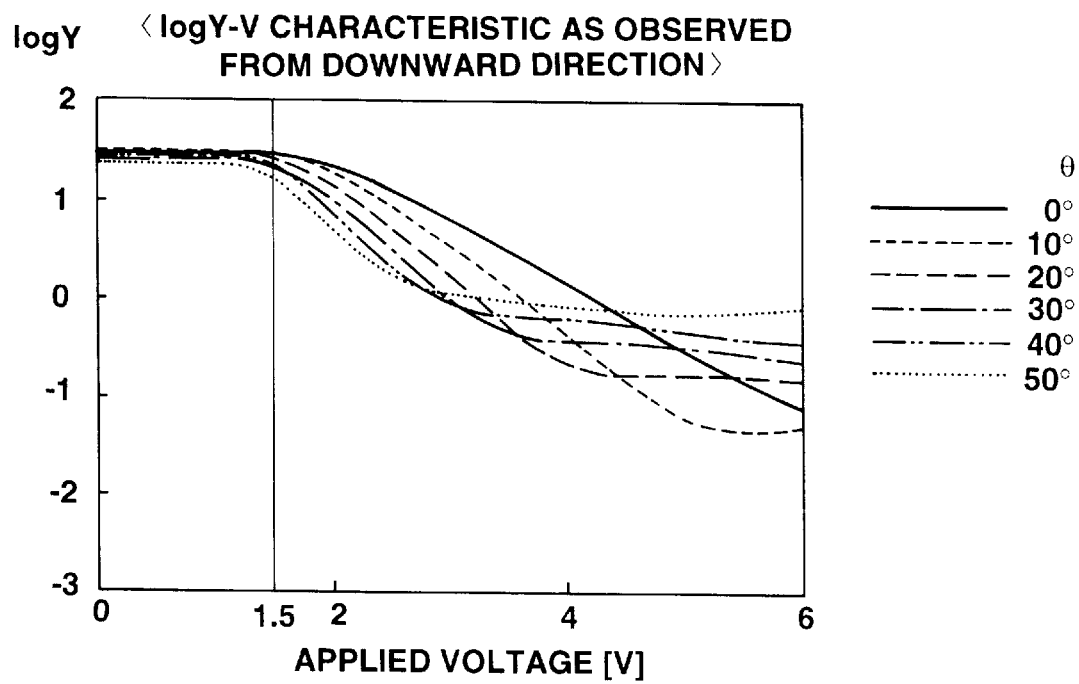

In the downward direction, as shown in FIG. 15B, as the sight angle θ increases, the luminance Y decreases. But, the gradation inversion does not occur because the Y-V curve for the sight angle of 50° does not have a bump in the intermediate gradation.

Figure 16A:
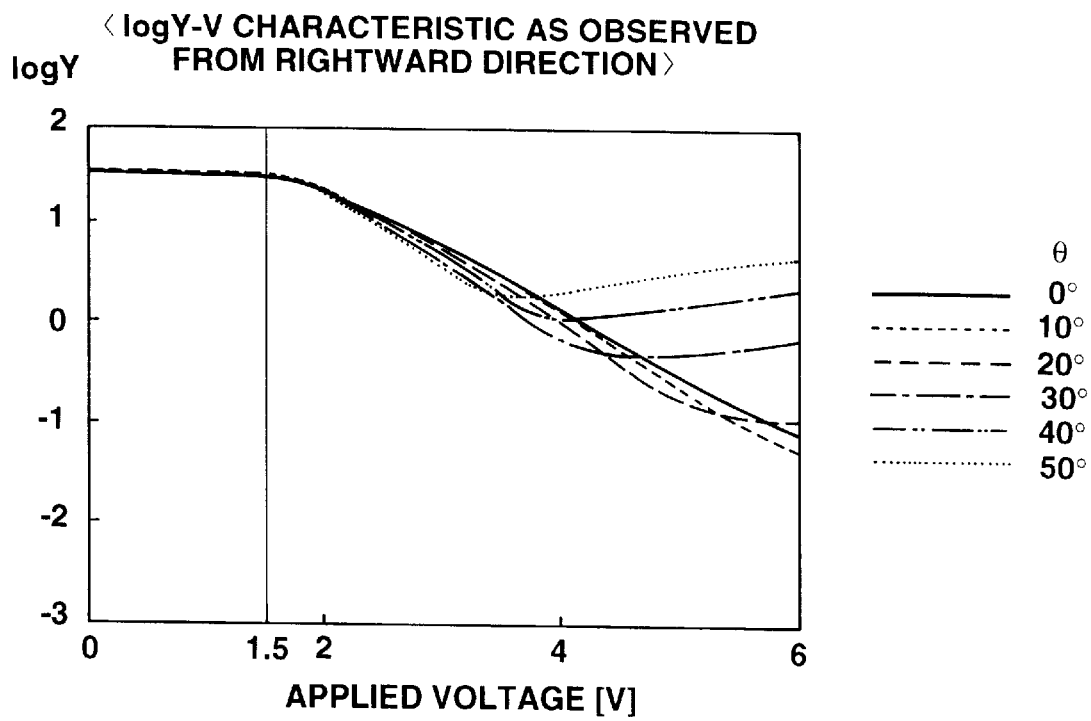
Figure 16B:
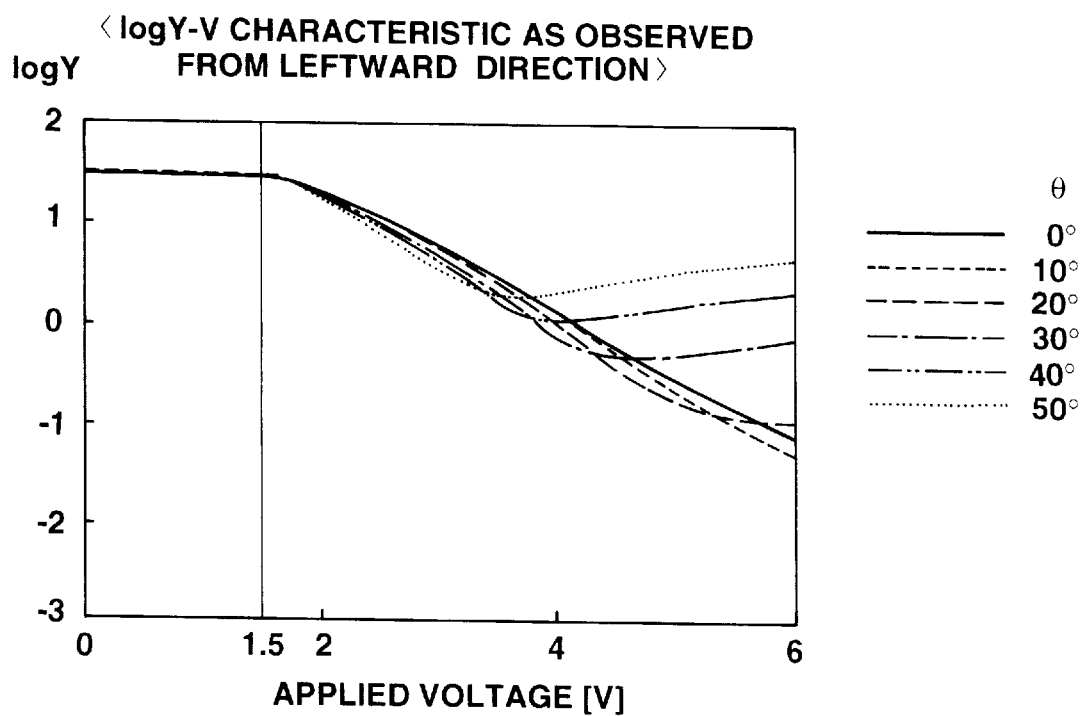

As shown in FIGS. 16A and 16B, in both the rightward and leftward directions, as the sight angle θ increases, the luminance Y decreases. But, the Y-V curve for the sight angle of 50° becomes shallower at the intermediate gradation voltage and the bump at the voltage of about 6 V is suppressed (see the log Y-voltage curves given in FIGS. 18A and 18B).

In FIGS. 12 and 13, the 8-gradation voltages are defined as follows.

The bright-state voltage is 1.5 V and the dark-state voltage is 6.0 V.

Six intermediate gradation voltages are what is obtained by equally dividing the luminance Y at 1.5 V by seven. The eight voltages are called V1, V2, . . . , V8 from the lowest one.

FIGS. 17A and 17B and FIGS. 18A and 18B respectively show the characteristics of the luminances Y1, . . . , Y8 and the sight angles and the characteristics of the logarithm values of the luminances and the sight angles, when the voltage to be applied between the pixel electrodes 22 and the opposing electrode 31 and the overlying electrode 35 is fixed to V1 to V8. It is understood from FIGS. 17A to 18B that the following are the areas of the sight angle which can provide the proper luminance order of the eight gradations.

Upward and downward: −54° to +23°
(−: down and +: up)
Rightward and leftward: −39° to +39°
(−: left and +: right)

FIGS. 19A and 19B and FIGS. 20A and 20B respectively show the characteristics of the luminances and the sight angles and the characteristics of the logarithm values of the luminances and the sight angles, when a pixel is not segmented (when the overlying electrode 35 is not provided). As shown in FIGS. 19A to 20B, for the pixels with the ordinary structure, the following are the areas of the sight angle which can provide the proper luminance order of the eight gradations.

Upward and downward: −23° to +23°
(−: down and +: up)
Rightward and leftward: −34° to +34°
(−: left and +: right)

According to this embodiment, as apparent from the above, the downward view angle is improved significantly.

Figure 21:
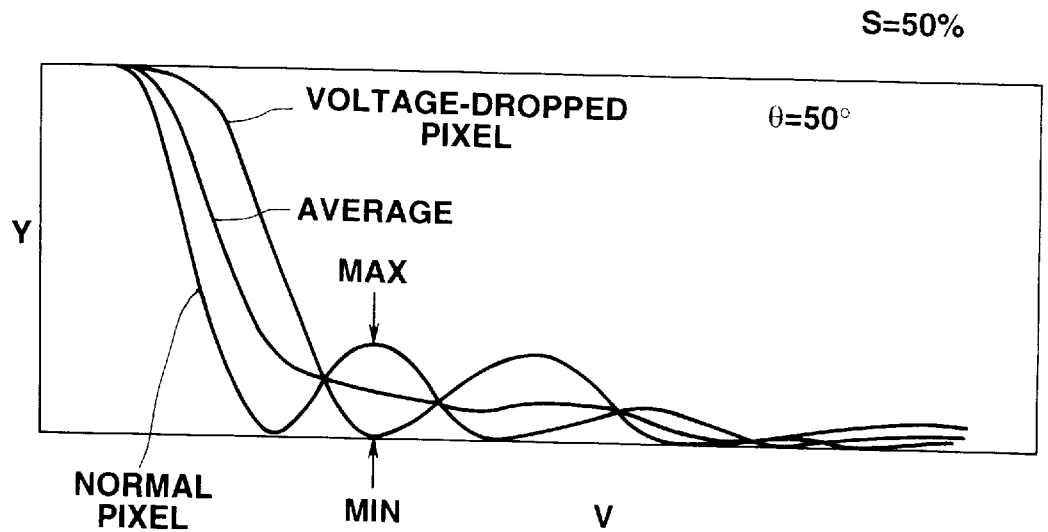
FIG. 21 is a graph for explaining why this invention can widen the view angle.

The reason for the improvement particularly on the downward view angle will be given below with reference to FIG. 21.

Let us consider the Y-V curves of the normal pixel A1 and the voltage-dropped pixel A2 when S=50% and the downward sight angle θ=50°.

As mentioned earlier, the Y-V curve of the normal pixel A1 has a peak at one intermediate gradation voltage $V_{MAX}$.

If the thicknesses of the color filter 33 and overcoat layer 34 are selected in such a way as to match the voltage $V_{MIN}$, which gives the minimum value to the Y-V curve of the voltage-dropped pixel A2, with $V_{MAX}$ to average the Y-V curves of both subpixels, the maximum and minimum values interfere with each other, causing the bump to vanish. In this manner, the Y-V curve of each pixel becomes a monotonous decreasing function, avoiding the gradation inversion.

A description will now be given of the method of manufacturing a LCD device having the above-described structure.

First, the TFT's 21, the pixel electrodes 22 and the alignment film 23 are formed on the TFT substrate 11 and he resultant structure is subjected to an aligning treatment such as rubbing in a predetermined direction.

A transparent conductive member of ITO or the like is formed on the opposing substrate 12 by sputtering, thus forming the opposing electrode 31. Next, the light-shielding metal or the like is sputtered and patterned to form the black mask (black matrix) 32.

Then, the color filter 33 (33R, 33G and 33B) is formed by printing, dyeing or the like.

Further, an insulating film of $SiO_2$, SiN or the like is deposited about 1 μm on the color filter 33, forming the overcoat layer 34.

The peripheral portion of the overcoat layer 34 is patterned to expose the peripheral portion of the opposing electrode 31 (the connection portion of the overlying electrode 35).

Subsequently, a transparent conductive member of ITO or the like is deposited on the overcoat layer 34 by sputtering or the like. This transparent conductive member is patterned to form the overlying electrode 35. At this time, the patterning mask is formed in such a way that the area ratio S becomes 30 to 50%.

Then, the alignment film 36 of polyimide or the like is formed on the overlying electrode 35 and the overcoat layer 34, and an aligning treatment in a predetermined direction is performed.

Next, the TFT substrate 11 and the opposing substrate 12 are connected via a spacer and seal member SC so as to provide a cell gap of 5 to 6 μm, thereby forming the LC cell 16. The liquid crystal 13 is injected into the LC cell 16 using vacuum injection or the like.

Thereafter, the polarization plates 14 and 15 are properly arranged to complete the LCD device.

This invention is not limited to the above-described embodiment, but may be modified and adapted in various forms.

Figure 22:
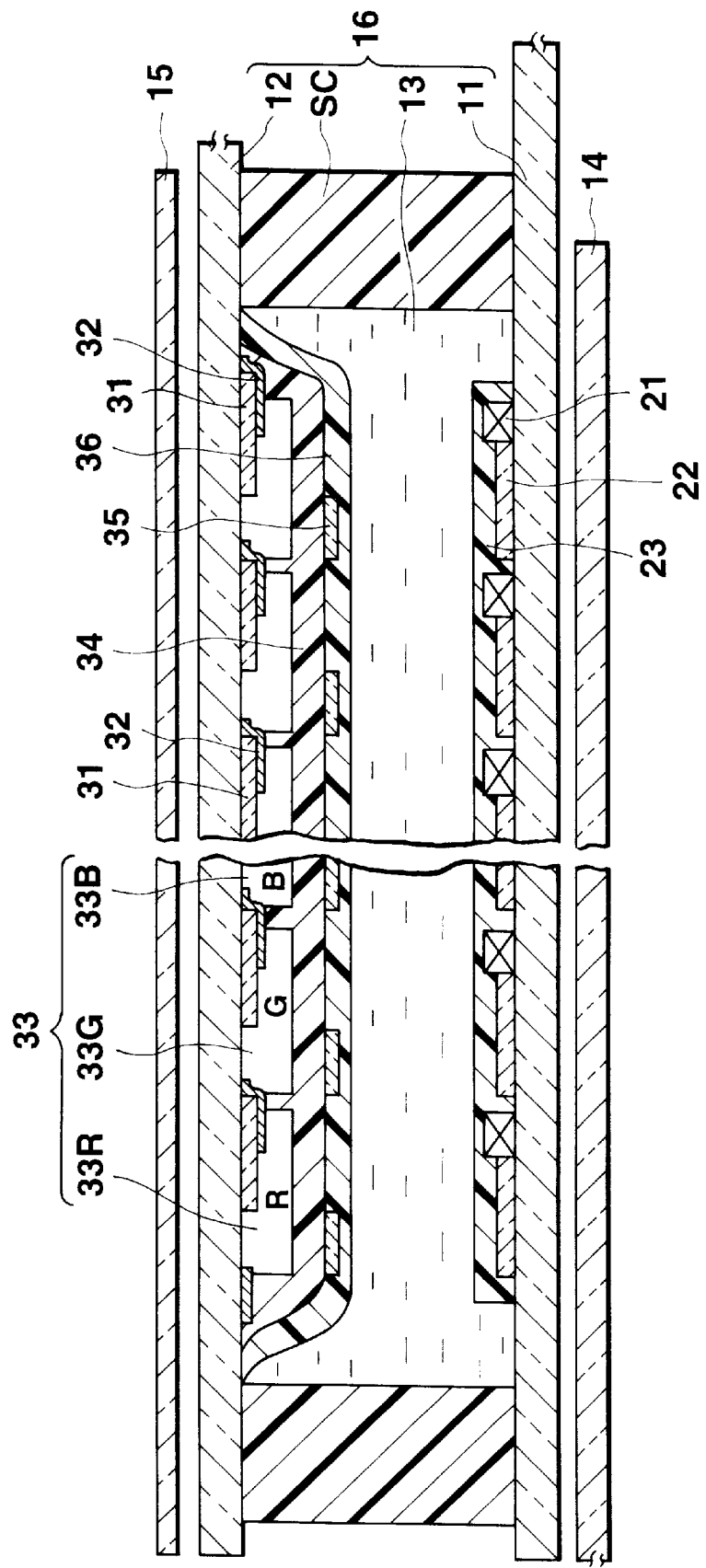

In the above-described embodiment, the underlying electrode 31 is formed on the entire pixel surface so that ITO is present on two layers, the opposing electrode (underlying electrode) 31 and the overlying electrode 35, on the opposing substrate 12. The transmittance may decrease in the portion where ITO is present in two layers. As shown in FIG. 22, therefore, the opposing electrode 31 may be removed from the area of the normal pixel A1.

With this structure, there is only one ITO-containing layer in the normal pixel A1 and the voltage-dropped pixel A2. Therefore, the transmittance of each pixel is higher than the transmittance of the pixel whose structure is shown in FIG. 1, and the display becomes brighter. What is more, the same advantages as those of the above-described embodiment are obtained with respect to the view angle.

Figure 23:
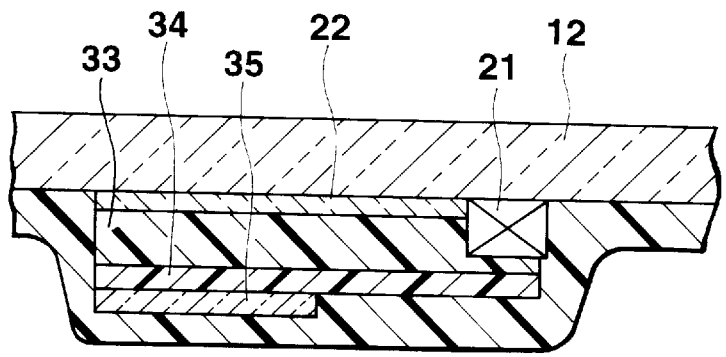
FIGS. 22 and 23 are cross-sectional views showing modifications of the color LCD device shown in FIG. 1.

As shown in FIG. 23, the overlying electrode 35 may be formed on the overcoat layer 34 after forming the color filter 33 and overcoat layer 34 on the pixel electrodes 22.

The direction of the aligning treatment to be performed on the upper and lower alignment films 23 and 36 and the arrangement of the transmission axes of the polarization plates 14 and 15 are not limited to those of this embodiment described above, but may be modified as needed. For example, the transmission axis of the polarization plate 14 on the light-incident side may be set parallel to the direction of the aligning treatment for the lower alignment film 23. Further, the transmission axis of the polarization plate 15 on the light-outgoing side may be set parallel to the transmission axis of the lower polarization plate 14.

Application Example 1

Although the dielectric constant of the color filter 33 and/or the dielectric constant of the overcoat layer 34 is set to 3.5 in the above-described embodiment, when those dielectric constants are too high or too low, the advantage of widening the view angle becomes smaller. For example, the dielectric constant of the color filter 33 and/or the dielectric constant of the overcoat layer 34 is too high, the voltage drop at the color filter 33 and/or the voltage drop at the overcoat layer 34 is small. Therefore, the difference between the voltage applied to the liquid crystal 13 of the normal pixel A1 and the voltage applied to the liquid crystal 13 of the voltage-dropped pixel A2 becomes smaller and the view angle does not become wider much.

In those cases, the view angle can be improved by adjusting (increasing or decreasing) the dielectric constant of the color filter 33 and/or the dielectric constant of the overcoat layer 34. If the dielectric constant of the color filter 33 and/or the dielectric constant of the overcoat layer 34 is reduced, for instance, the voltage drops at the color filter 33 and the overcoat layer 34 become greater than those in the case where such dielectric constants are not reduced. The difference between the voltage applied to the liquid crystal 13 of the normal pixel A1 and the voltage applied to the liquid crystal 13 of the voltage-dropped pixel A2 becomes greater. This results in an increased difference in the alignment state of the LC molecules between the normal pixel A1 and the voltage-dropped pixel A2, thus widening the view angle.

The dielectric constant of the color filter 33 and/or the dielectric constant of the overcoat layer 34 can be reduced in the following manner.

First, the opposing substrate 12 on which the underlying electrode 31, black mask 32 and color filter 33 are formed is dipped in an acidic solution (pH 1 to 6) or an alkaline solution (pH 8 to 14) for several seconds. The molecular structure of the color filter 33 is denatured in accordance with the property of the solution, and the dielectric constant changes. When the dielectric constant of the color filter 33 becomes the desired value, the opposing substrate 12 is pulled up and cleaned and the overcoat layer 34 is then formed on the color filter 33. Then, the opposing substrate 12 is dipped in an acidic or alkaline solution for several seconds to adjust the dielectric constant of the overcoat layer 34. Then, the opposing substrate 12 is pulled up and cleaned, followed by the formation of the overlying electrode 35 and the alignment film 36.

The thus prepared opposing substrate 12 and the TFT substrate 11 on which the pixel electrodes 22 and the alignment film 23 are formed are connected together via the seal member SC, thus forming the LC cell 16. Then, the liquid crystal 13 is injected into the LC cell 16 using vacuum injection or the like. Finally, the polarization plates 14 and 15 are arranged on both sides of the LC cell 16 to complete the LCD device.

The dielectric constant of only one of the color filter 33 and the overcoat layer 34 may be adjusted.

This manufacturing method requires no increased manufacturing step on the side of the TFT substrate 11 which is difficult to manufacture, but just involves a slight increase in the manufacturing steps on the side of the opposing substrate 12. This facilitates the manufacturing of the LCD device. Further, the voltage drops at the color filter 33 and the overcoat layer 34 can be set to the optimum values to ensure a wide view angle, as mentioned earlier.

The dielectric constant of the color filter 33 and/or the dielectric constant of the overcoat layer 34 may be adjusted by using other schemes.

For instance, it is possible to dip the color filter 33 and/or overcoat layer 34 into a solution where a dielectric-constant adjusting agent such as azobenzen to control the dielectric constant of the color filter 33. More specifically, after forming the color filter 33 on the opposing substrate 12, this opposing substrate 12 is dipped in a solution of a dielectric-constant adjusting agent, and the amount of the permeation of the dielectric-constant adjusting agent into the color filter 33 is controlled to set the dielectric constant of the color filter 33 to the optimum value by adjusting the dipping time and the concentration of the solution. The dielectric constant of the overcoat layer 34 can be adjusted similarly.

The dielectric constant of the color filter 33 may be changed by denaturing the film property by heating the color filter 33 for several seconds to several hours at a temperature of, for example, 100° C. or above. The heat treatment denatures the film property of the color filter 33 to change the dielectric constant thereof. The dielectric constant of the overcoat layer 34 may be adjusted by a similar heat treatment.

The dielectric constant of the color filter 33 may be changed by subjecting the opposing substrate 12 to a decompression treatment. In this case, the opposing substrate 12 with the color filter 33 formed thereon is placed in a decompression chamber for decompression for several seconds to several hours at a low pressure of, for example, 0.1 Pa or below. This decompression denatures the film property of the color filter 33 to change the dielectric constant thereof. The dielectric constant of the overcoat layer 34 may be adjusted by a similar decompression treatment.

The dielectric constant of the color filter 33 may be adjusted by mixing a material for adjusting the dielectric constant in the base member of the color filter 33 and changing the amount of this material and the property thereof.

In this case, for example, color-less transparent dielectric-constant adjusting agent is mixed as the composition of the acrylic resist agent constituting the color filter 33 in addition to lighting initiator, monomer, binder, pigment and solvent, and coating, exposure and etching are repeated to form the color filter 33. Subsequently, the opposing substrate 12 on which the color filter 33 is formed is heated at a high temperature of 100° C. or above for several seconds to several hours to denature the dielectric-constant adjusting agent or partially volatilize the dielectric-constant adjusting agent, thereby adjusting the dielectric constant of the color filter 33.

The dielectric constant of the overcoat layer 34 may be adjusted by mixing the dielectric-constant adjusting agent in the overcoat layer 34 and subjecting this dielectric-constant adjusting agent to a heat treatment to be denatured or volatilized.

The dielectric constant of the color filter 33 may be changed by mixing a dielectric-constant adjusting agent in the base member of the color filter 33 and decompressing the opposing substrate 12. In this case, for example, the dielectric-constant adjusting agent is mixed into the base member to form the color filter 33. Subsequently, the opposing substrate 12 with the color filter 33 formed thereon is decompressed for several seconds to several hours at a low pressure of, for example, 0.1 Pa or below, thereby denaturing the dielectric-constant adjusting agent, or to volatilize and remove a part of the dielectric-constant adjusting agent to thereby adjust the dielectric constant of the color filter 33.

The dielectric constant of the overcoat layer 34 may be adjusted by mixing the dielectric-constant adjusting agent in the overcoat layer 34 and decompressing this dielectric-constant adjusting agent for denaturization or volatilization.

The dielectric constant of the color filter 33 may be changed by mixing a dielectric-constant adjusting agent in the base member of the color filter 33 and irradiating ultraviolet rays (UV) on this dielectric-constant adjusting agent. In this case, an ultraviolet-sensitive dielectric-constant adjusting agent is mixed into the base member to form the color filter 33. Subsequently, ultraviolet rays are irradiated on the color filter 33 to denature the dielectric-constant adjusting agent, thus adjusting the dielectric constant of the color filter 33.

Instead of UV rays, a laser beam, an ion beam, X rays or the like may be irradiated to adjust the dielectric constant of the color filter 33. In this case, the dielectric-constant adjusting agent in use should be sensitive to whatever is to be irradiated.

The dielectric constant of the overcoat layer 34 may be adjusted by mixing the dielectric-constant adjusting agent in the overcoat layer 34 and irradiating UV rays or the like thereon.

By adjusting the dielectric constant of the color filter 33 and/or the dielectric constant of the overcoat layer 34 in the above manners, the voltage drop at the color filter 33 and/or the voltage drop at the overcoat layer 34 can be set to the optimum value.

Application Example 2

The optimal voltage-transmittance characteristic differs color by color of the pixels. If the structures of all the color filters 33 are made the same, the view angle of the LCD device is restricted by the pixels of the color which provides the narrowest view angle so that the advantage of improving the view angle may be lessened.

Figure 24A:
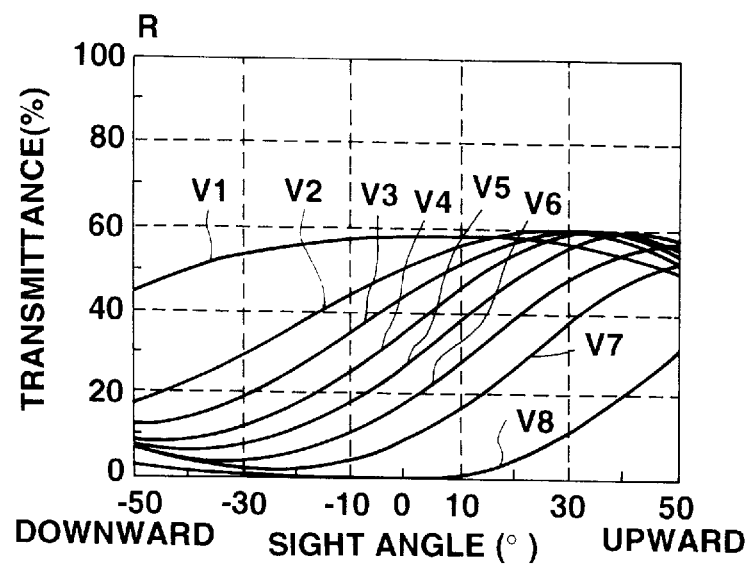
FIG. 24A is a characteristic diagram of a pixel where a red (R) color filter is arranged.

This point will be specifically discussed below with reference to FIGS. 24A through 24C, which show the transmittance-view angle characteristics of pixels each of which is divided to a normal pixel and a voltage-dropped pixel in the case where color filters with the same thickness and dielectric constant are used. FIG. 24A shows the characteristic of a pixel where the R color filter is arranged, FIG. 24B shows the characteristic of a pixel where the G color filter is arranged, and FIG. 24C shows the characteristic of a pixel where the B color filter is arranged.

Figure 24B:
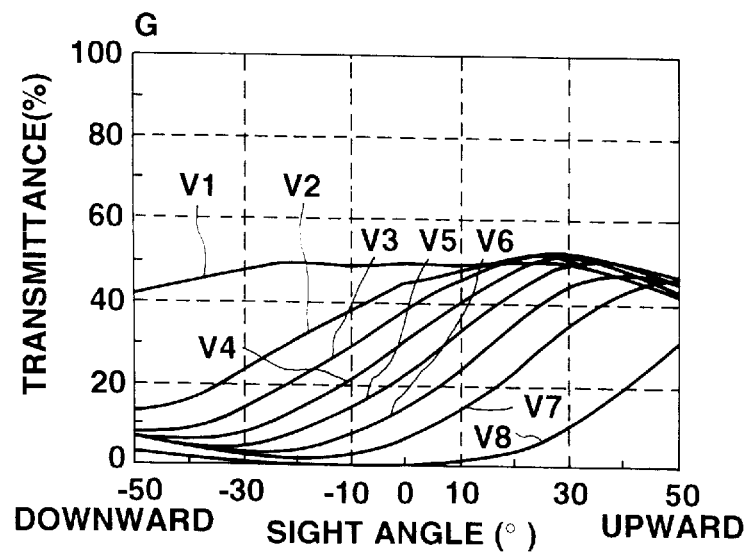
FIG. 24B is a characteristic diagram of a pixel where a green (G) color filter is arranged.
Figure 24C:
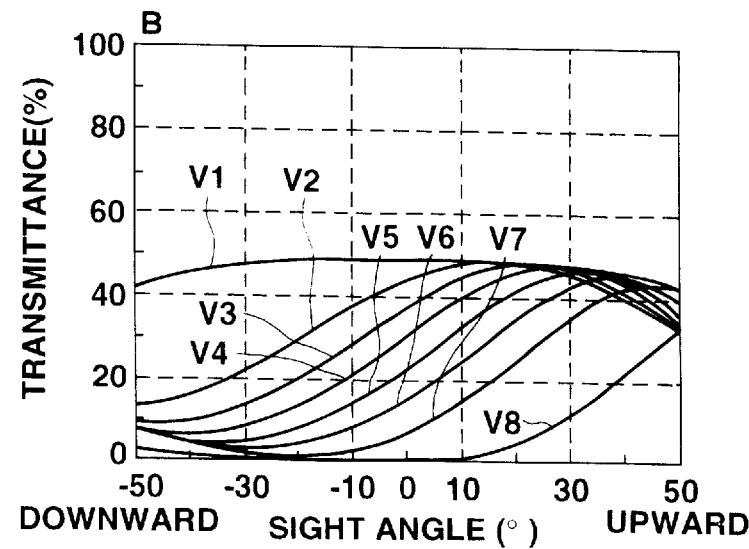
FIG. 24C is a characteristic diagram of a pixel where a blue (B) color filter is arranged.

The horizontal scale in FIGS. 24A–24C represents the view angle, the right half (0° to 50°) indicating the angle as seen from above while the left half (0° to −50°) indicates the angle as seen from below. The vertical scale represents the transmittance.

The characteristic in FIG. 24A shows that as the applied voltage rises, the transmittance becomes lower in the downward view angle and no inversion between adjoining gradations has occurred. In the characteristics in FIGS. 24B and 24C, the transmittance for the voltage V7 is greater than the transmittance for the voltages V4 to V6 in the downward view angle of 30° to 50°. That is, in the downward view angle of 30° to 50°, the gradation inversion has occurred. This is because there is a small difference in the voltage to be applied to the liquid crystal between the normal pixel and the voltage-dropped pixel.

It is understood from FIGS. 24A to 24C that the difference between the voltage applied to the liquid crystal at the normal pixel and the voltage applied to the liquid crystal at the voltage-dropped pixel should be made greater for the G pixel than the R pixel and for the B pixel than the G pixel. Or the improvement on the view angle is not made uniformly over the entire pixels so that the view angle of the LCD device is restricted by the pixels of the color (B) which provides the narrowest view angle, thus lessening the advantage of improving the view angle.

To overcome this shortcoming, the dielectric constant of the color filter 33 for each color should be adjusted to set the voltage drop at the color filter 33 for each color to the optimum value. For instance, the dielectric constants of the color filters 33G and 33B should be set smaller than the dielectric constant of the color filter 33R; for example, the former dielectric constants should be set to 0.9 to 0.6 times the latter dielectric constant. To reduce the dielectric constants of the color filters 33G and 33B, the above-described schemes of adjusting the dielectric constant of the color filter 33 can be used. For example, color-less transparent dielectric-constant reducing agent should be added by 2 to 9 percent by weight to the color filters 33G and 33B.

With the employment of this structure, the voltage drops $V_{G2}$ and $V_{B2}$ at the color filters 33G and 33B are greater than the voltage drop $V_{R2}$ at the color filter 33R. Therefore, the difference between the voltages applied to the liquid crystal 13 at the normal pixel and the liquid crystal 13 at the voltage-dropped pixel is greater for the G and B pixels than the voltage difference for the R pixel. It is thus possible to set the view angles of the individual R, G and B pixels equal to one another.

Further, the color-less transparent dielectric-constant reducing agent mixed in the color filters 33G and 33B is color-less and transparent, so that the number of apertures does not decrease and the number of manufacturing steps on the side of the opposing substrate 12 does not increase much. This makes the manufacturing of the LCD device easier.

The voltage drops at the color filters 33R, 33G and 33B and at the overcoat layer 34 may be adjusted by changing the thicknesses of their insulating films. Accordingly, the thicknesses of the color filters 33 and the overcoat layer 34 which provide the optimum applied voltage are to be obtained beforehand through experiments or the like, and the color filters 33 and the overcoat layer 34 are to be formed based on the obtained data.

Figure 25A:
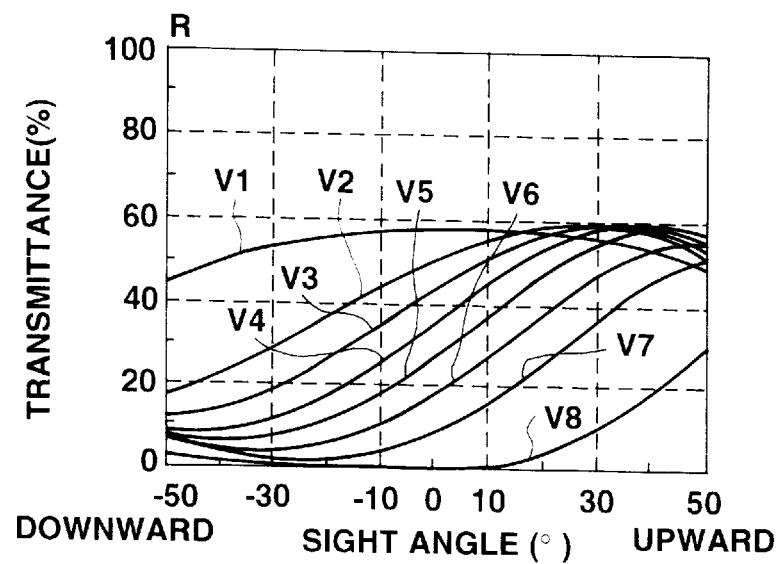
FIG. 25A is a characteristic diagram of a pixel where an R color filter is arranged.
Figure 25B:
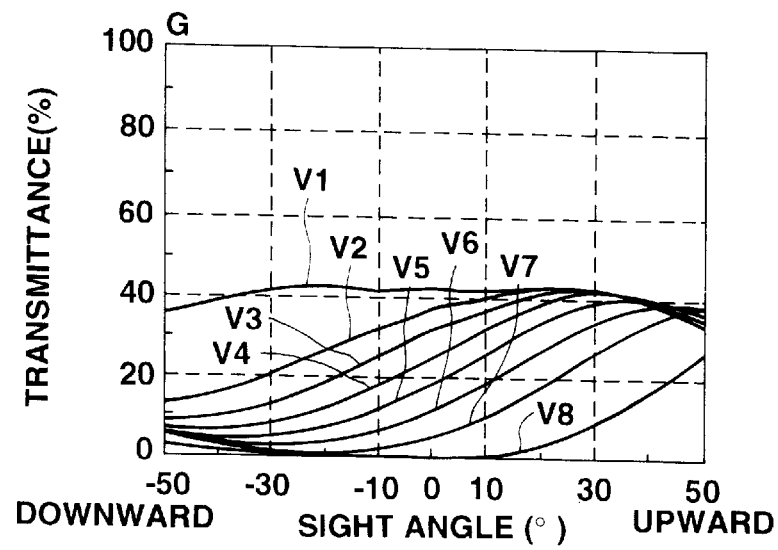
FIG. 25B is a characteristic diagram of a pixel where a G color filter is arranged.
Figure 25C:
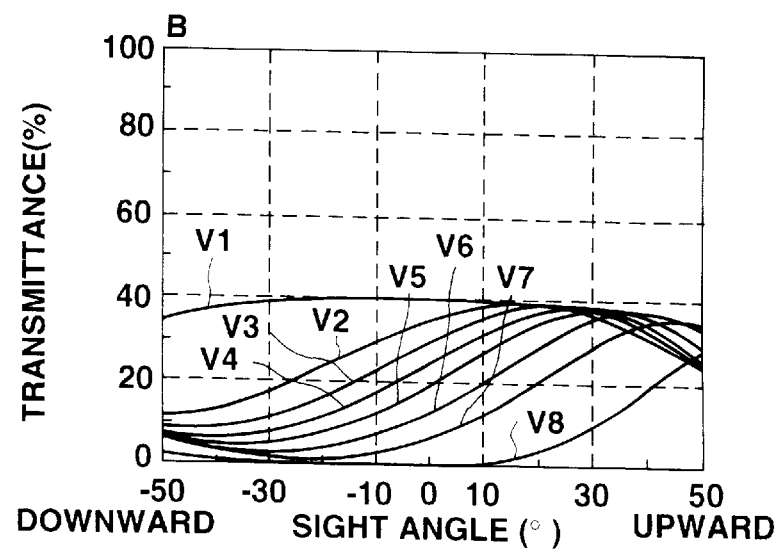
FIG. 25C is a characteristic diagram of a pixel where a B color filter is arranged.

FIGS. 25A through 25C show the transmittance-view angle characteristics for the respective color filters to provide the 8-gradation display in the case where the dielectric constants $\epsilon G$ and $\epsilon B$ of the green and blue color filters 33G and 33B are set to 0.8 times the dielectric constant $\epsilon R$ of the red color filter 33R. FIG. 25A shows the transmittance-view angle characteristic for the red (R) color, FIG. 25B shows the transmittance-view angle characteristic for the green (G) color, and FIG. 25C shows the transmittance-view angle characteristic for the blue (B) color.

Those characteristics are obtained under the conditions that the area ratio of the normal pixel A1 to the voltage-dropped pixel A2 of each color pixel is set to 1:1 and the thickness of each color filter 33 is set to 1.4 μm.

In the characteristics in FIGS. 25B and 25C, the transmittance for the voltage V7 is lower than the transmittance for the voltages V4 to V6 even in the downward view angle of 30° to 50° and no gradation inversion between adjoining gradations has occurred. It is understood from FIGS. 25A to 25C that the view angles of the R, G and B pixels can be set substantially equal to one another and the total view angle can be widened.

Other schemes may be used if the dielectric constant of the R color filter 33R can be made different from the dielectric constants of the G and B color filters 33G and 33B. For instance, the base member of each color filter 33 may be made of a material having a low dielectric constant and the dielectric-constant increasing agent may be mixed in the R color filter 33R.

Further, the color filter 33R may be made of a material having a high dielectric constant while the color filters 33G and 33B are made of materials having a low dielectric constant so that the dielectric constant of the color filter 33R becomes different from those of the color filters 33G and 33B.

Figure 26:
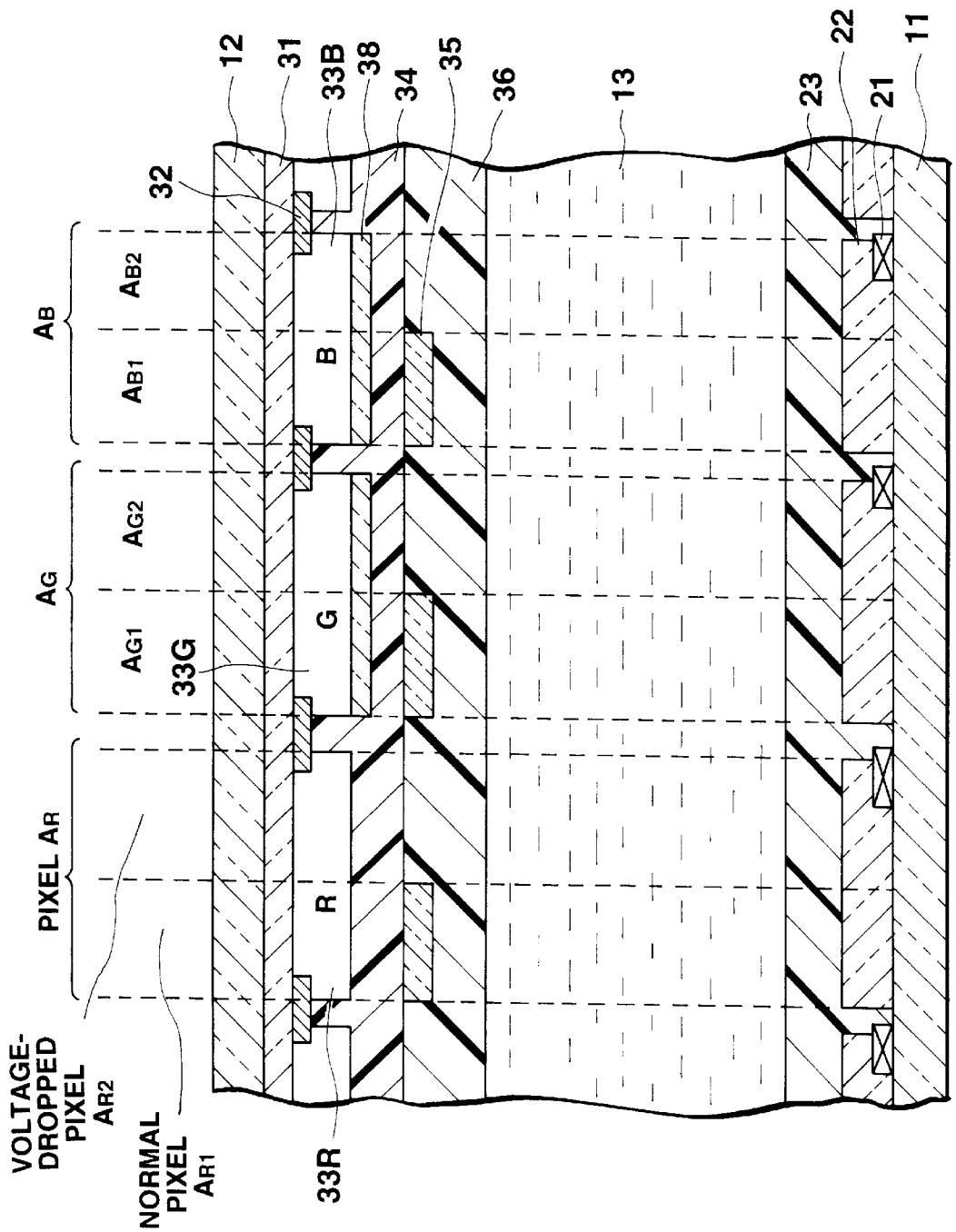
FIG. 26 is a cross-sectional view of an LCD device with low dielectric layers located in G and B pixels.

Furthermore, a voltage dropping film 38 with a low dielectric constant may be provided above the G and B color filters 33G and 33B as shown in FIG. 26, so that the voltage drops at the insulating films of the G and B pixels $A_G$, and $A_B$, become greater than the voltage drop at the insulating film of the R pixel $A_R$. The voltage dropping film 38 is formed of a material such as color-less transparent acrylic resin or $SiO_2$ to which the dielectric-constant reducing agent is added, and has a lower dielectric constant than that of the overcoat layer 34. In this case, the proper view angle can be given to each pixel by properly adjusting the thickness and dielectric constant of the voltage dropping film 38.

The voltage drops at the insulating films of the G and B pixels $A_G$ and $A_B$ may also be made greater than the voltage drop at the insulating film of the R pixel $A_R$ by providing a film of a high dielectric constant on the R color filter 33R.

Further, UV rays may be irradiated on the G and B color filters 33G and 33B to reduce the dielectric constants of those color filters 33G and 33B so that the dielectric constant of the color filter 33R becomes different from those of the color filters 33G and 33B. In this case, at the color-filter producing stage, for example, the G and B color filters 33G and 33B should be formed before the R color filter 33R, UV rays should be irradiated on those color filters 33G and 33B, and then the color filter 33R should be formed.

In stead of UV rays, a laser beam, an ion beam, X rays or the like may be irradiated on the color filters 33G and 33B to reduce t heir dielectric constants.

Although the dielectric constants of the G and B color filters 33G and 33B are set substantially the same in the foregoing description, the dielectric constants $\epsilon R$, $\epsilon G$ and $\epsilon B$ of the R, G and B color filters 33R, 33G and 33B may be set different from one another.

Application Example 3

Figure 27:
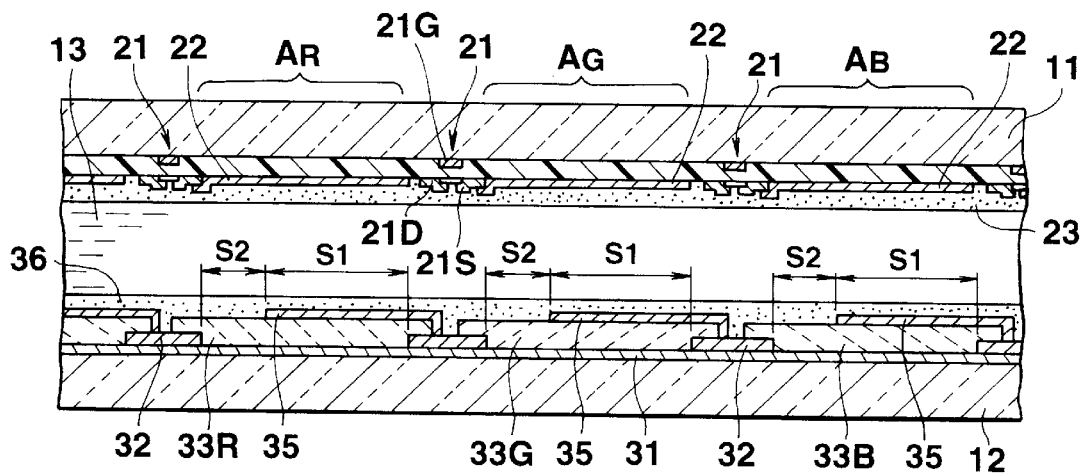
FIG. 27 is a cross-sectional view of an LCD device with an overcoat layer removed.
Figure 28:
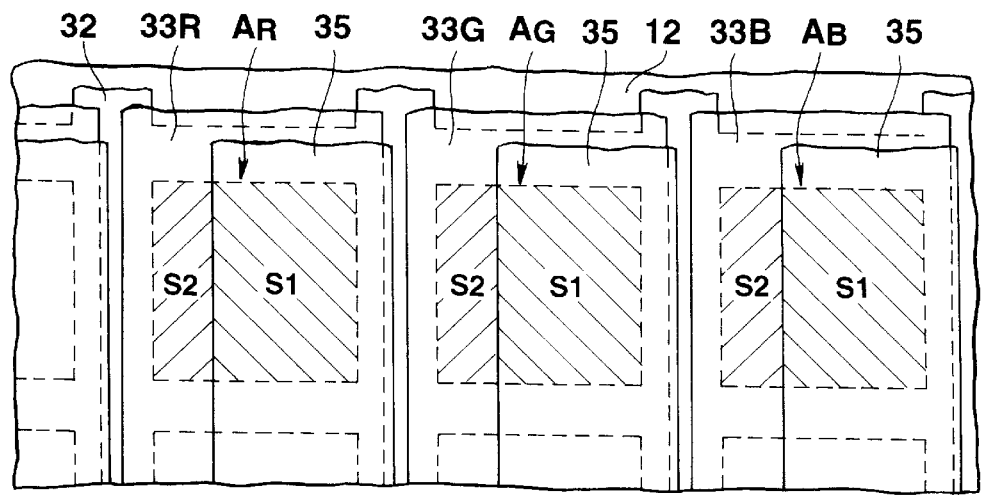
FIG. 28 is a plan view of the LCD device having the structure shown in FIG. 27.

While the overcoat layer 34 is located on the color filter 33 in the above-described embodiment, the overcoat layer 34 may be removed as shown in, for example, FIG. 27. In this case, the overlying electrode 35 of ITO or the like is formed directly on the color filter 33 in such a way that the overlying electrode 35 occupies 50 to 70% of each pixel. In FIG. 27, the overlying electrode 35 is connected to the opposing electrode 31 via a conductive light-shielding film 32 made of metal or the like. Even with such a structure, the individual color filters 33R, 33G and 33B are formed about 1.2 $\mu$m to 2.0 $\mu$m thick, and extend over the multiple color filters 33 as shown in the plan view of FIG. 28.

Although the dielectric constant of the color filter 33 is set different color by color in the above-described embodiment, the area ratio S1:S2 of the area S1 of the normal pixel A1 to the area ratio S2 of the voltage-dropped pixel A2 may be set different for each of the colors of the color filters 33.

Figure 29:
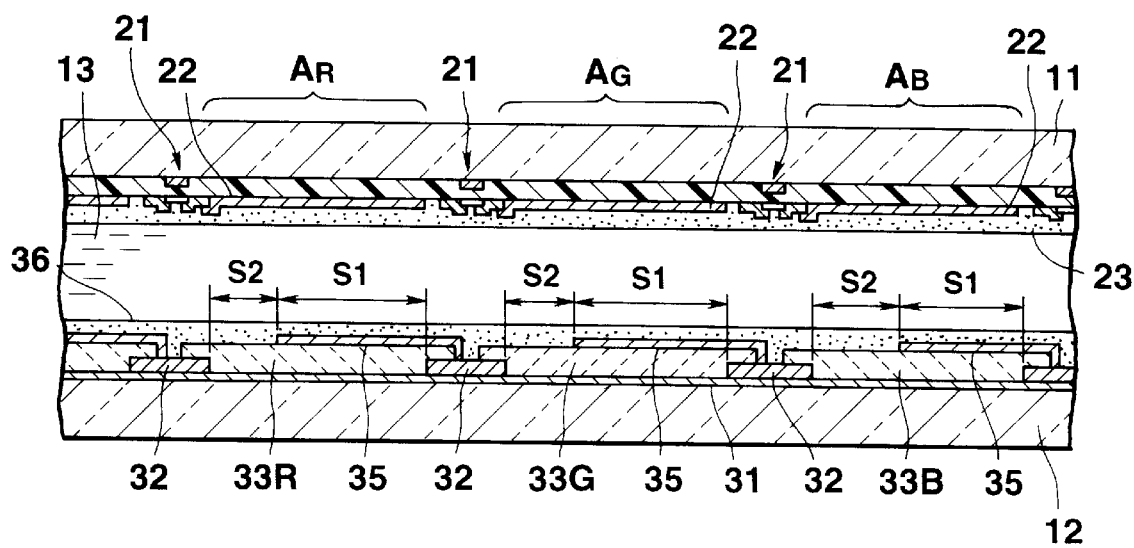
FIGS. 29 through 31 are cross-sectional views of an LCD device in which the area ratio of a normal pixel to a voltage-dropped pixel differs pixel color by pixel color.

FIG. 29 shows an example wherein the thicknesses of the individual color filters 33R, 33G and 33B of the LCD device are set to the same, e.g., 1.4 $\mu$m, the area ratio S1:S2 for the R and G pixels $A_R$ and $A_G$ is set to about 7:3 and the area ratio S1:S2 for the B pixel $A_B$ is set to about 6:4.

Figure 30:
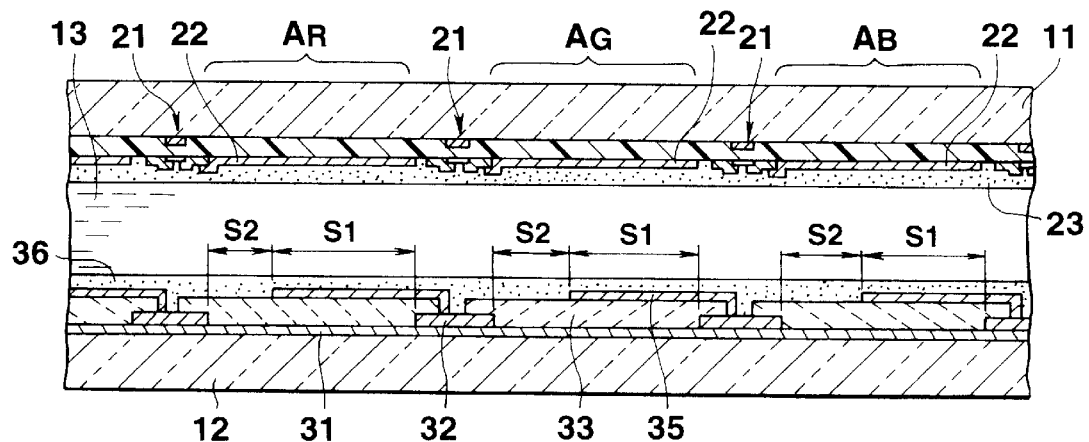

FIG. 30 shows an example wherein the thicknesses of the individual color filters 33R, 33G and 33B of the LCD device are set to the same, e.g., 1.4 $\mu$m, the area ratio S1:S2 for the R pixel $A_R$ is set to about 7:3, the area ratio S1:S2 for the B pixel $A_B$ is set to about 6:4, and the area ratio S1:S2 for the G pixel $A_G$ is set to lie between the area ratio S1:S2 for the red pixel and the area ratio S1:S2 for the blue pixel (7/3<S1/S2<6/4).

The optimal area ratio S1:S2 differs color by color. The use of the structures shown in FIGS. 29 and 30 can therefore ensure a wide view angle. The optimal voltage-transmittance characteristic can be obtained for each color. It is therefore possible to obtain images having a good color balance with compensation made for the difference in brightness among the red, green and blue pixels.

Although the thickness of each color filter 33 is set to 1.4 $\mu$m in the structures in FIGS. 29 and 30, the color filter 33 can have any other thickness. If the color filter 33 is designed too thin, however, the voltage drop at the color filter 33 becomes smaller, reducing the difference between the applied voltage to the liquid crystal 13 at the normal pixel A1 and the applied voltage at the voltage-dropped pixel A2. As a consequence, the view angle does not become wide. If the color filter 33 is designed too thick, the light transmittance decreases, making the displayed image darker. In light of the above, it is desirable that the thickness of the color filter 33 lie within the range of 1.2 to 2.0 $\mu$m.

When the color filter 33 becomes thicker, the difference between the applied voltage to the liquid crystal 13 at the normal pixel A1 and the applied voltage at the voltage-dropped pixel A2 becomes greater, increasing the difference between a change in the voltage-transmittance characteristic with respect to the view angle for the normal pixel A1 and that for the voltage-dropped pixel A2. In this case, therefore, a wide view angle can be obtained even if the area ratio S1:S2 of the normal pixel to the voltage-dropped pixel is set to about 5:5.

Figure 31:
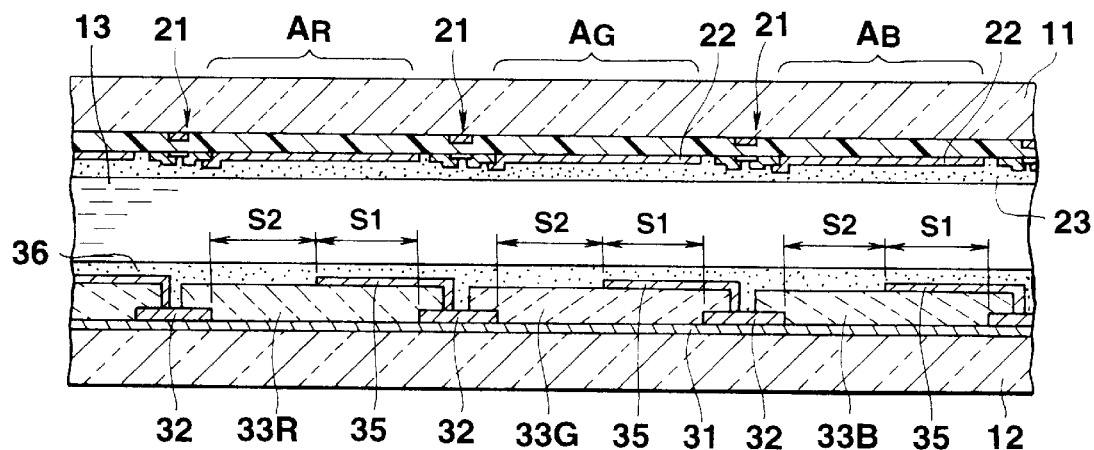

FIG. 31 shows an example wherein the individual color filters 33 are set thicker, e.g., 1.8 $\mu$m, and the area ratio S1:S2 of the normal pixel A1 to the voltage-dropped pixel A2 for each color pixel is set to 5:5.

Figure 32:
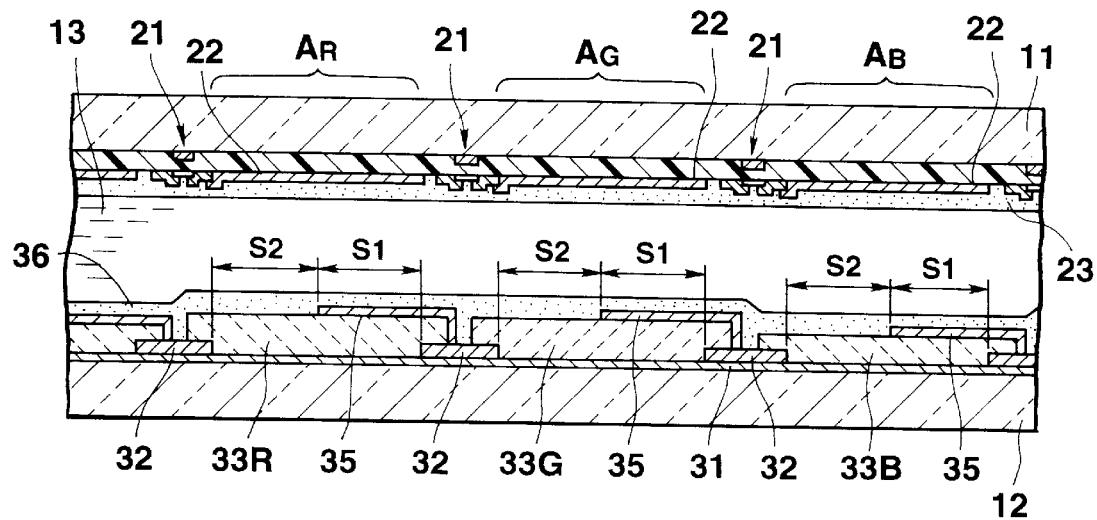
FIGS. 32 and 33 are cross-sectional views of an LCD device with color filters of different thicknesses provided for the respective colors of pixels.

Although the thicknesses of the color filters 33 are set constant in the above description, they may be set different color by color. FIG. 32 shows an example wherein the thicknesses of the red filter 33R and the green filter 33G are set to 1.8 $\mu$m, the thickness of the blue filter 33B is set to 1.4 $\mu$m, and the area ratio S1:S2 of the normal pixel A1 to the voltage-dropped pixel A2 for each color pixel is set to 5:5.

Figure 33:
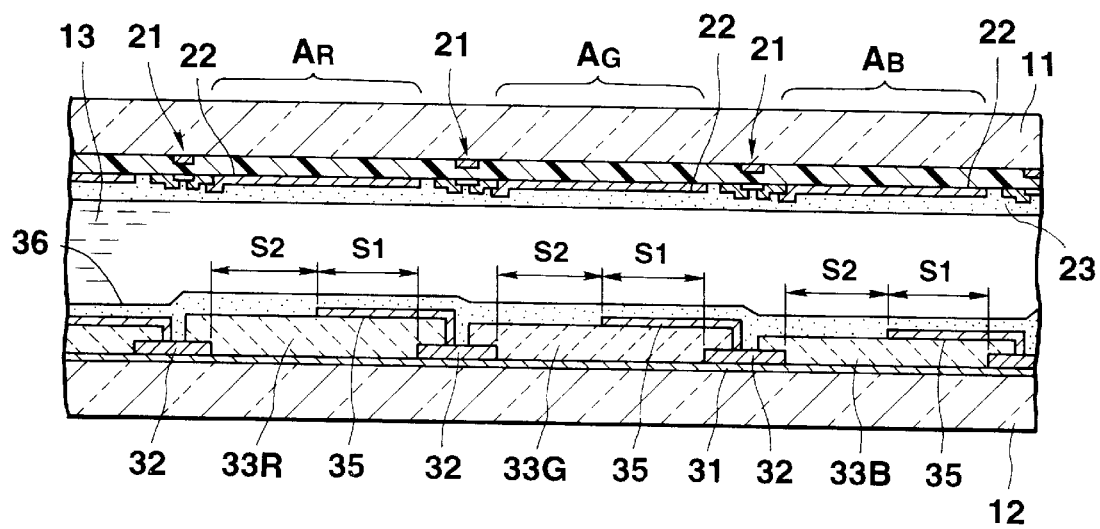

FIG. 33 shows an example wherein the red filter 33R is 1.8 $\mu$m thick, the blue filter 33B is 1.4 $\mu$m thick, the green filter 33G is set thicker than 1.4 $\mu$m but thinner than 1.8 $\mu$m, and the area ratio S1:S2 of the normal pixel A1 to the voltage-dropped pixel A2 for each color pixel is set to 5:5.

Since the individual color filters 33 in the structure shown in FIG. 32 are thick (1.8 $\mu$m), the difference between the voltage applied to the liquid crystal 13 at the normal pixel A1 and the voltage applied to the liquid crystal 13 at the voltage-dropped pixel A2 increases. Even when the area ratio S1:S2 for each pixel is 5:5, therefore, the view angle becomes wider. Further, the voltage-transmittance characteristic of each pixel is optimized color by color. It is thus possible to obtain images with a wider view angle and a good color balance.

According to the LCD device shown in FIG. 33, the red filter 33R is designed 1.8 μm thick, the blue filter 33B is designed relatively thin of 1.4 μm, and the green filter 33G is made thinner than the red filter 33R but thicker than the blue filter 33B. It is therefore possible to provide excellent display without gradation inversion and to display a multi-color image with a good color balance.

Although the area ratio S1:S2 is 5:5 in the structures shown in FIGS. 32 and 33, this area ratio is not limited to this fixed ratio. If S1 or S2 is made too small, however, the influence of that area hardly exists and the advantage of widening the view angle becomes lesser. It is therefore desirable that the area ratio S1:S2 lie within the range of 8:2 to 5:5.

According to the structures in FIGS. 27 to 33, the overlying electrode 35 is connected to the opposing electrode 31 via the black mask 32. Therefore, the overlying electrode 35 is not limited to have a stripe shape but may be arranged pixel by pixel (for each color filter 33).

Application Example 4

As discussed above, the opposing substrates with the structures shown in FIGS. 3 and 4 are prepared by forming the color filter 33 and the overcoat layer 34 on the underlying electrode 33, forming a transparent conductive film on the overcoat layer 34 and patterning this transparent conductive film in a stripe shape.

Figure 34:
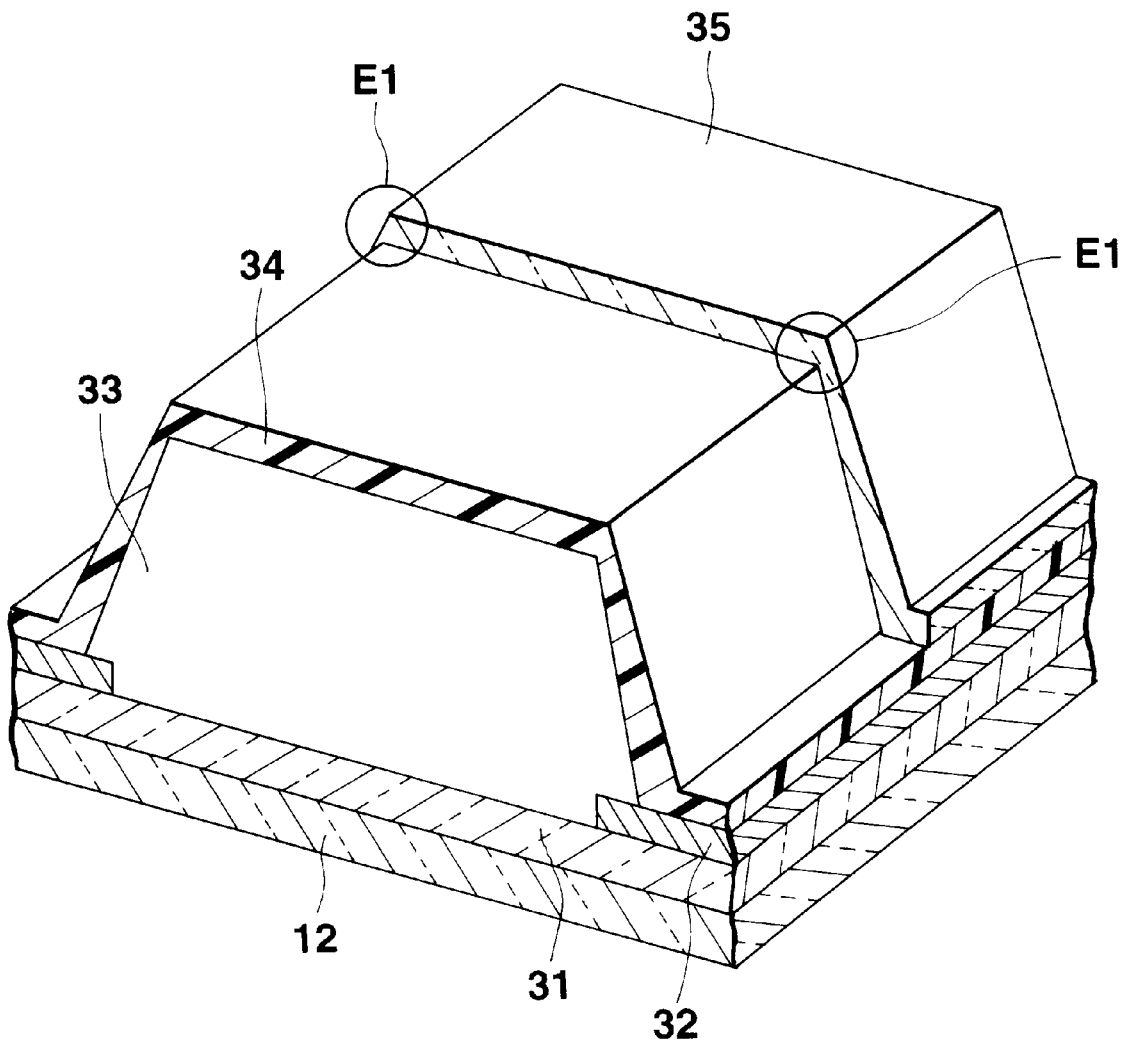
FIG. 34 is a perspective view for explaining that an overlying electrode becomes thinner at the end portion of the color filter.

As shown in FIG. 34, a step corresponding to the shape of the color filter 33 is formed on the surface of the overcoat layer 34. The portion E1 of the transparent conductive film on the step inevitably becomes thinner. At the time of etching the transparent conductive film, therefore, the portion E1 is etched earliest so that the etching liquid permeates between the k34 and the overlying electrode 35, thus over-etching the overlying electrode 35. When the overlying electrode 35 is over-etched, the area ratio of the normal pixel A1 to the voltage-dropped pixel A2 does not become as designed. The sight angle characteristic of the LCD device is not uniform as designed, causing a change in view angle characteristic.

Further, the overlying electrode 35 may be cut at the step.

Figure 35:
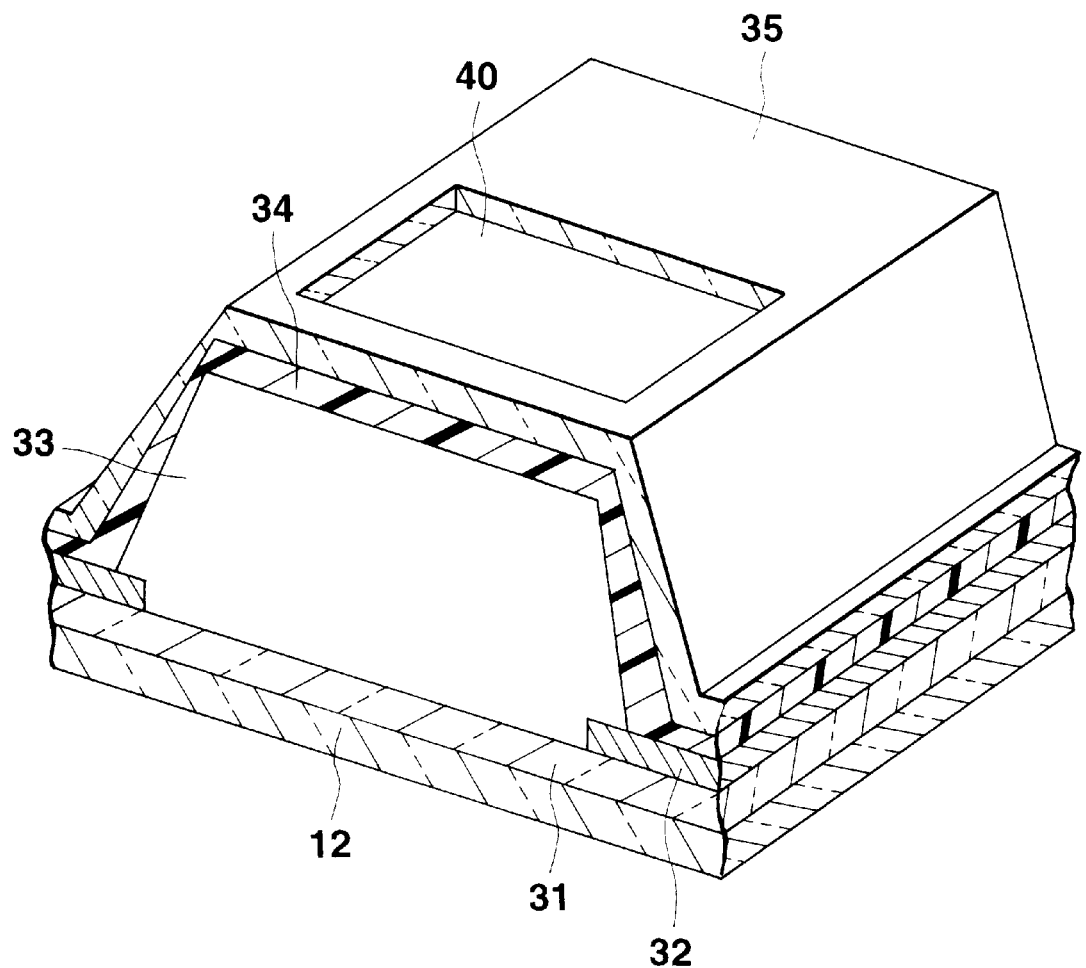
FIGS. 35 and 36 are diagrams showing openings formed in the overlying electrode on the flat surface of the overcoat layer.
Figure 36:
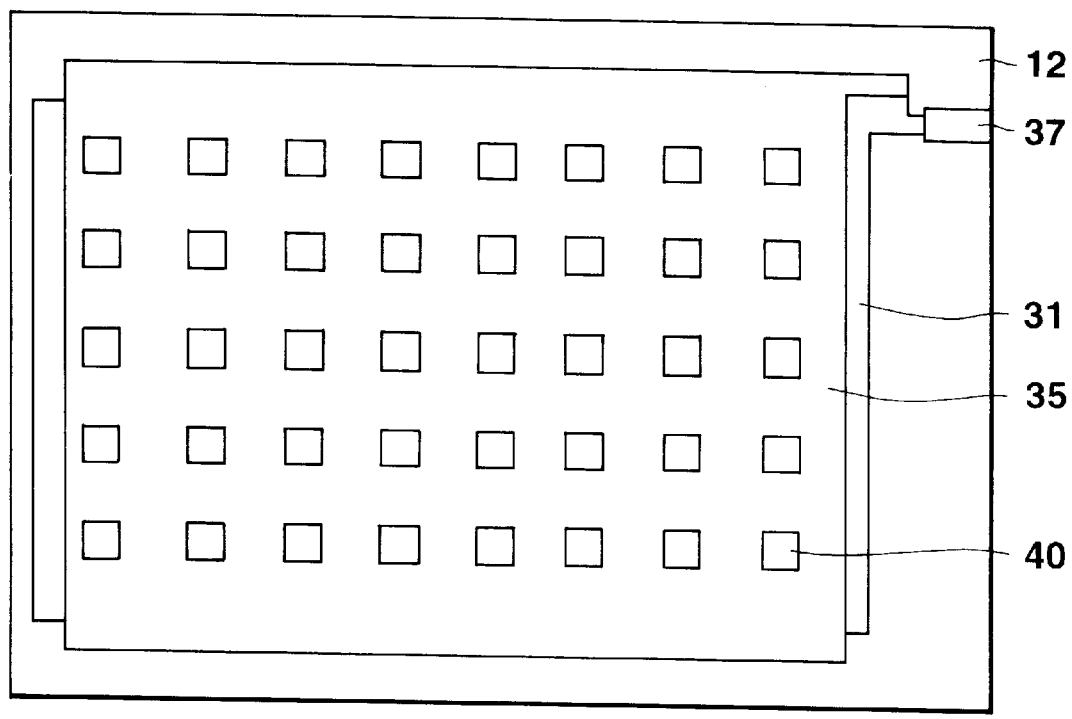

To overcome this shortcoming, as shown in FIGS. 35 and 36, openings 40 should be formed in the overlying electrode 35 on the flat surface of the overcoat layer 34. The openings 40 are formed to occupy about 50% to 30% of the area of the flat surface.

Even with the structure shown in FIG. 35 and 36, the drive voltage is applied substantially directly to the liquid crystal 13 at the area (normal pixel) A1 where the overlying electrode 35 is formed. At the area (voltage-dropped pixel) A2 where the openings 40 are formed, as opposed to the area A1, the drive voltage is dropped by the color filter 33 and the overcoat layer 34 and the resultant voltage is applied to the liquid crystal 13. The view angle therefore becomes wider as mentioned earlier.

The openings 40 are formed by forming an ITO film on the overcoat layer 34 by sputtering or the like and then patterning the ITO film by etching or the like. The ITO film has a uniform thickness on the flat surface of the overcoat layer 34 and the etching speed over this area is constant. Therefore, etching does not partly proceed faster, thus preventing the etching liquid from permeating between the overlying electrode 35 and the overcoat layer 34 and preventing the over-etching of the overlying electrode 35.

The overlying electrode 35 and openings 40 on the flat surface of the overcoat layer 34 are formed to have predetermined areas, and the normal pixel A1 and the voltage-dropped pixel A2 are formed in a predetermined area ratio. It is therefore possible to obtain the view angle characteristic as designed and realize an LCD device with a less variation in the view angle characteristic.

Figure 37A:
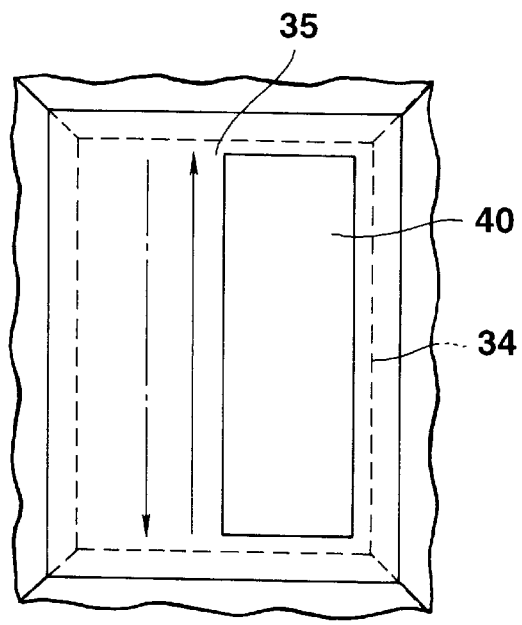
FIGS. 37A to 37C are plan views showing modifications of the opening.
Figure 37B:
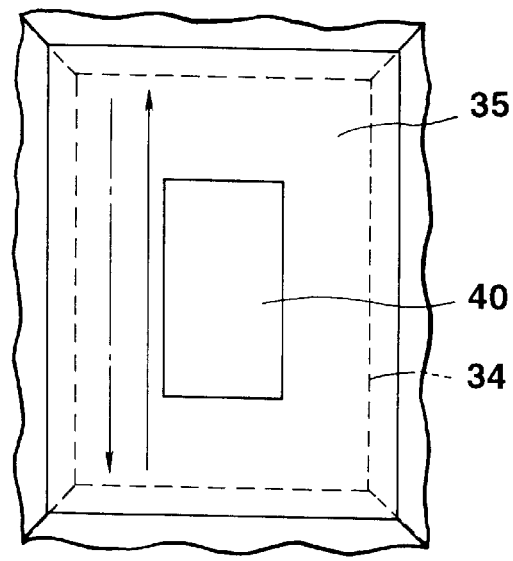
Figure 37C:
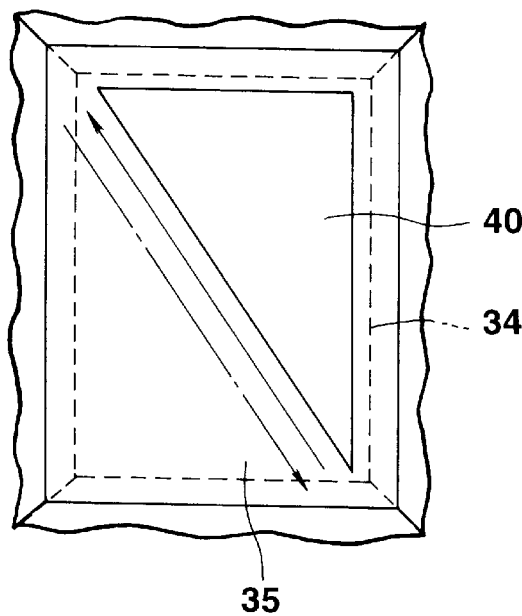

The positions and the shape of the openings 40 are not limited to those shown in FIGS. 35 and 36. As shown in FIGS. 37A to 37C, the openings 40 may be formed at arbitrary positions and in arbitrary shapes on the flat surface of the overcoat layer 34.

FIG. 37A shows an example wherein the opening 40 in FIG. 35 is rotated by 90°. FIG. 37B shows an example wherein the opening 40 is formed in the center portion of the flat surface of the overcoat layer 34. FIG. 37C shows an example wherein the opening 40 is formed in such a manner that one side of the opening 40 is the orthogonal line of the flat surface of the overcoat layer 34.

In the examples shown in FIGS. 3, 4 and 5, the aligning treatment is performed in the direction of 45° with respect to the overlying electrode 35, i.e., with respect to the boundary between the normal pixel A1 and the voltage-dropped pixel A2. This aligning treatment however may not allow sufficient alignment (rubbing) to be performed on the boundary between the normal pixel A1 and the voltage-dropped pixel A2 due to the presence of the step on the surface of the alignment film 36 made by the overlying electrode 35. When insufficient alignment is performed on the boundary between the normal pixel A1 and the voltage-dropped pixel A2, the alignment of the liquid crystal 13 becomes discontinuous (disclination) at this boundary.

As a solution to this problem, the aligning treatment should be executed in the direction parallel to the overlying electrode 35 or parallel to the boundary between the normal pixel A1 and the voltage-dropped pixel A2. In forming the openings 40 in the overlying electrode 35, the aligning treatment should be performed in the direction parallel to the long sides of the openings 40 as indicated by the solid lines or the one-dot chain lines in FIGS. 37A to 38C. The aligning treatment is performed on the alignment film 23 of the TFT substrate 11 in the direction of 90° to the direction of the aligning treatment performed on the alignment film 36. The transmission axes of the polarization plates 14 and 15 are set in accordance with the direction of the aligning treatment.

According to the LCD device undergone such an aligning treatment, sufficient alignment (rubbing) is performed even on the boundary between the overlying electrode 35 and the opening 40. No disclination of the LC molecules occurs at the boundary between the normal pixel A1 and the voltage-dropped pixel A2, so that the alignment of the liquid crystal 13 at the boundary becomes stable. Therefore, the discontinuity of the alignment of the liquid crystal 13 or the disclination does not occur, permitting the displayed image on the LCD device to keep having a high quality.

Application Example 5

As mentioned above, the underlying electrode 31 and the overlying electrode 35 are formed by etching the first ITO film for forming the underlying electrode and the second ITO film for forming the overlying electrode using the same patterning mask. More specifically, with the patterning mask placed on the second ITO film, the second ITO film is patterned followed by the etching of the first ITO film, thereby forming the overlying electrode 35 and the underlying electrode 31.

At the time of patterning the underlying electrode 31, however, the masked overlying electrode 35 is over-etched (side-etched). When the patterning of the underlying electrode 31 is completed, therefore, the overlying electrode 35 has a smaller area than the designed value and has a thin end part.

To prevent the over-etching of the overlying electrode 35, the overlying electrode 35 after the formation thereof should be masked entirely and then the edge portion of the first ITO film should be patterned. This method however requires that the etching mask be formed twice, thus increasing the number of the manufacturing steps.

Figure 38:
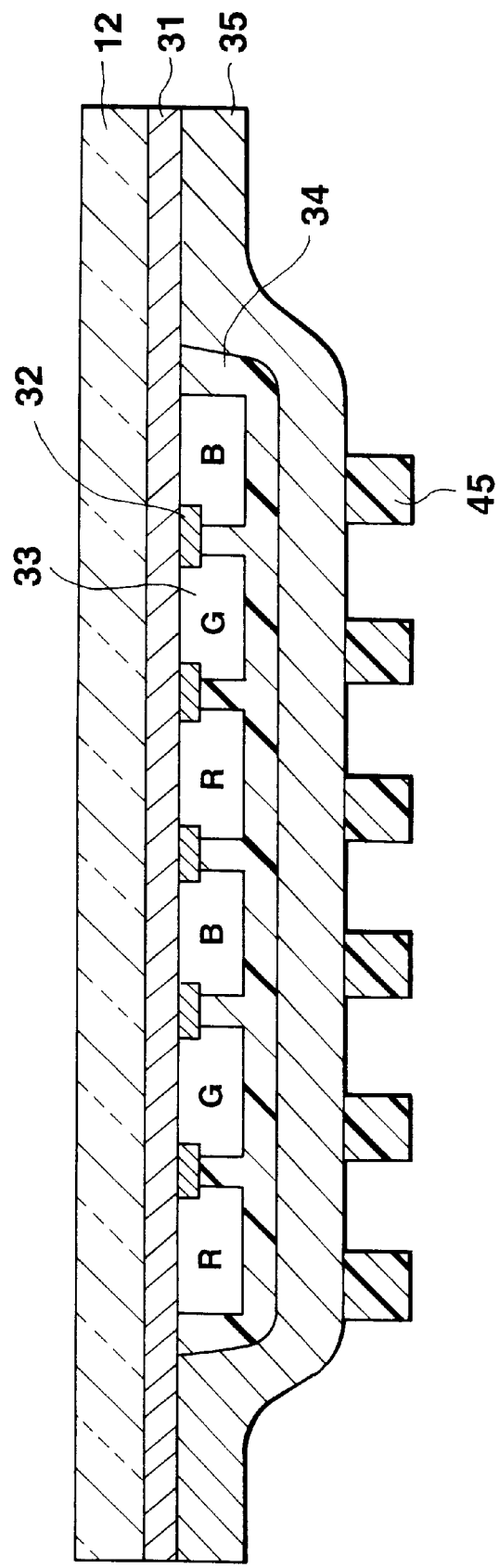
FIGS. 38 through 40 are diagrams showing modifications of the opposing substrate.

As a solution to this problem, the underlying electrode 31 should be formed sufficiently thinner than the overlying electrode as shown in FIG. 38.

The manufacturing method in this case will now be described.

First, the first ITO film 31 is deposited about 0.03±0.02 μm thick on the opposing substrate 12 by sputtering or the like. Subsequently, the black mask 32 and the color filter 33 are formed on the underlying electrode 31.

Next, the overcoat layer 34 is formed on the black mask 32 and the color filter 33 by spin coating, CVD or the like, and the edge portion of the overcoat layer 34 is then etched.

Then, the second ITO film 35 is deposited about 0.15±0.02 μm thick on the overcoat layer 34 by sputtering or the like, as shown in FIG. 38.

Figure 39:
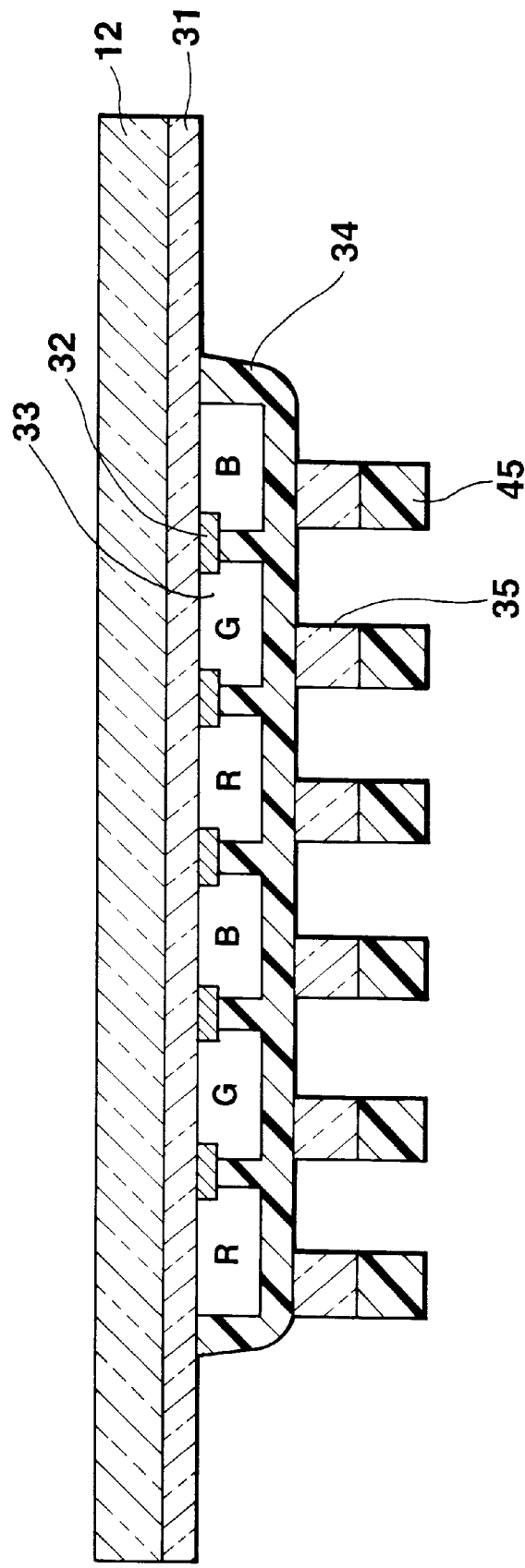

Next, a resist mask 41 is formed on the overlying electrode 35, and the second ITO film 35 is patterned in the form shown in the cross-sectional view of FIG. 39 and in the plan view of FIG. 3 or FIG. 4 by wet etching using this resist mask 41.

When the patterning of the overlying electrode 35 is finished, the first ITO film 31 is patterned with the resist mask 41 and the overcoat layer 34 as masks, thus forming the underlying electrode 31. As the patterning of the underlying electrode 31 proceeds, the etching (side etching) of the portion of the overlying electrode 35 which is covered with the resist mask 41 proceeds, over-etching the overlying electrode 35.

Because the underlying electrode 31 is formed thinner (by ⅕) than the overlying electrode 35, however, the time for patterning the underlying electrode 31 is shorter than the time for patterning the overlying electrode 35. Accordingly, the over-etched area of the overlying electrode 35 is slightly smaller in this case than in the case where the overlying electrode 35 and the underlying electrode 31 are formed in the same thickness. That is, the overlying electrode 35 is formed to have as nearly accurate area and thickness as are designed. It is thus possible to precisely pattern the overlying electrode 35 and the underlying electrode 21 using one etching mask, thus permitting an LCD device with a wide view angle to be manufactured with fewer manufacturing steps.

It is desirable that the thickness of the overlying electrode 35 be 3 to 6 times the thickness of the underlying electrode 31, depending on the type of the etchant to be used in the etching process.

Generally, while ITO has a good adhesion to glass which is the material for the substrate, it has a poor adhesion to resin or $SiO_2$ of which the overcoat layer 34 is made. With the structures in FIGS. 1 and 38, therefore, when the second ITO film is etched, etching progresses from the interface between the overcoat layer 34 and the second ITO film after the exposure of the overcoat layer 34. The etching speed for the second ITO film (overlying electrode) is faster than the etching speed for the second ITO film (underlying electrode), so that the over-etching of the second ITO film may proceed while the first ITO film is being etched.

Figure 40:
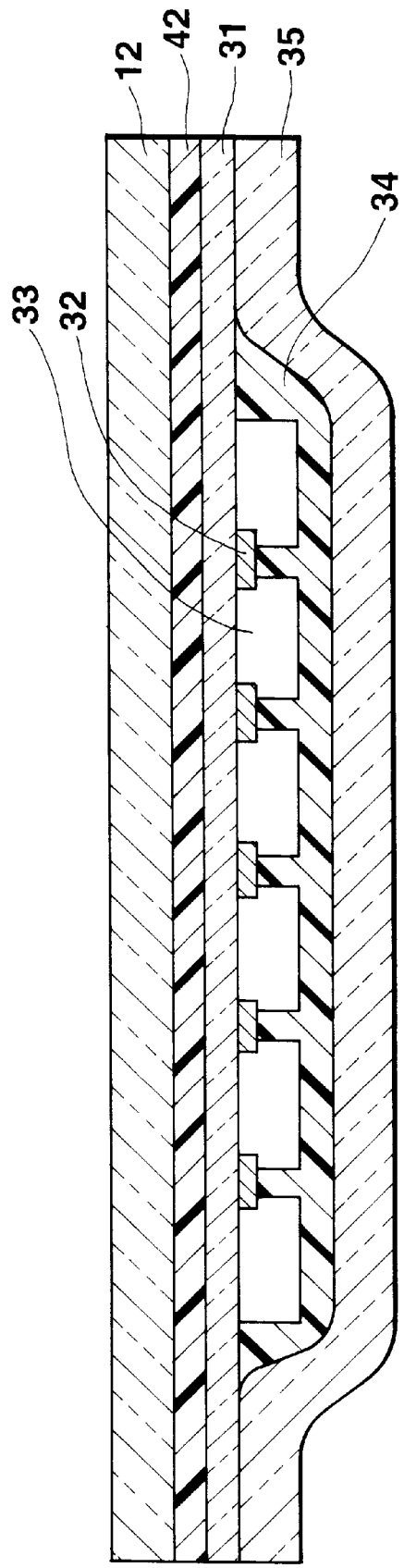

To overcome an insulating film 42 made of the same material as the overcoat layer 34 should be formed on the opposing substrate 12 by CVD or the like, and the first ITO film (underlying electrode) should be formed on the insulating film 42, as shown in FIG. 40.

With the use of the structure as shown in FIG. 40, the etching speeds for the first ITO film and the second ITO film become substantially the same. It is thus possible to form the overlying electrode 35 with a less over-etched portion.

The material for the insulating film 42 need not be the same as the material for the overcoat layer 34, and an arbitrary material having a poorer adhesion to ITO than to the glass substrate may be used for the insulating film 42.

This invention may be adapted for an LCD device which provides a black and white display. In this case, instead of the color filter, an insulating film having a relative dielectric constant of 3.0 to 4.0 is formed bout 1.0 to 2.0 μm thick and the overlying electrode 35 is formed on that insulating film. This structure can provide a monochrome TN LCD device with a wide view angle.

Second Embodiment

Although the overlying electrode 31 and the underlying electrode 35 are provided in the first embodiment, another structure may be employed as long as a plurality of domains with different alignment states can be formed in each pixel.

Figure 41:
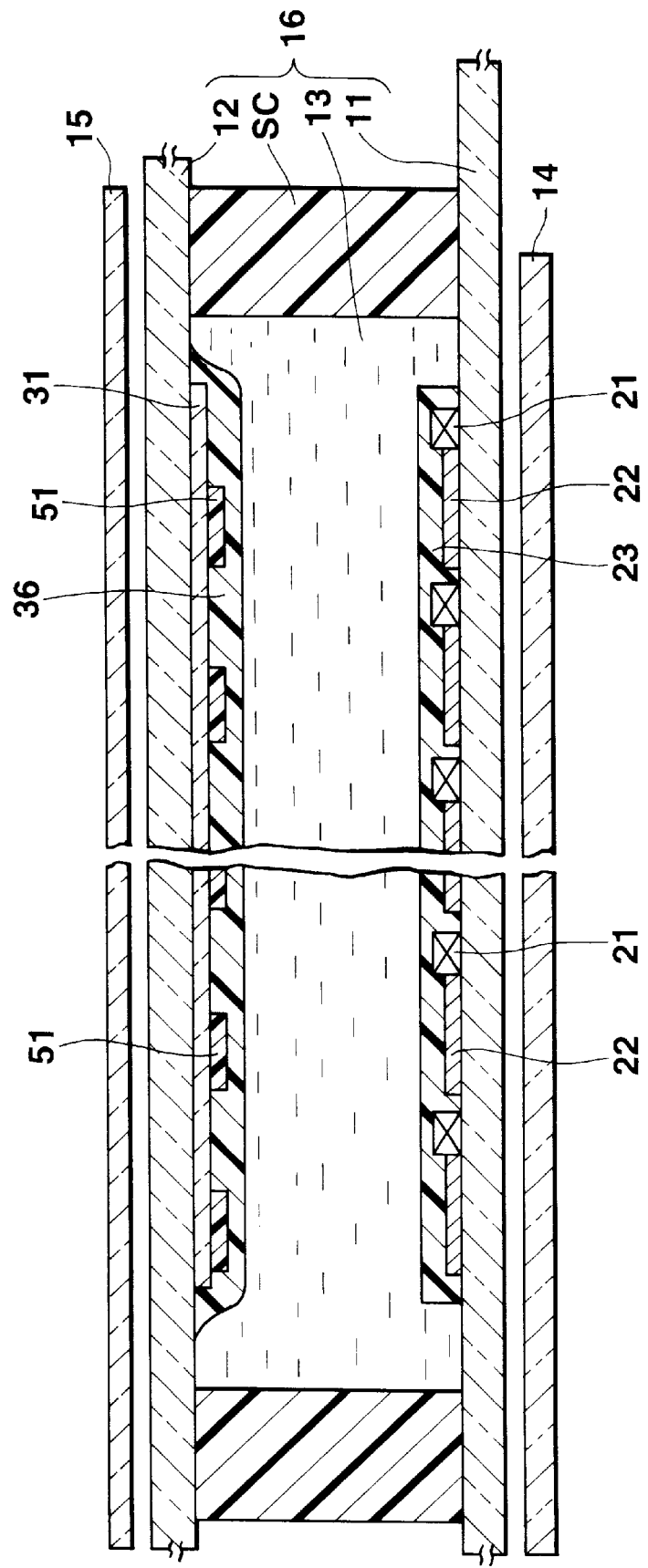
FIG. 41 is a cross-sectional view showing the structure of an LCD display device according to a second embodiment of this invention.

For example, the overlying electrode may be omitted as shown in FIG. 41.

The structure in FIG. 41 is the same as the LCD device shown in FIG. 1 except that an insulating film 51 is formed in each pixel area on the opposing electrode 31 and the alignment film 36 is provided so as to cover the insulating film 51 and the opposing electrode 31.

Figure 42:
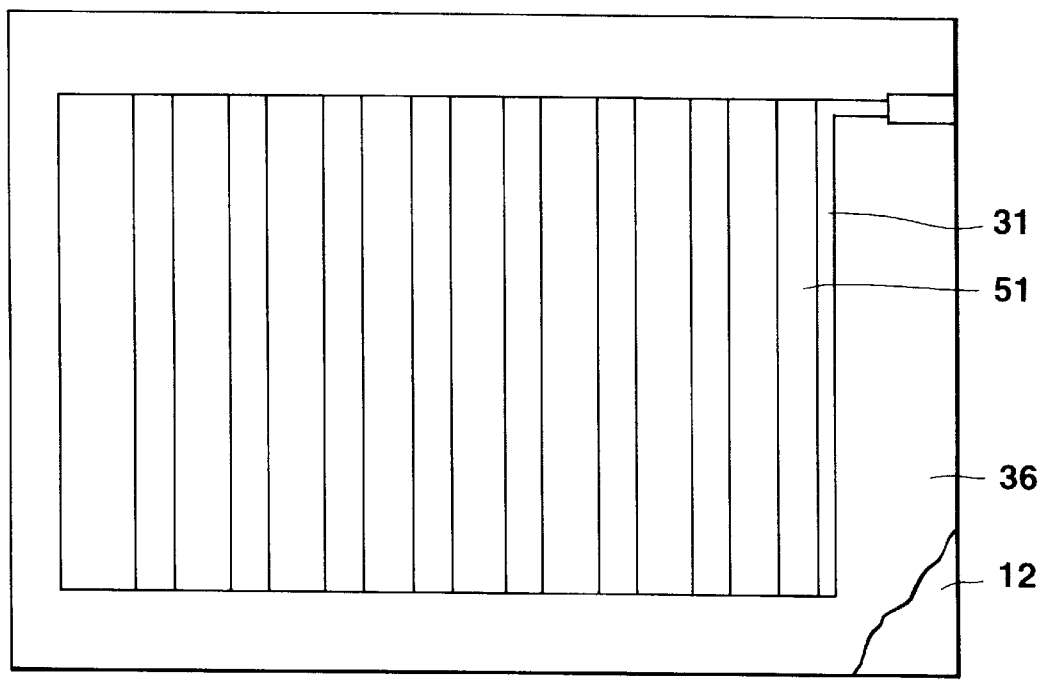
FIG. 42 is a plan view showing the structure of an opposing substrate of the LCD device shown in FIG. 41.

The insulating film 51 is made of, for example, acrylic resin or the like to be about 0.75 to 1.25 μm in thickness, and is provided on about 20 to 50% of each pixel area, not all over that pixel area. The insulating film 51 is formed in a stripe shape over a plurality of pixels, for example, as shown in FIG. 42.

The alignment film 36 is provided to cover the opposing electrode 31 and the insulating film 51. The alignment film 36 is subjected to an aligning treatment in such a way as to be as shown in FIG. 5 or as to be parallel to the boundary between the normal pixel A1 and the voltage-dropped pixel A2. The alignment film 23 is subjected to an aligning treatment in such a way as to intersect the direction of the alignment of the alignment film 36 at 90°. The transmission axis of the polarization plate 14 is set perpendicular (or parallel) to the direction of alignment performed on the alignment film 23, the transmission axis of the polarization plate 15 is set perpendicular (or parallel) to the transmission axis of the polarization plate 14.

In the thus constituted LCD device, the voltage between the pixel electrodes 22 and the opposing electrode 31 is applied to the liquid crystal 13 in the area of each pixel area (the area where the pixel electrodes 22 face the opposing electrode 31) where the insulating film 51 is not provided. In the area where the insulating film 51 is provided, as opposed to the former area, the voltage dropped by the insulating film 51 is applied to the liquid crystal 13.

It is apparent that areas with different alignment states are formed in each pixel and their optical characteristics are averaged, thus widening the view angle.

The view angle characteristic of the LCD device shown in FIG. 41 will now be described more specifically.

Figure 43:
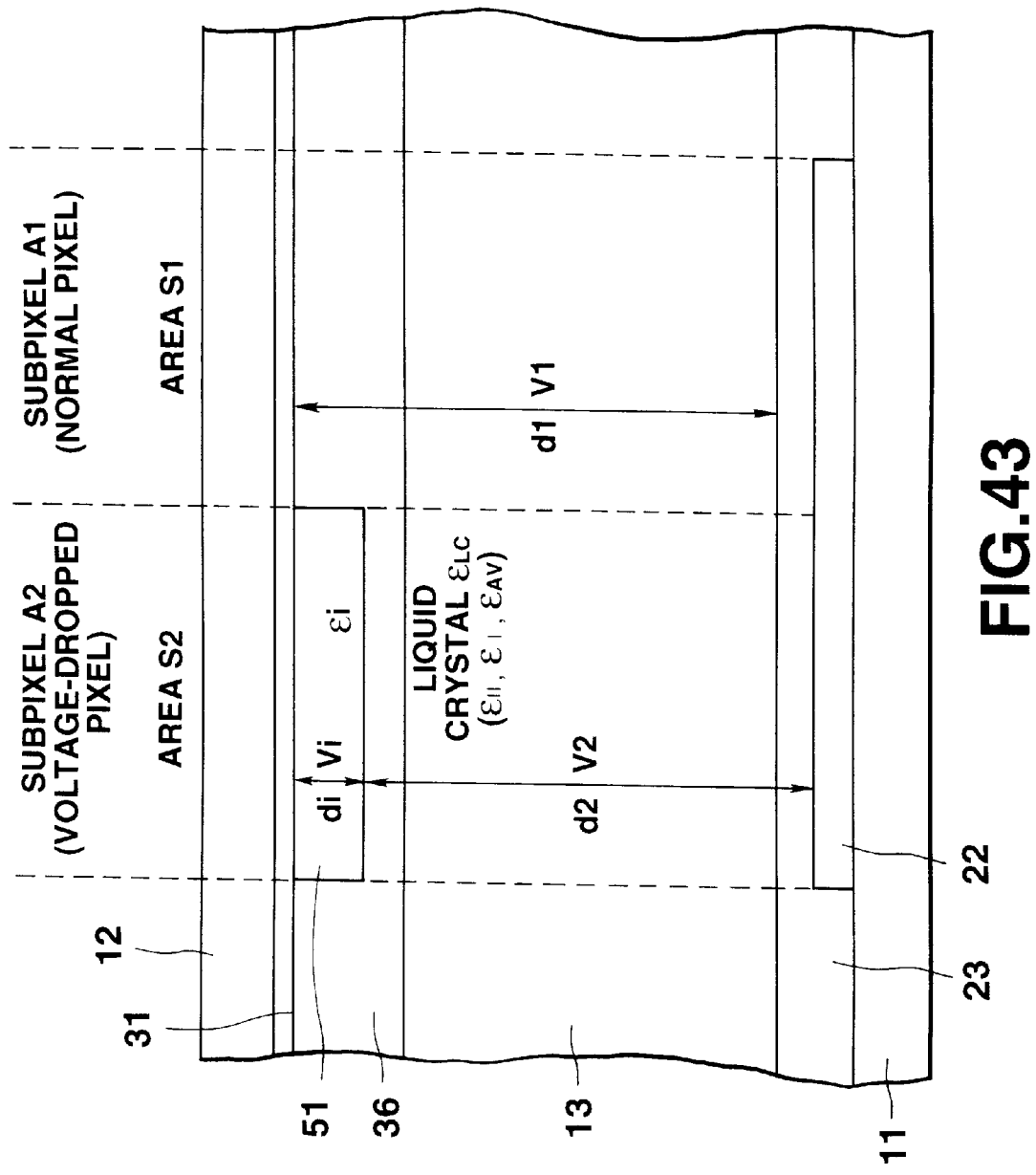
FIG. 43 is a cross-sectional view showing the structure of one pixel of the LCD device shown in FIG. 41.

FIG. 43 shows in enlargement the cross section of each pixel.

Each pixel even with such a structure is divided to the area (voltage-dropped pixel) A2 where the insulating film 51 is located, and the normal pixel A1. In the normal pixel A1, the voltage V1 applied between the pixel electrodes 22 and the opposing electrode 31 is applied almost directly to the liquid crystal 13.

In the voltage-dropped pixel A2, the voltage V1 applied between the pixel electrodes 22 and the opposing electrode 31 is dropped by the insulating film 51 and the resultant voltage is applied to the liquid crystal 13. The voltage drops caused by the alignment films 23 and 36 are neglected. (Because the voltage drops by the alignment films 23 and 36 are substantially the same for the subpixels A1 and A2, no practical problem will arise even when the voltage drops are disregarded.)

In the subpixel A2, the voltage V2 (V1=Vi+V2) dropped by Vi by the insulating film 51 is applied to the liquid crystal 13.

As shown in FIG. 43, let us denote that the cell gap of the normal pixel A1 (more accurately, the gap between the pixel electrodes 22 and the opposing electrode 31) is d1, the cell gap of the voltage-dropped pixel A2 (more accurately, the gap between the pixel electrodes 22 and the insulating film 51) is d2, and the thickness the insulating film 51 is di (d1=di+d2).

Given that the relative dielectric constant of the liquid crystal 13 which changes with the applied voltage is $\epsilon_{LC}$, the parallel dielectric constant of the liquid crystal 13 is $\epsilon\|$ and the vertical relative dielectric constant of the liquid crystal 13 is $\epsilon\perp$, the spatial relative dielectric constant $\epsilon_{AV}$ is defined by an equation (7). The equation (7) is the same as the equation (1).

$$\epsilon_{AV}=(\epsilon\|+2\cdot\epsilon\perp)/3 \tag{7}$$

Further, the pixel in the imaginary case where the applied voltage V1 is directly applied to the LC layer at the subpixel A2 is called an imaginary pixel.

The voltage-dropped pixel A2, as viewed from the viewpoint of an equivalent circuit, is the capacitor Ci of the insulating film 51 connected in series to an LC capacitor $C_{LC}$. Therefore, the voltage-dropped pixel A2 can be characterized by two parameters given by the following equation (8).

Voltage drop ratio: $\alpha=Vi/V1=1/(R+1)$

Voltage stretch ratio: $\beta=V1/V2-1=1/R$ (8)

where $R\equiv Ci/C_{LC}$ $Ci\equiv\epsilon i\cdot S2/di$ $C_{LC}\equiv\epsilon_{LC}\cdot S2/di$ The voltage drop ratio α indicates the ratio of the voltage drop caused by the insulating film 51 when the voltage V1 is applied between the pixel electrodes 22 and the opposing electrode 31. To allow the voltage-dropped pixel A2 to have the same luminance of the imaginary pixel, a higher voltage should be applied to the voltage-dropped pixel A2. The voltage stretch ratio β indicates the ratio of the increased voltage which should be applied due to the insulating film 51. The LC capacitance $C_{LC}$ is a monotonous increasing function with respect to the applied voltage, and the upper limit and the lower limit of the LC capacitance $C_{LC}$ are C||2 and C⊥2 given by an equation (9).

$C\|2\equiv\epsilon\|\cdot S2/d2$ $C\perp 2\equiv\epsilon\perp\cdot S2/d2$ (9)

The voltage drop ratio α and the voltage stretch ratio β increase with an increase in applied voltage.

Figure 44:
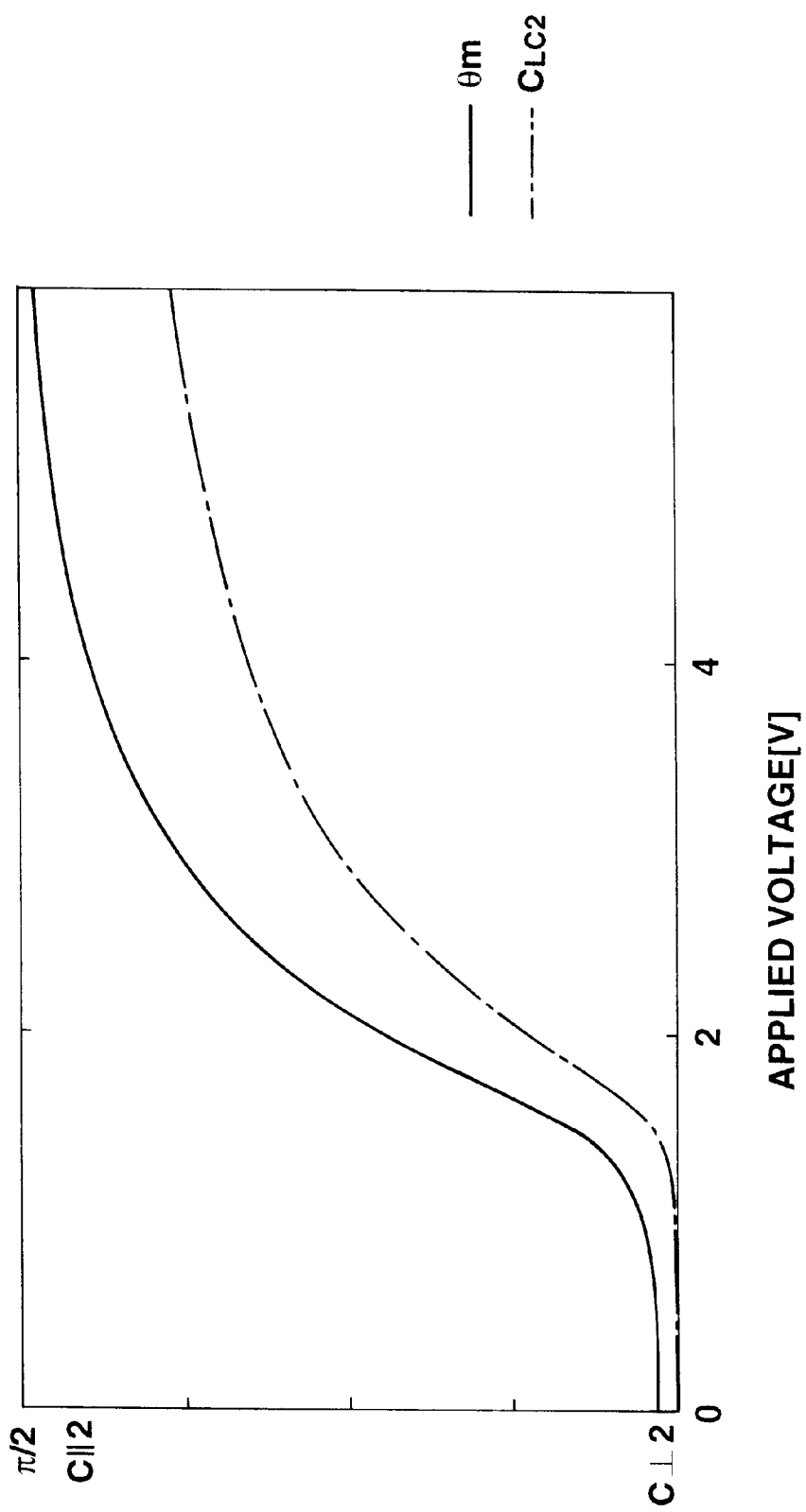
FIG. 44 is a diagram showing the relationship between the applied voltage to the LCD device shown in FIG. 41 and the capacitance and the tilt angle of the liquid crystal molecules.

FIG. 44 shows the relationship between the applied voltage to the liquid crystal and the capacitance $C_{LC}$ and the relationship between the applied voltage and the middle point in the thickness direction of the LC cell.

Accordingly, the average voltage drop ratio $\alpha_{AV}$ and the average voltage stretch ratio $\beta_{AV}$ are defined as an equation (10) using the spatial average relative dielectric constant $\epsilon_{AV}$ of the liquid crystal.

$\alpha_{AV}\equiv 1/(R_{AV}+1)$ $\beta_{AV}\equiv 1/R_{AV}$ (10)

$R_{VA2}\equiv Ci/C_{AV2}$ $C_{AV2}\equiv\epsilon_{AV}\cdot S2/d2$

The display characteristic of the entire pixels is therefore determined by the average display characteristic of the normal pixel A1 and the voltage-dropped pixel A2 over the area.

The area ratio S which is ratio of the area S2 of the voltage-dropped pixel A2 to the entire area S1+S2 of one pixel is given by the following equation (11).

$$S=S2/(S1+S2) \tag{11}$$

With the thickness di of the insulating film 51 fixed to 1.0 μm, the tendency of the 8-gradation view angle was analyzed while changing the relative dielectric constant εi of the insulating film 51 and the area ratio S as indicated by "x" in the Table 5 below.

TABLE 5

|  |  | εi | | | | |
|---|---|---|---|---|---|---|
|  |  | 2.0 | 3.0 | 3.5 | 4.0 | 7.0 |
| S% | 30 |  |  |  | x |  |
|  | 40 |  |  |  | x |  |
|  | 50 | x | x | x | x | x |
|  | 60 |  |  |  | x |  |
|  | 70 |  |  |  | x |  | where εi=3.5 is the relative dielectric constant of the silicon oxide film ($SiO_2$) and εi=7.0 is the relative dielectric constant of the silicon nitride film (SiN).

As the liquid crystal 13, a TN (Twisted Nematic) liquid crystal having the following physical properties was used.

Elastic constant ratio K3/K1=1.57
  K3/K2=1.89
  K1=10.6×10$^{-12}$N
Dielectric anisotropy: $\Delta\epsilon/\epsilon\perp$=1.29
  $\epsilon\perp$=3.48
The refractive wavelength dependency is given in Table 6.

TABLE 6

| λ nm | ne | no |
|---|---|---|
| 400 | 1.5784 | 1.4984 |
| 500 | 1.5660 | 1.4886 |
| 590 | 1.5599 | 1.4840 |
| 600 | 1.5594 | 1.4836 |
| 700 | 1.5556 | 1.4806 |

Pre-tilt angle θ0=3°
Twist angle φ0=−90°
Cell gap d1=5 μm, d2=4 μm
Δn·d=380 nm (λ=589 nm)
Anchoring strength de/d=0 (strong anchoring)

A chiral agent having a natural pitch p=97 μm and d/p=0.052 was added by an amount of 1% to the nematic liquid crystal having the above physical properties.

The polarization plates 14 and 15 in use had the following properties.

The refractive wavelength dependency is given in Table 7.

TABLE 7

| λ nm | ne | no | Ke | Ko |
|---|---|---|---|---|
| 400 | 2.2705 | 2.2705 | 0.0061 | 0.0008 |
| 500 | 1.6305 | 1.6305 | 0.0095 | 0.0001 |
| 590 | 1.6503 | 1.6503 | 0.0101 | 0.0002 |
| 600 | 1.6238 | 1.6238 | 0.0109 | 0.0002 |
| 700 | 1.6616 | 1.6616 | 0.0114 | 0.0001 |

Thickness of polarizer dpol=35 μm
Parallel transmittance T∥=34.12
Orthogonal transmittance T⊥=0.019

The following are the retardations for the normal pixel A1 and the voltage-dropped pixel A2.

Normal pixel A1: Δn·d1=380 nm (λ=589 nm)
Voltage-dropped pixel A2: Δn·d2=304 nm (λ=589 nm)

First, with the area ratio S fixed to 50%, the relative dielectric constant $\epsilon i$ of the insulating film 51 was changed to 2.0, 3.5, 4.0 and 7.0. The average voltage drop ratio $\alpha_{AV}$, and the average voltage stretch ratio $\beta_{AV}$ in this case are given in the following Table 8.

TABLE 8

| $\epsilon i$ | 2.0 | 3.0 | 3.5 | 4.0 | 7.0 |
|---|---|---|---|---|---|
| $\alpha_{AV}$ | 0.40 | 0.30 | 0.27 | 0.25 | 0.16 |
| $\beta_{AV}$ | 0.66 | 0.44 | 0.37 | 0.33 | 0.19 | di = 1 μm

Figure 45:
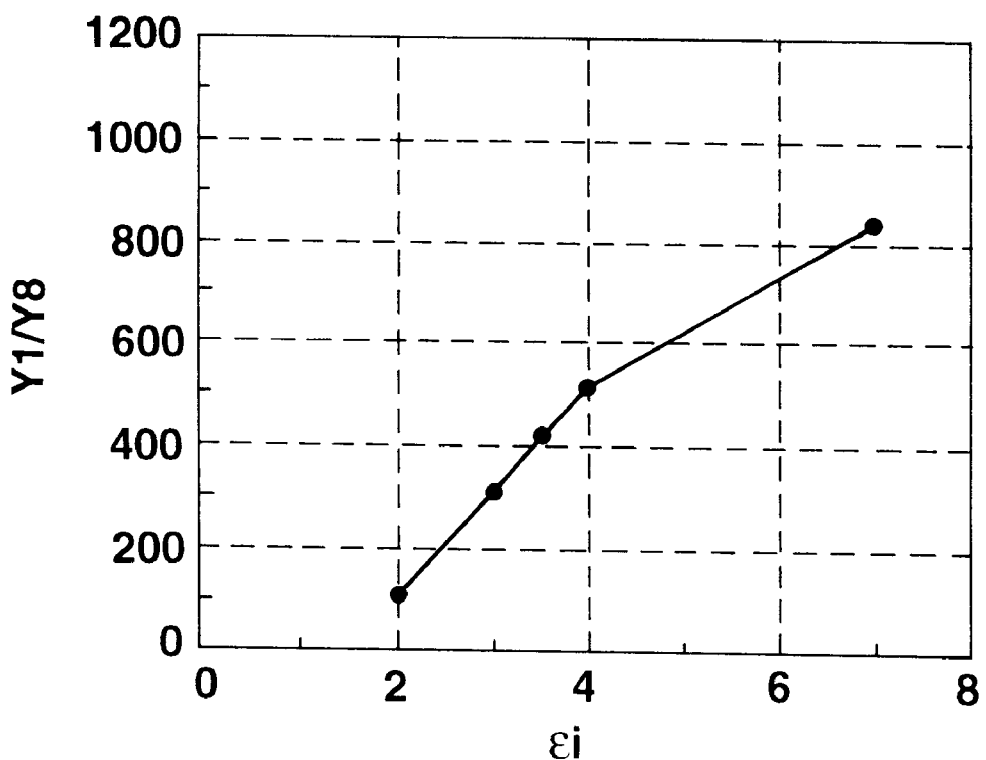
FIG. 45 is a diagram depicting a change in contrast when the area ratio S is fixed to 50% and the relative dielectric constant εi of an insulating film is changed.
Figure 46A:
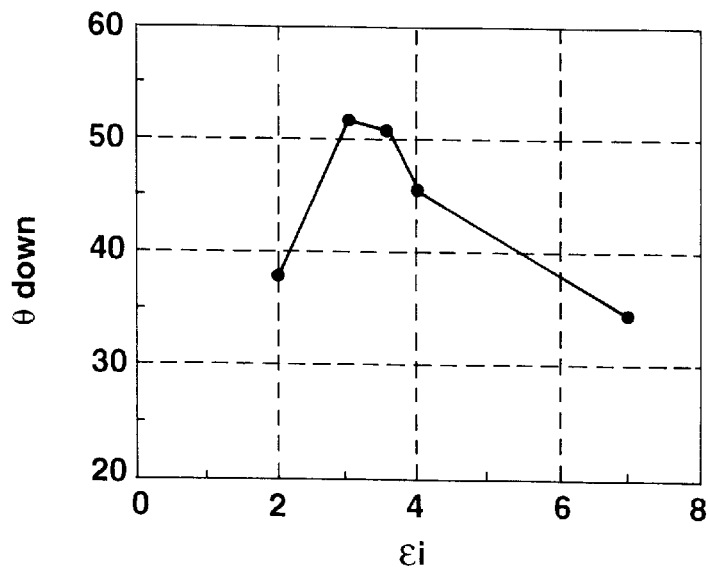
FIGS. 46A to 46C are diagrams showing a change in view angle θ when the area ratio S is fixed to 50% and the relative dielectric constant εi of the insulating film is changed.
Figure 46B:
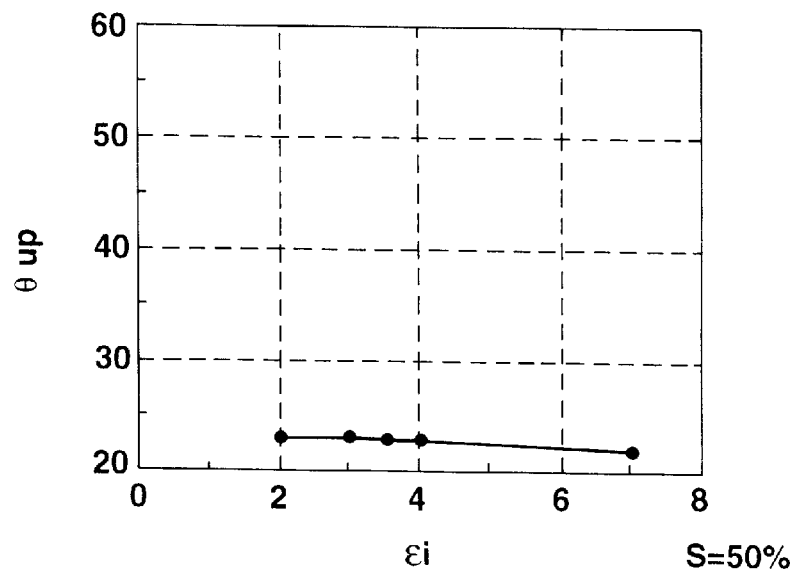
Figure 46C:
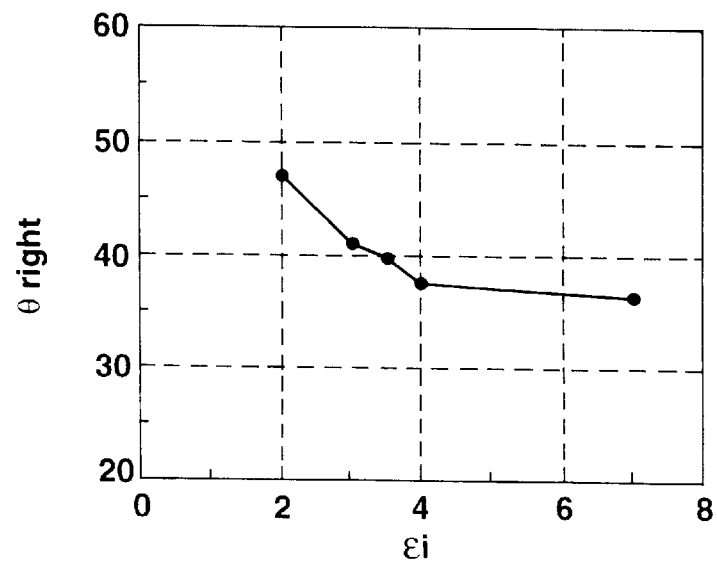

FIG. 45 shows the relationship between the display contrast Y1/Y8 and the relative dielectric constant $\epsilon i$. FIGS. 46A to 46C show the relationship between the relative dielectric constant $\epsilon i$ and the angle at which the inversion of adjoining gradations occurs when an image with eight different gradations is displayed, as observed from the downward, upward and rightward directions as defined in FIG. 5. The characteristic in the leftward direction is the same as that in the rightward direction.

Given that the luminance of the n-th gradation is Yn and the voltage then is Vn (n=1, 2, . . . , 8), the following definitions were used.

V1=1.5 V, V8=6.0 V and contrast=Y1/Y8

The minimum angle or the view angle at which the inversion of the luminance Y occurs between adjoining gradations when one observes from the downward direction, upward direction and rightward direction are respectively θdown, θup and θright where θ is the angle formed by the normal line to the display surface of the LCD device and the line of sight.

Figure 47:
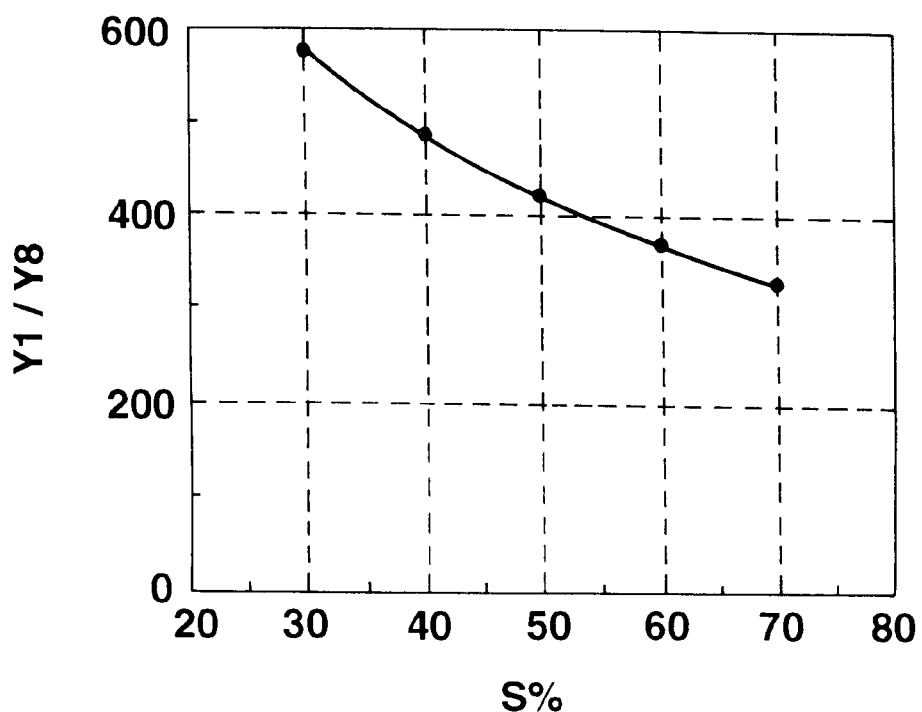
FIG. 47 is a diagram depicting a change in contrast when the relative dielectric constant εi of the insulating film is fixed to 3.5 and the area ratio S is changed.

As shown in FIG. 47, the contrast drastically decreases with a decrease in the relative dielectric constant $\epsilon i$. This is because the Y-V curve of the voltage-dropped pixel A2 is stretched so that the black level falls to become whitish. The white level of the voltage-dropped pixel A2 becomes darker by about 5% than the white level of the normal pixel A1.

Figure 48A:
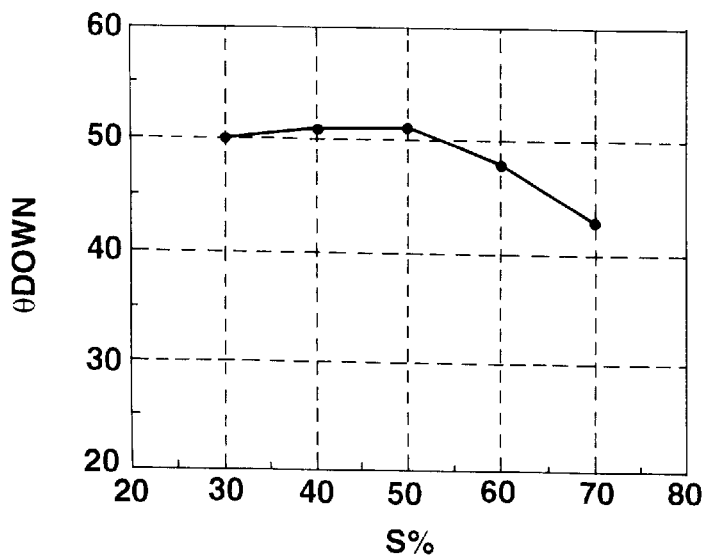
FIGS. 48A to 48C are diagrams depicting a change in view angle θ when the relative dielectric constant εi of the insulating film is fixed to 3.5 and the area ratio S is changed.

As shown in FIG. 48A, the downward view angle θdown becomes more than double the view angle of the normal pixel when the relative dielectric constant $\epsilon i$=3.0 to 3.5 (23° is stretched to 50°).

Figure 48B:
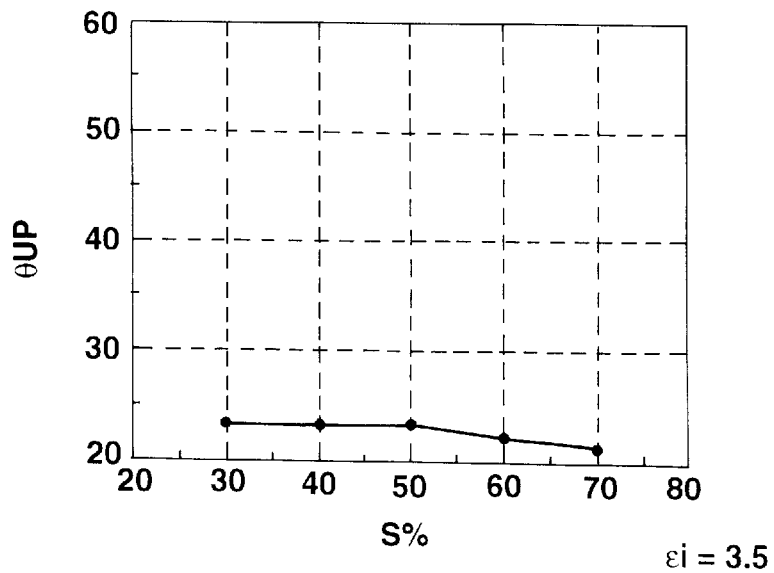

As shown in FIG. 48B, the upward view angle θup hardly changes.

Figure 48C:
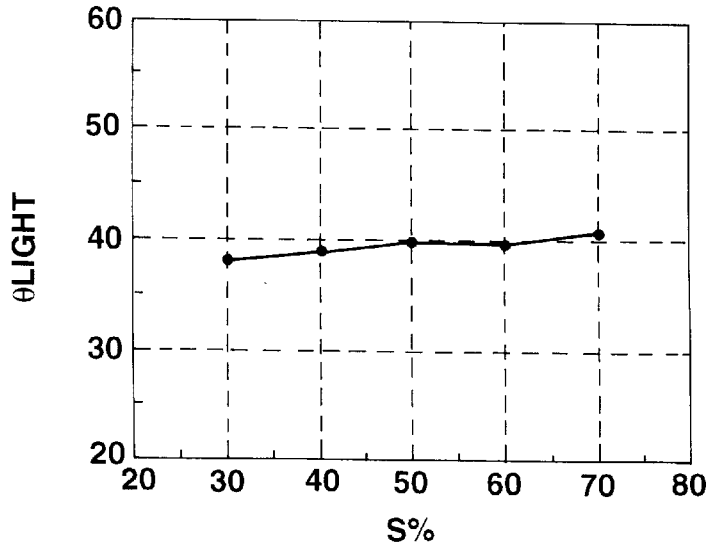

As shown in FIG. 48C, the rightward view angle θright monotonously becomes wider as the relative dielectric constant $\epsilon i$ decreases.

Next, the contrast and the view angle were measured when, with the relative dielectric constant $\epsilon i$ fixed to 3.0, the area ratio S was changed to 30%, 40%, 50%, 60% and 70%.

FIG. 47 shows the relationship between the contrast and the area ratio S.

FIGS. 48A to 48C show the relationship between the angle (view angle) and the area ratio S by which the inversion of adjoining gradations occurs, as observed from the downward, upward and rightward directions. The characteristic in the leftward direction is the same as that in the rightward direction.

As shown in FIG. 47, the contrast decreases the area ratio S increases. This is because as the area ratio S increases, the ratio of the voltage-dropped pixel A2 occupying each pixel increases.

As shown in FIG. 48A, the downward view angle θdown becomes maximum=51° when S=40 to 50%.

As shown in FIGS. 48B and 48C, the upward and rightward view angles θup and θright hardly change even when the area ratio S changes.

The view angle when S=0% is the same as that of the normal pixel A1.

When S=100%, the view angle coincides with the view angle of the imaginary pixel.

From the above analysis of the tendency of the 8-gradation view angle, it can be concluded that the optimum value of the relative dielectric constant $\epsilon i$ of the insulating film 51 is 2.5 to 4.0, desirably 3.0 to 3.5, and the optimum value of the area ratio S is 30 to 55%, desirably 40 to 50%.

The contrast in this case becomes 40% of that of the normal pixel (1190 reduced to 487).

FIGS. 49A, 49B, 50A and 50B show the characteristics of the luminance Y and applied voltage of the optimized LCD device for the individual sight angles, as observed from the upward, downward, rightward and leftward directions. Likewise, FIGS. 51A, 51B, 52A and 52B show the log Y-applied voltage characteristics for the individual sight angles, as observed from the upward, downward, rightward and leftward directions.

Figure 53A:
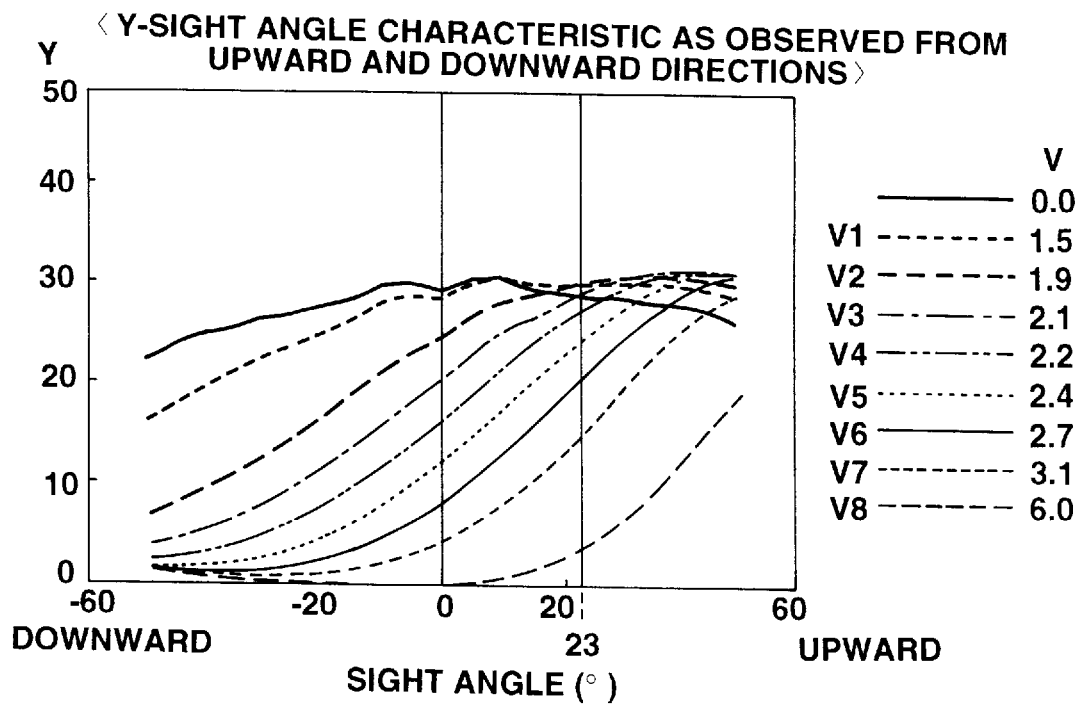
FIGS. 53A to 54B are graphs showing the relationship between the sight angle and the luminance Y and between the sight angle and the logarithm of the luminance Y when the relative dielectric constant εi of the insulating film is fixed to 3.5 and the area ratio S is fixed to 40%.
Figure 53B:
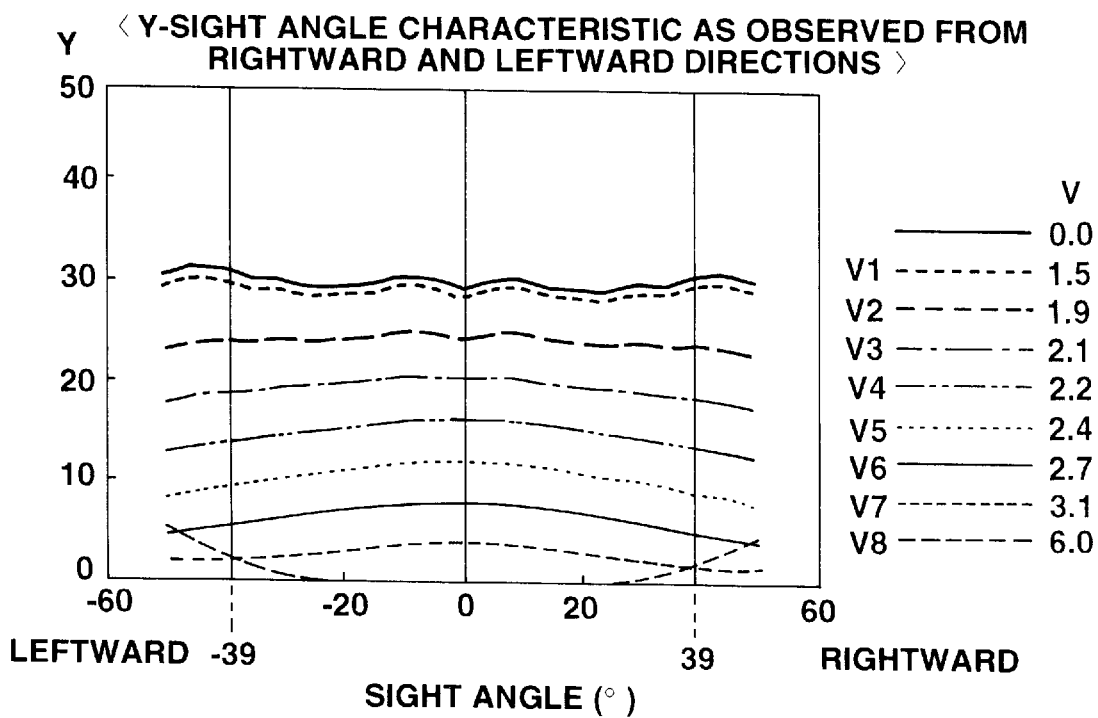
Figure 54A:
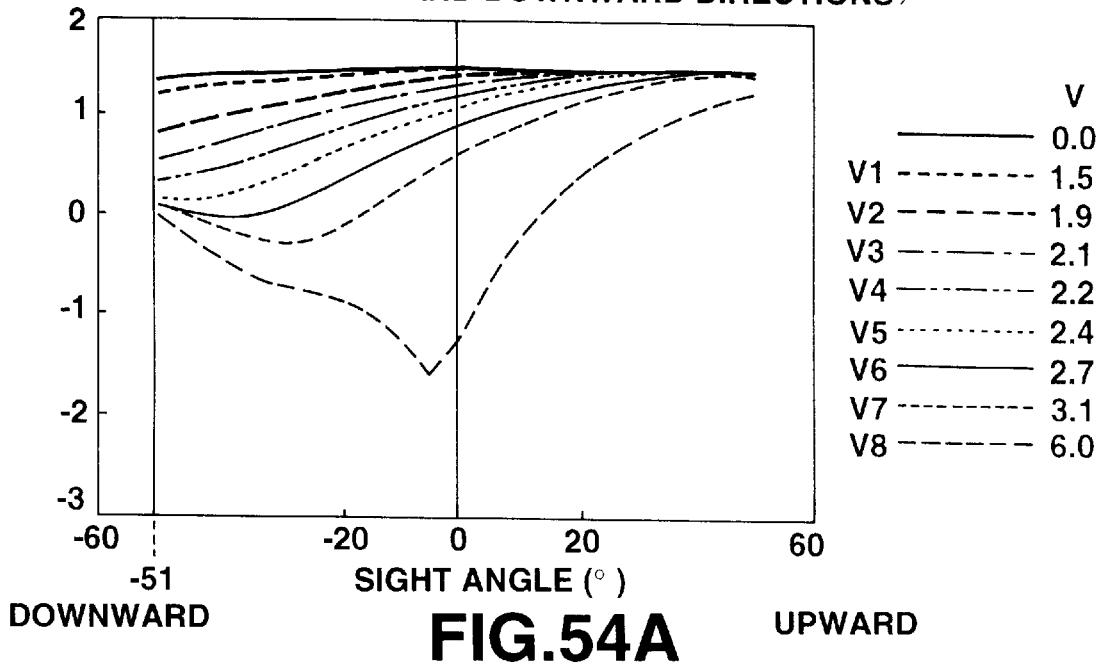
Figure 54B:
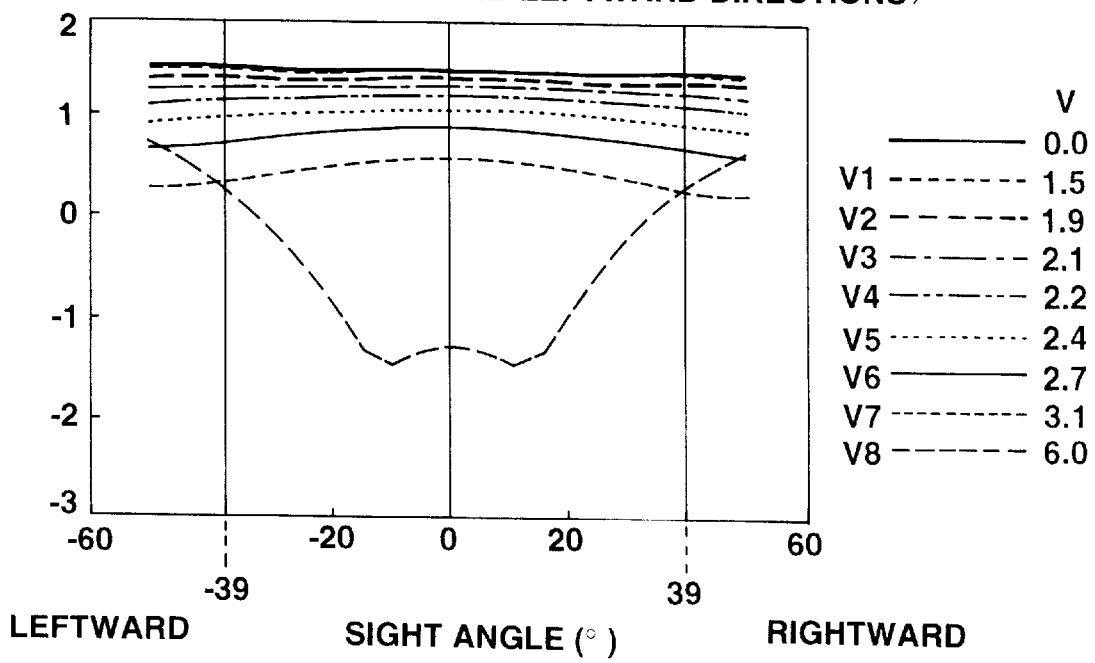

FIGS. 53A and 53B show the characteristics of the luminance Y and the sight angle of the optimized LCD device for the individual applied voltages, as observed from the upward and downward directions and the rightward and leftward directions. Likewise, FIGS. 54A and 54B show the log Y-sight angle characteristics for the individual applied voltages, as observed from the upward and downward directions and the rightward and leftward directions.

Figure 49A:
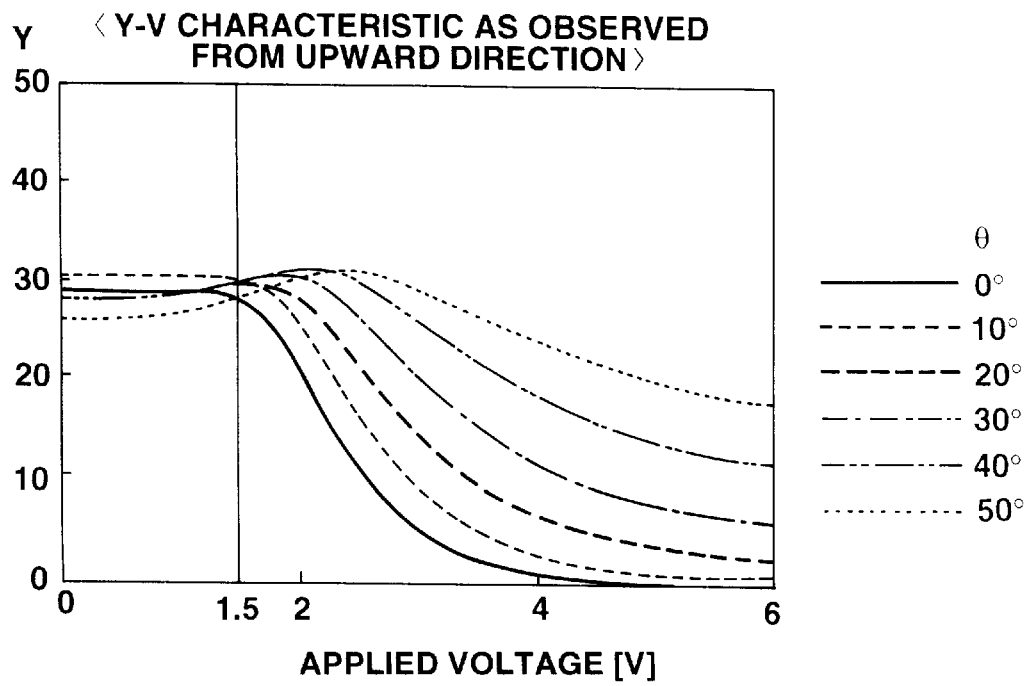
FIGS. 49A to 50B are graphs showing the relationship between the applied voltage V and the luminance Y when the relative dielectric constant εi of the insulating film is fixed to 3.5 and the area ratio S is fixed to 40%.

In the upward direction, as shown in FIG. 49A, as the sight angle increases, the luminance Y increases, making the black level whitish. But, the gradation inversion is not prominent (the gradation inversion does not occur as long as the Y-V curve is a monotonous decreasing function).

Figure 49B:
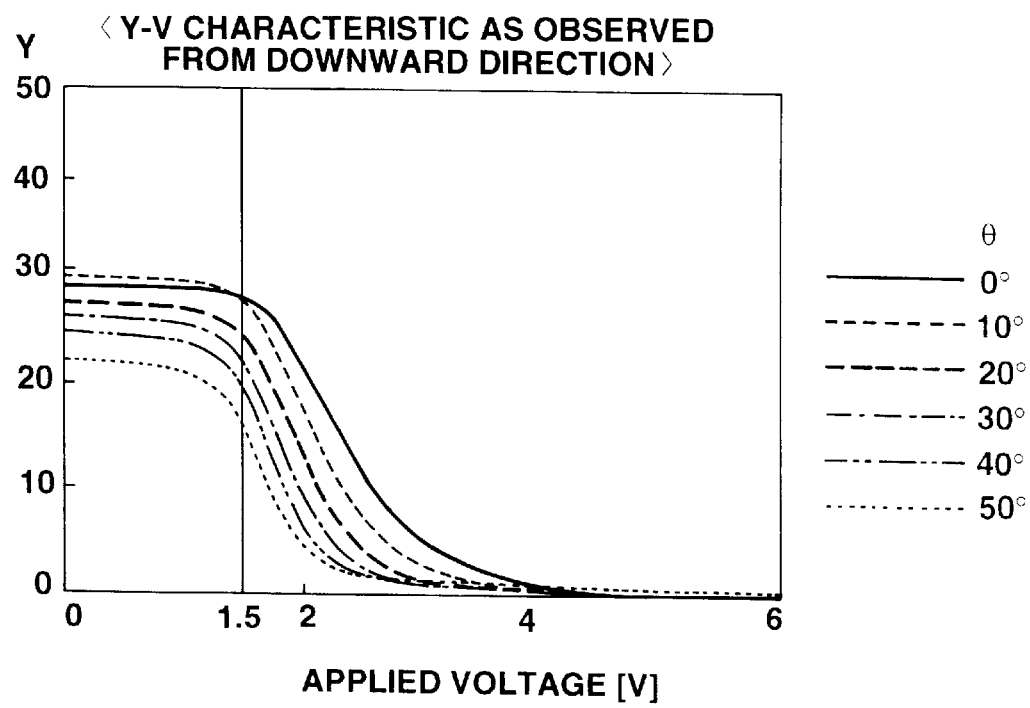

In the downward direction, as shown in FIG. 49B, as the sight angle increases, the luminance Y decreases. But, the gradation inversion does not occur because the Y-V curve for the sight angle of 50° does not have a bump in the intermediate gradation.

Figure 50A:
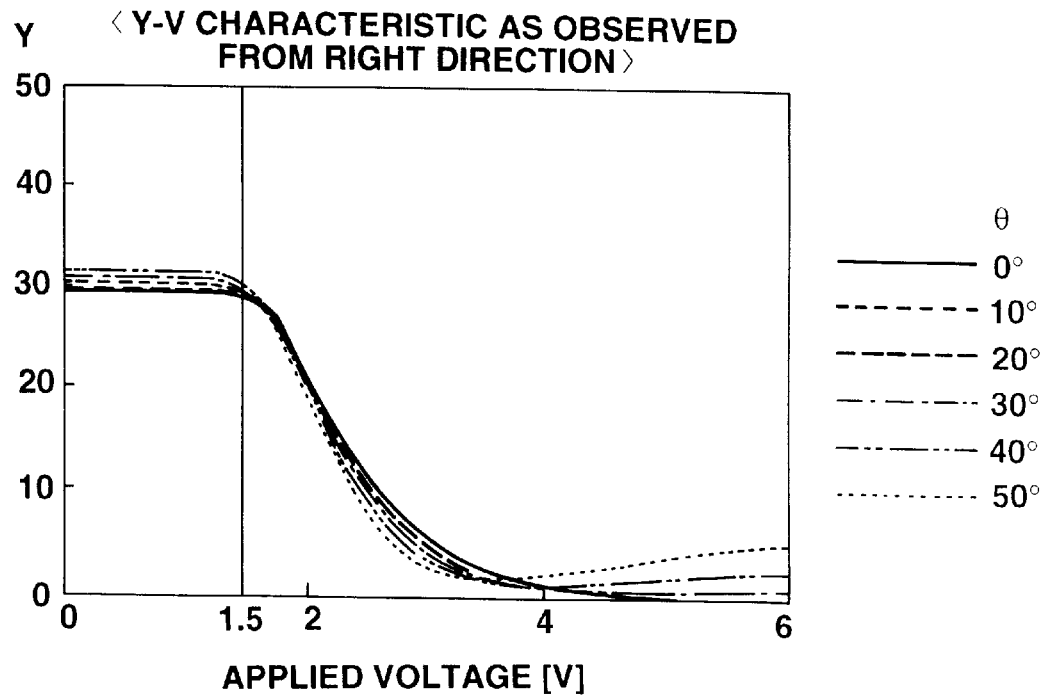
Figure 50B:
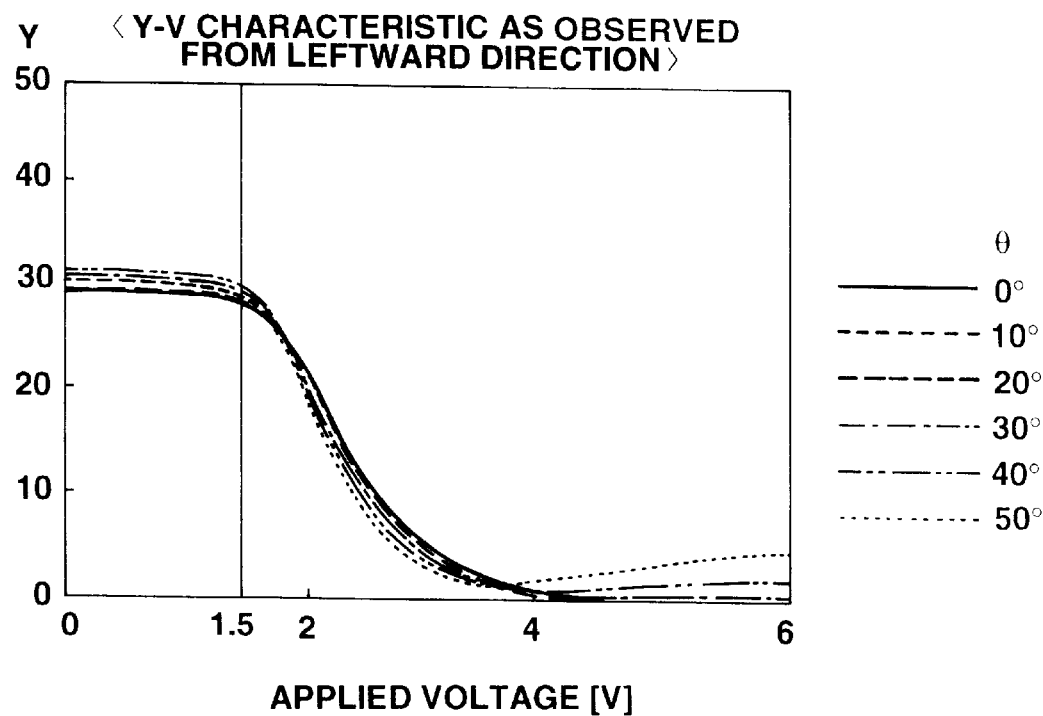
Figure 51A:
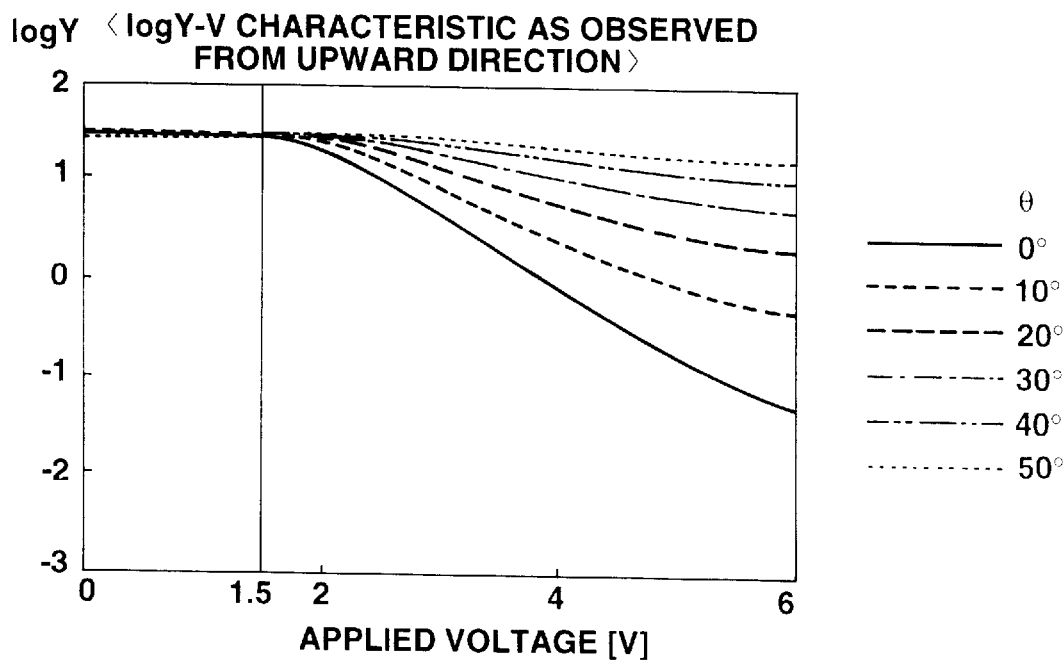
FIGS. 51A to 52B are graphs showing the relationship between the applied voltage V and the logarithm of the luminance Y when the relative dielectric constant εi of the insulating film is fixed to 3.5 and the area ratio S is fixed to 40%.
Figure 51B:
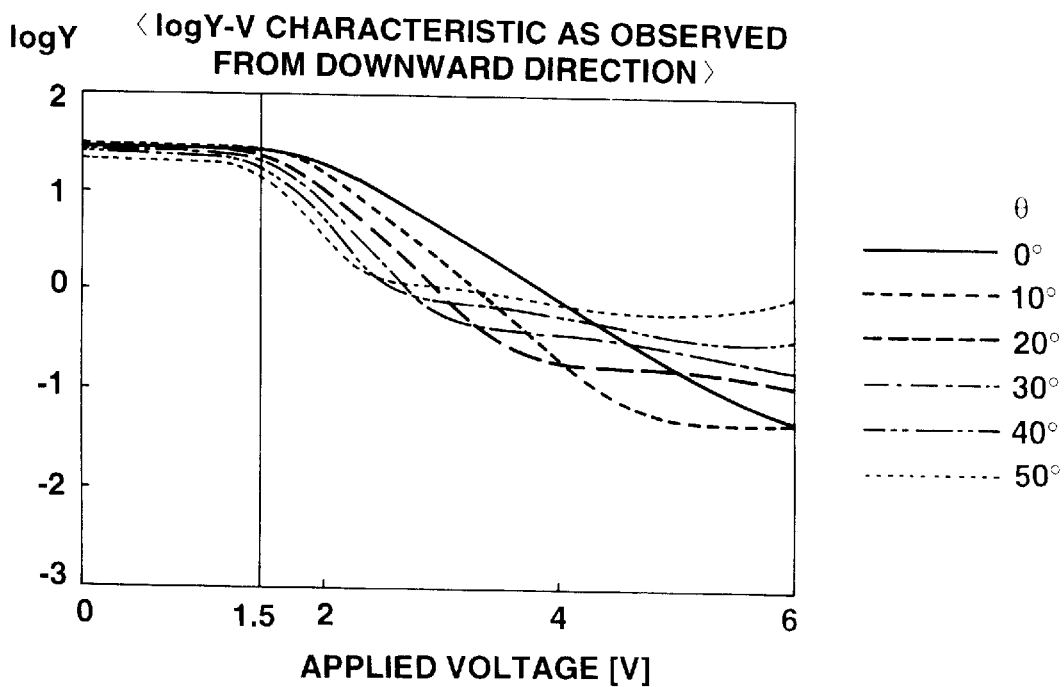
Figure 52A:
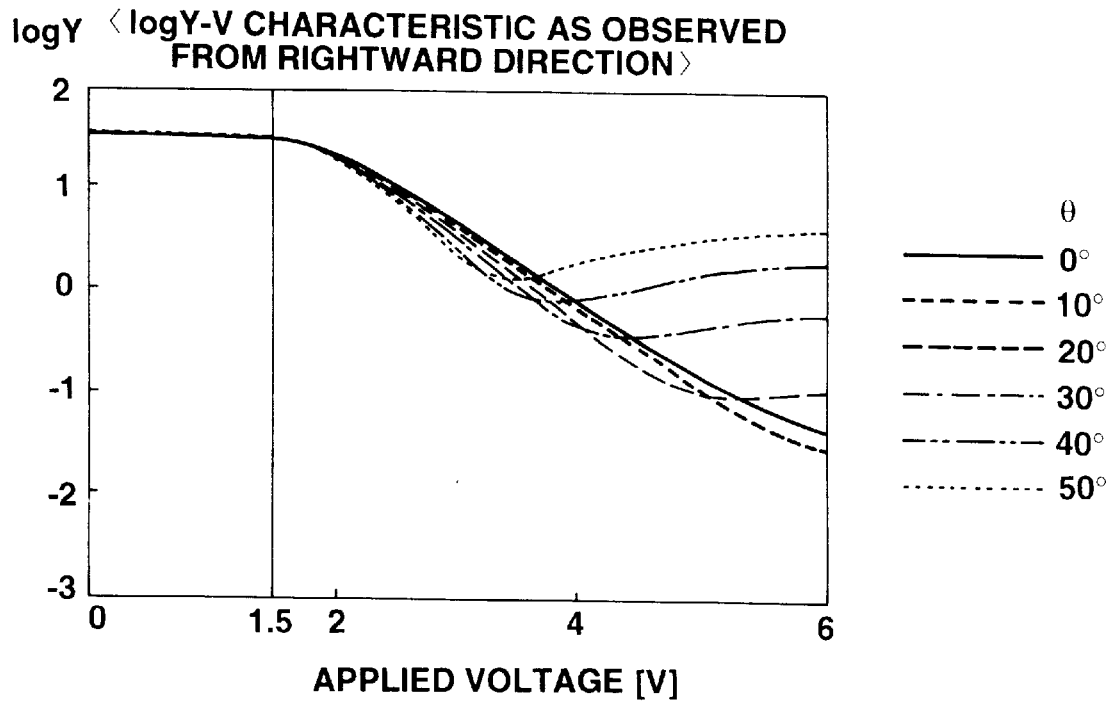
Figure 52B:
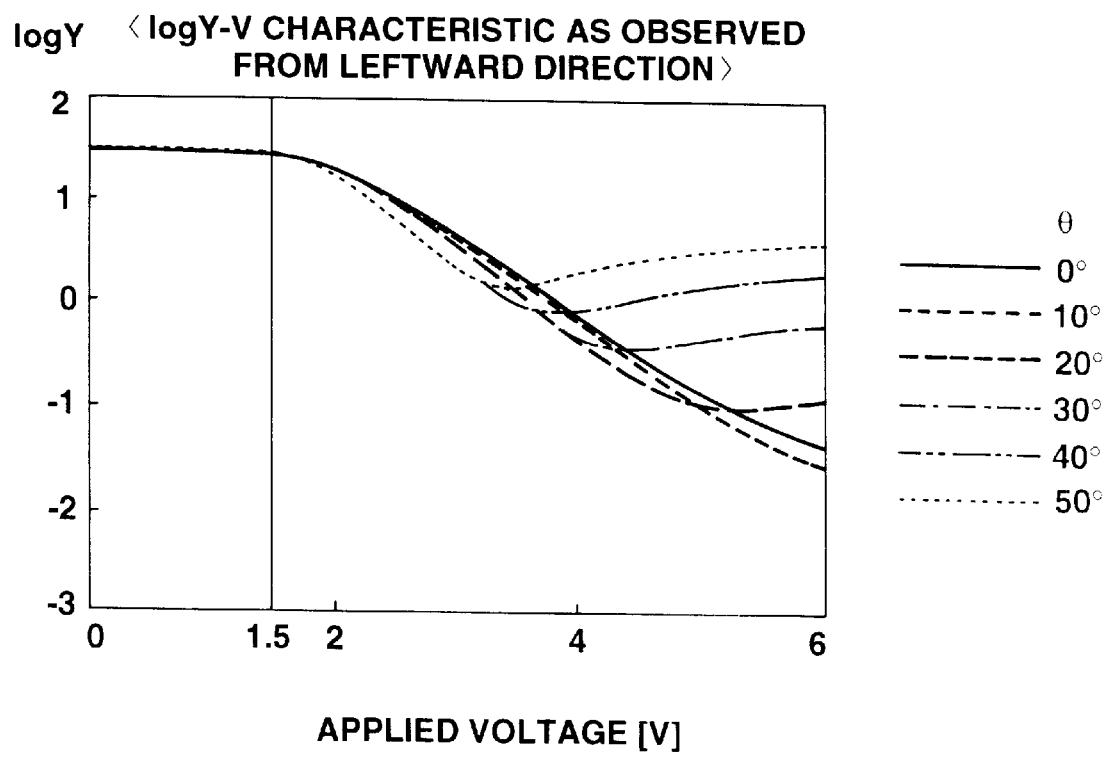

As shown in FIGS. 50A and 50B, in both the rightward and leftward directions, as the sight angle increases, the luminance Y decreases. But, the Y-V curve for the view angle of 50° becomes shallower at the intermediate gradation voltage and the bump at the voltage of about 6 V is suppressed.

In FIGS. 53A, 53B, 54A and 54B, the 8-gradation voltages are defined as follows. The bright-state voltage is 1.5 V and the dark-state voltage is 6.0 V.

Six intermediate gradation voltages are what is obtained by equally dividing the luminance Y at 1.5 V by seven. The eight voltages are called V1, V2, . . . , V8 from the lowest one.

FIGS. 53A and 53B and FIGS. 54A and 54B respectively show the characteristics of the luminances Y1, . . . , Y8 and the view angles and the characteristics of the logarithm values of the luminances and the view angles, when the voltage to be applied between the pixel electrodes 22 and the opposing electrode 31 and the overlying electrode 35 is fixed to V1 to V8. It is understood from FIGS. 53A to 54B that the area of the sight angle which can provide the proper luminance order of the eight gradations, i.e., the view angle, is widened as follows.

Upward and downward: −51° to +23°
(−: down and +: up)
Rightward and leftward: −39° to +39°
(−: left and +: right)

With the above structure, as described above, the white level of each pixel becomes darker by about 5% than the white level of the normal pixel.

Figure 55:
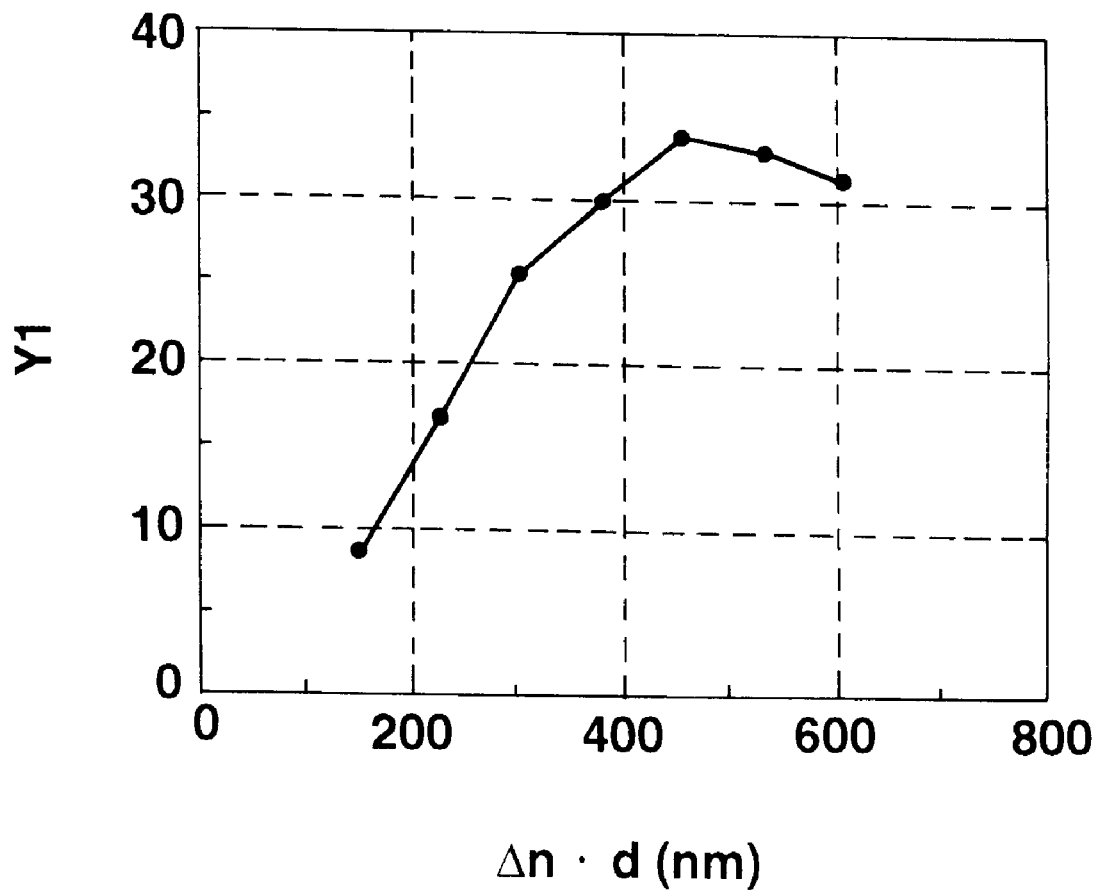
FIG. 55 is a diagram showing the relationship between a change in Δn·d and the luminance Y1 of the white level.

To overcome this shortcoming, the luminance Y1 (white level) in the bright state when the Δn·d of the liquid crystal was changed was obtained. The results of the measurement are shown in FIG. 55. As shown in FIG. 55, when Δn·d is in the vicinity of 455 nm (λ=589 nm), the luminance Y1 in the bright state shows the peak.

To set the white level of the normal pixel A1 and the white level of the voltage-dropped pixel A2 to the same luminance, therefore, Δn·d1 and Δn·d2 should be adjusted in such a way as to sandwich Δn·d=455 nm which gives the maximum Y1. That is, Δn of the liquid crystal 13 should be adjusted so that the following equation (12) is satisfied.

$$\Delta n \cdot d1 < \Delta n \cdot d = 455 nm < \Delta n \cdot d2 \qquad (12)$$

This design improves the view angle and makes the white level brighter, thus permitting an image with a high contrast to be displayed.

This invention is not limited to the above-described second embodiment, but may be modified and adapted in various other forms.

Although the insulating film 51 is provided on the opposing electrode 31 in the second embodiment, the insulating film 51 may be provided on the pixel electrodes 22.

While this invention is adapted for a monochrome LCD device in this embodiment, the invention may also be adapted for a color LCD device. For instance, a color filter and a flat film may be provided between the opposing substrate 12 and the opposing electrode 31 to color the light which passes each pixel, thereby allowing a color image to be displayed.

Alternatively, a color filter may be provided on each pixel area on the opposing electrode 31 and the insulating film 51 may be provided on the color filter. In this case, a voltage drop is caused by the color filter. Because the voltage drop ratio and the voltage stretch ratio for the portion where the insulating film 51 is provided differ from those for the portion where the insulating film 51 is not provided, the same advantages as those of the second embodiment can be obtained.

Third Embodiment

In the foregoing description, this invention has been described as a TFT LCD device as its adapted example. But, this invention may also be adapted for an active matrix type LCD device which uses MIM (Metal Insulator Metal) or the like. This invention may further be adapted for a passive matrix type LCD device which does not use active elements.

Although an insulating film is provided on a part of each pixel area of the opposing electrode 31 in the above-described embodiment, a plurality of insulating films may be provided in each pixel. Other elements than the insulating film may also be provided as long as the voltage to be applied to the liquid crystal can be changed partially.

Figure 56:
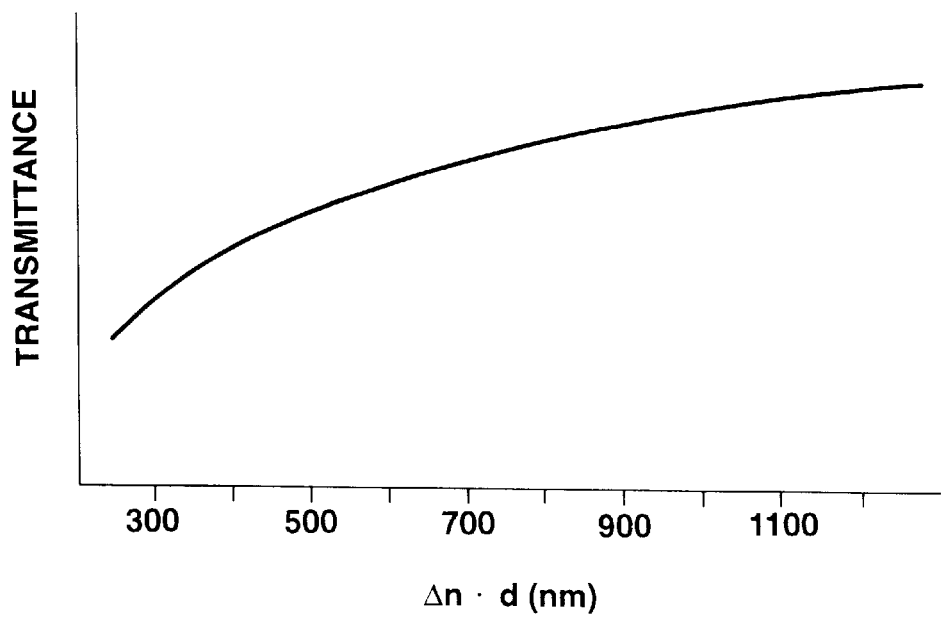
FIG. 56 is a diagram showing the relationship between a change in Δn·d of a normal pixel and the transmittance.
Figure 57:
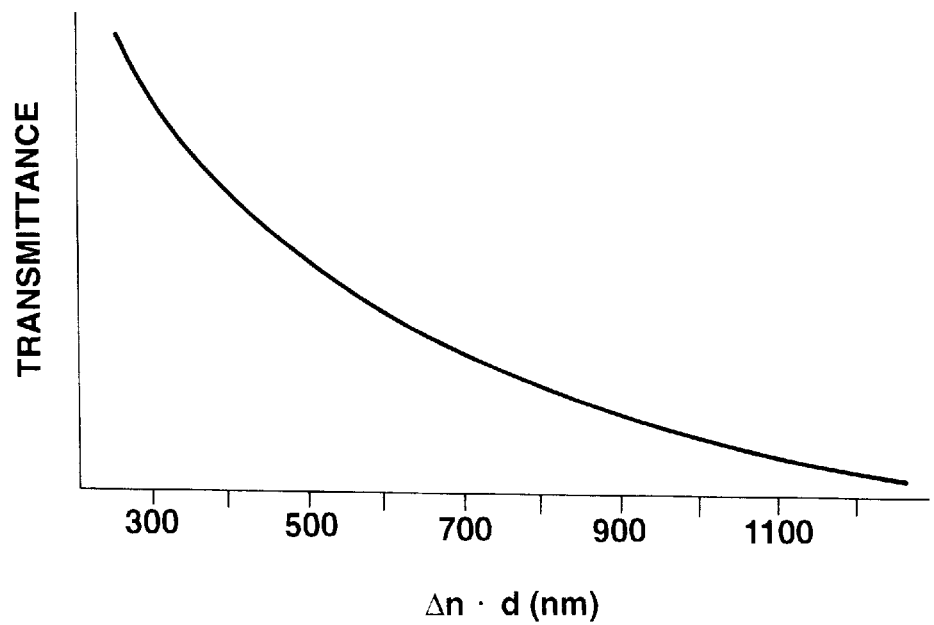
FIG. 57 is a diagram showing the relationship between a change in Δn·d of the normal pixel and the view angle.

FIG. 56 shows the relationship between the Δn·d of the liquid crystal 13 of the normal pixel A1 and the transmittance, and FIG. 57 shows the relationship between the Δn·d of the liquid crystal 13 of the normal pixel A1 and the view angle. It is apparent from FIGS. 56 and 57 that the transmittance and the view angle both depend on Δn·d and have such a trade-off relation that as one increases, the other decreases. In this respect, Δn·d of the conventional LCD device is set in accordance with the usage of the LCD device. For instance, Δn·d is set to about 1100 nm for the LCD device which requires bright display, and is set to about 210 to 600 nm for the LCD device which requires a wide view angle.

While the LCD device whose Δn·d is about 1100 nm has a high light transmittance and provides bright display, it suffers the narrow view angle. While the LCD device whose Δn·d is 210 to 600 nm has a wide view angle, it suffers the low light transmittance and dark display.

A description will now be given of a simple matrix type LCD device which is designed to overcome this problem, with reference to FIG. 58.

This LCD device comprises a pair of substrates 111 nd 112 made of glass or the like, a seal member (not shown) for adhering the transparent substrates 111 and 112, and a nematic liquid crystal 119, which has a positive dielectric anisotropy and is sealed between both substrates 111 and 112. Multiple transparent scan electrodes 114 are formed in parallel to one another on the inner surface of the substrate 112, and multiple transparent signal electrodes 113 are formed in parallel to one another on the inner surface of the substrate 111. The signal electrodes 113 are arranged perpendicular to the scan electrodes 114. Alignment films 115 and 116 are respectively provided on the electrode-forming surfaces of the substrates 111 and 112.

A black mask 117 formed of metal or the like is formed on one of the substrate, e.g., on the substrate 112. The scan electrodes 114 on the substrate 12 are formed on a transparent insulating film 118 which covers the black mask 117.

The alignment films 115 and 116 are formed of a horizontal alignment member such as a polyimide-based alignment member, and the film surfaces are subjected to an aligning treatment like rubbing. The molecules 119a of the liquid crystal 119 are twisted at a twist angle of nearly 90° between both substrates 111 and 112 while being pre-tilted to a certain degree with respect to the surfaces of the alignment films 115 and 116.

Although FIG. 56 shows all the LC molecules 119a in a state where their long axes or directors are directed along the surface of that drawing sheet, the LC molecules 119a are twisted rightward or leftward while being pre-tilted.

Transparent dielectric layers 121 are formed in predetermined areas in the individual pixels on the signal electrodes 113. The alignment film 115 is provided to cover the dielectric layers 121.

Each dielectric layer 121 is formed of a material which differs from the alignment film 115 in at least one of the relative resistance and the dielectric constant. The dielectric layers 121 and the alignment film 115 form a dielectric film 120 at least one of whose relative resistance and dielectric constant differs between a plurality of areas W1 and W2 in one pixel.

In this embodiment, the ferrodielectric layer 121 is made of an insulating material, like $SiO_2$, whose relative resistance and dielectric constant are both greater than those of the alignment film 115. This dielectric layer 121 is formed by forming an $SiO_2$ film on the substrate 111 on which the signal electrodes 113 are formed, and then patterning this $SiO_2$ film by photolithography.

The dielectric layer 121 is provided at multiple sections of a single pixel in such a manner that the total area of the areas W2 in the entire pixel area where the dielectric layer 121 is present becomes substantially equal to the total area of the areas W1 where the dielectric layer 121 is not present.

Further, the produce $\Delta n \cdot d$ of the refractive anisotropy $\Delta n$ of the liquid crystal 119 and the thickness d of the LC layer is set greater than 600 nm in this LCD device. The value of $\Delta n \cdot d$ is equal to or greater than 610 nm, desirably 650 nm to 1200 nm, and is more desirably 700 to 1100 nm.

In the LCD device with the above structure, the impedances between the electrodes 113 and 114 at a plurality of areas in one pixel differ from one another, i.e., the impedance at the area W2 where the dielectric layer 121 is provided differs from the impedance at the area W1 where the dielectric layer 121 is not present. Even if the voltage to be applied between the electrodes 113 and 114 is the same over the entire pixel area, electric fields with different strengths according to the impedance difference are applied to the liquid crystals 119 at the areas W1 and W2.

The impedance between the electrodes 113 and 114 at the area W2 is greater than the impedance at the area W1.

When the surface of the alignment film 115 is formed flat as shown in FIG. 1, the surface thickness of the alignment film 115 becomes thinner on the dielectric layer 121 so that the impedance of the alignment film 115 at the area W2 is small. But, the total impedance of the dielectric layer 121 and the alignment film 115 is greater than the impedance at the area W1 where the dielectric layer 121 is not present.

When the alignment film 115 has substantially a uniform thickness and has a rugged surface, the impedance of the alignment film 115 is substantially the same over the entire area. Therefore, the impedance of the area W2 is greater than the impedance of the area W1 by the impedance of the dielectric layer 121. This leads to V1>V2 where V1 is the strength of the applied voltage to the liquid crystal 119 at the area W1 where the dielectric layer 121 is not present and V2 is the strength of the applied voltage to the liquid crystal 119 at the area W2 where the dielectric layer 121 is located.

Therefore, the tilt angle of the LC molecules 119 (the angle with respect to the substrates 111 and 112) when the voltage is applied to the electrodes 113 and 114 is large in the area W1 in each pixel where no dielectric layer 121 is present, and is small in the area W2 where the dielectric layer 121 is provided.

Accordingly, a plurality of areas with different alignment states are formed in each pixel. Even when $\Delta n \cdot d$ exceeds 600 nm, a wide view angle can be obtained. That is, when each pixel is not divided to subpixels, it is conventionally necessary to set $\Delta n \cdot d$ as small as 210 to 600 nm while suffering darker display. According to the LCD device of the third embodiment as well as those of the first and second embodiments, however, since areas with different alignment states are formed in each pixel, the view angle is wide though $\Delta n \cdot d$ is equal to 600 nm or above. As $\Delta n \cdot d$ is equal to or greater than 600 nm, the display is bright. It is desirable that $\Delta n \cdot d$ be set to range from 650 nm to 1200 nm, more desirably from 700 nm to 1100 nm.

Figure 58:
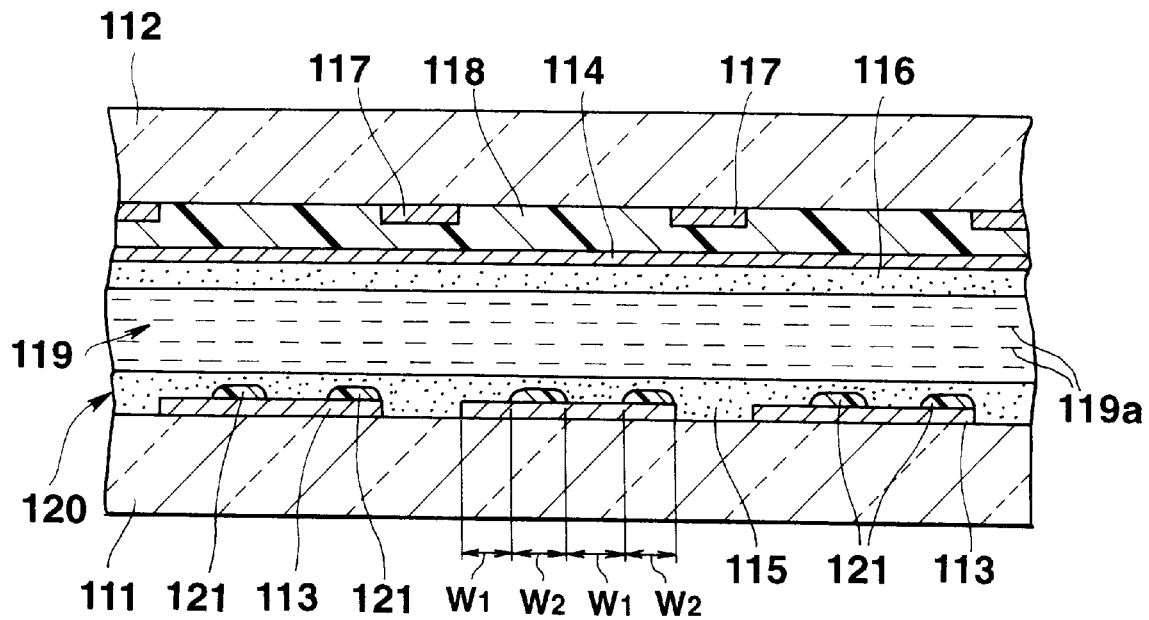
FIG. 58 is a cross-sectional view showing the structure of an LCD display device according to a third embodiment of this invention.
Figure 59:
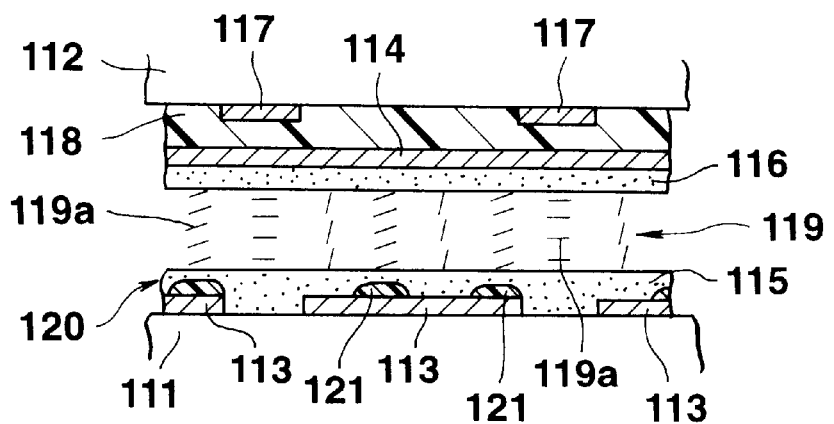
FIG. 59 is a diagram for explaining the alignment state of the liquid crystal molecules in the LCD device shown in FIG. 58.

Although the dielectric layer 121 is made of $SiO_2$ whose relative resistance and dielectric constant are both greater than those of the alignment film 115 in the example in FIG. 58, the dielectric layer 121 may be formed of another transparent insulating material or a transparent conductive material like ITO as long as at least one of its relative resistance and dielectric constant differs from that of the alignment film 115; it does not matter whether the former relative resistance or dielectric constant is greater or smaller than the latter one. If a photosensitive resin is used as the transparent insulating material, the dielectric layer can be formed by a simple step of coating this photosensitive resin on the substrate 111 and then exposing and developing the resultant structure.

Further, the dielectric layer may be formed by a spraying method of spraying an LC material at least one of whose relative resistance and dielectric constant differs from that of the alignment film after annealing, on the substrate with the formed electrodes to adhere the dew drops on the electrodes by means of a spray gun or the like, and then annealing this adhered substance.

According to this spraying method, the dielectric layer whose size accords with the size of the dew drops adhered on the electrodes is formed. Thus, multiple dielectric layers can be provided at random in a unit area. It is therefore possible to accomplish an LCD device which can display an image with greater evenness and a good display quality.

The dielectric layer formed by this spraying method has a substantially hemispherical shape. Therefore, the impedance between the electrodes at the portion in the LCD device where the dielectric layer is provided differs between the part corresponding to the center portion of the dielectric layer and the part corresponding to the edge portion of the dielectric layer, and the individual dielectric layers vary in size to a certain degree. It is thus possible to more effectively reduce the dependency of the contrast on the sight angle.

According to this spraying method, sprayed drops stick on the portion on the substrate where no electrodes are present, i.e., on other portion than the pixels, thus forming the dielectric layer in that portion. But, the presence of the dielectric layer in other portion than the pixels does not raise any problem.

Figure 60:
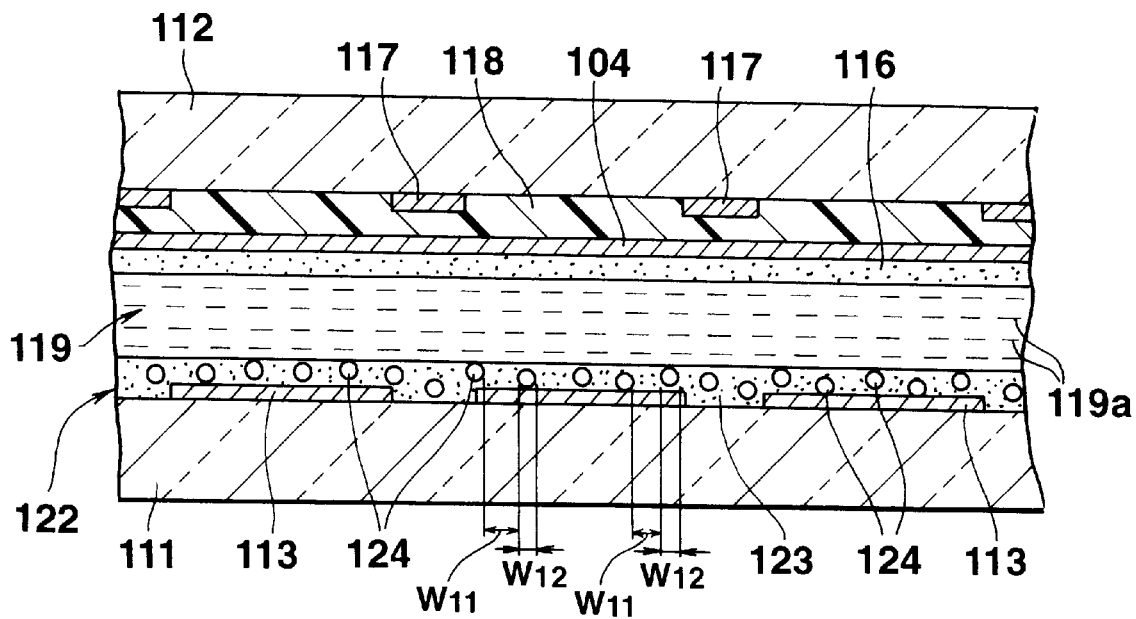
FIG. 60 is a cross-sectional view showing the structure of a modification of the LCD device shown in FIG. 58.

Other structure may also be employed as long as an area whose relative resistance and/or dielectric constant differs from the alignment film can be formed in that alignment film. For example, dielectric particles 124 may be mixed in an alignment film 123 as shown in FIG. 60.

The dielectric particles 124 are formed of a material at least one of whose relative resistance and dielectric constant differs from that of the alignment film 123, such as a transparent insulating material like $SiO_2$ or a transparent conductive material like ITO.

The alignment film 123 with such a structure is formed by mixing the proper amount of dielectric particles 124 into a solution of a polyimide precursor or the like, coating this solution on the substrate 111 by spin coating or the like, and then annealing the resultant structure.

An arbitrary amount of dielectric particles 24 may be mixed. It is however desirable that the mixing amount is such that the dielectric particles 124 are distributed at a plurality of sections in each pixel. It is more desirable that the proper mixing amount of the dielectric particles 124 is such that the total area of areas W12 of the individual pixels where the dielectric particles 124 are present is approximately equal to the total area of areas W11 where the dielectric particles 124 are not present.

Figure 61:
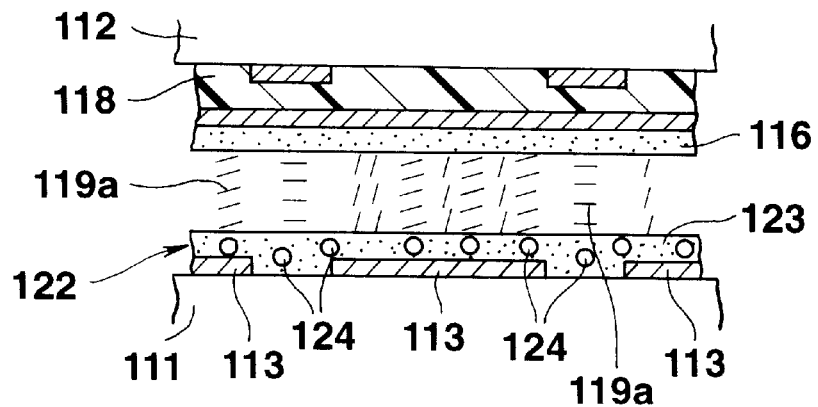
FIG. 61 is a diagram for explaining the alignment state of the liquid crystal molecules in the LCD device shown in FIG. 60.

Even with such a structure, the impedance between the electrodes 104 and 113 at the area W12 where the dielectric particles 124 are present differs from the impedance at the area W11 where the dielectric particles 124 are not present, and different voltages are applied to the LC molecules 119a at those areas W11 and W12. As shown in FIG. 61, therefore, the tilt angle with respect to the applied voltage in the area W12 where the dielectric particles 124 are present is different from the tilt angle in the area W11 where the dielectric particles 124 are not present. Accordingly, areas with different alignment states are formed in each pixel, making the view angle wider. Even when Δn·d of the liquid crystal 119 is equal to 600 nm or above, a wide view angle can be obtained. By setting Δn·d equal to or greater than 600 nm, bright display can be presented.

Because the dielectric particles 124 are dispersed at random in the alignment film 123, it is possible to make the impedance between the electrodes 104 and 113 different in the microdistribution, thereby realizing an LCD device which can display an image with greater evenness and a high quality.

The thickness of the dielectric particles 124 differs depending on the locations even in the area W12 where the dielectric particles 124 are present. It is therefore possible to more effectively reduce the sight-angle dependency of the contrast.

The alignment film 123 and the dielectric particles 124 may be provided on the side of the substrate 112, or on both substrates. The insulating film 51 of the second embodiment may be replaced with the alignment film 123 or the dielectric particles 124.

This invention may be modified and adapted in other forms as needed.

Although the foregoing descriptions of the embodiments have been given with reference to a transparent type LCD device, for instance, this invention may be adapted for a reflection type LCD device. In the latter case, the polarization plate on the reflector side may be removed.

Further, an arbitrary number of retardation plates may be arranged between a pair of polarization plates.

What is claimed is:

1. A liquid crystal display device comprising:
    a first substrate;
    a second substrate arranged opposite to said first substrate;
    a first electrode formed on a surface of said first substrate which faces said second substrate;
    a second electrode arranged on said second substrate and forming pixel areas in an area facing said first electrode;
    a liquid crystal sealed between said first and second substrates; and
    a polarization plate arranged outside of said first and second substrates,
    wherein said first electrode includes an overlying electrode arranged above an insulating film arranged in each pixel area and forming a first region, and an underlying electrode arranged under said insulating film and connected to said overlying electrode so that both said overlying and underlying electrodes have a same electrical potential with each other and forming a second region except for said first region in each pixel area, different voltages being applied to said liquid crystal in said first region and said second region in a same pixel.

2. The liquid crystal display device according to claim 1, wherein said insulating film includes at least one of a color filter provided for each pixel and an overcoat layer.

3. The liquid crystal display device according to claim 1, wherein said insulating film has a relative dielectric constant of 3.0 to 4.0 and a thickness of 1.0 to 2.0 μm, and a ratio of an area of said second region in each pixel to an area of each pixel is 30 to 50%.

4. The liquid crystal display device according to claim 1, wherein said liquid crystal has a retardation value Δn·d of 300 to 600 nm.

5. The liquid crystal display device according to claim 1, wherein said second electrode comprises pixel electrodes arranged pixel by pixel; and
    further comprising an active element connected to each pixel electrode on said second substrate.

6. The liquid crystal display device according to claim 1, wherein said insulating film has color filters of multiple colors; and
    said first and second regions have different areas according to colors of said color filters.

7. The liquid crystal display device according to claim 1, wherein said insulating film has color filters of multiple colors having different thicknesses color by color.

8. The liquid crystal display device according to claim 1, wherein said insulating film has color filters of multiple colors having different dielectric constants color by color.

9. The liquid crystal display device according to claim 1, wherein at least a part of said insulating film is subjected to a process of reducing a dielectric constant.

10. The liquid crystal display device according to claim 1, wherein at least a part of said insulating film includes a base member and a material having a smaller dielectric constant than that of said base member.

11. The liquid crystal display device according to claim 1, wherein said overlying electrode is constituted of a stripe-shaped electrode extending over a plurality of pixels.

12. The liquid crystal display device according to claim 1, wherein said overlying electrode is constituted of a single electrode having openings formed in said individual second regions.

13. The liquid crystal display device according to claim 12, wherein said insulating film has a rugged surface and a flat surface, and said openings are formed in a flat portion of said insulating film.

14. The liquid crystal display device according to claim 1, wherein an alignment film is formed on said first electrode; and an aligning treatment is performed on a surface of said alignment film in a direction parallel to a boundary between said first region and said second region.

15. The liquid crystal display device according to claim 1, wherein said overlying electrode is formed thicker than said underlying electrode.

16. The liquid crystal display device according to claim 1, wherein an insulating film is formed on said first substrate; and said underlying electrode is formed on said insulating film.

17. The liquid crystal display device according to claim 1, wherein said insulating film includes red, green and blue color filters and said red color filter has a greater dielectric constants than dielectric constant of said green and blue color filters.

18. The liquid crystal display device according to claim 17, wherein at least one of said green and blue color filters contains a dielectric-constant reducing agent.

19. The liquid crystal display device according to claim 17, wherein said red color filter contains a dielectric-constant increasing agent.

20. The liquid crystal display device according to claim 17, wherein at least one of said green and blue color filters is made of a material having a smaller dielectric constant than that of said red color filter.

21. The liquid crystal display device according to claim 17, wherein at least one of said green and blue color filters comprises a first insulating film made of a material having a same dielectric constant as that of said red color filter and a second insulating film made of a material having a smaller dielectric constant than that of said red color filter.

22. The liquid crystal display device according to claim 17, wherein at least one of said green and blue color filters is constituted of an insulating film irradiated with ultraviolet rays, a laser beam, an ion beam or X rays.

23. A liquid crystal display device comprising:

a first substrate;

a second substrate arranged opposite to said first substrate;

a first electrode formed on a surface of said first substrate which faces said second substrate;

a second electrode arranged on said second substrate and forming pixel areas in an area facing said first electrode;

a liquid crystal sealed between said first and second substrates; and a polarization plate arranged outside of said first and second substrates, wherein said first electrode includes an overlying electrode arranged above at least one of a color filter made of insulating material and provided for each pixel area and forming a first region, and an underlying electrode arranged under said color filter and connected to said overlying electrode and forming a second region, different voltages being applied to said liquid crystal in said first region and said second region in a same pixel.

24. A liquid crystal display device comprising:

a first substrate;

a second substrate arranged opposite to said first substrate;

a first electrode formed on a surface of said first substrate which faces said second substrate;

a second electrode arranged on said second substrate and forming pixel areas in an area facing said first electrode;

a liquid crystal sealed between said first and second substrates; and a polarization plate arranged outside of said first and second substrates, wherein:

said first electrode includes an overlying electrode arranged above an insulating film arranged in each pixel area and forming a first region, and an underlying electrode arranged under said insulating film and connected to said overlying electrode and forming a second region, different voltages being applied to said liquid crystal in said first region and said second region in a same pixel, said insulating film has color filters of multiple colors, and said first and second regions have different areas according to colors of said color filters.

* * * * *